US012632483B2

(12) United States Patent
Hashish et al.

(10) Patent No.: US 12,632,483 B2
(45) Date of Patent: May 19, 2026

(54) DETERMINING REPAIR INFORMATION VIA AUTOMATED ANALYSIS OF STRUCTURED AND UNSTRUCTURED REPAIR DATA

(71) Applicant: THE COLLECTIVE JOURNEY, LLC, Heber City, UT (US)

(72) Inventors: Rami Hashish, Santa Monica, CA (US); Vladyslav Borysenko, Kyiv (UA)

(73) Assignee: THE COLLECTIVE JOURNEY, LLC, Heber City, UT (US)

( * ) Notice: Subject to any disclaimer, the term of this patent is extended or adjusted under 35 U.S.C. 154(b) by 288 days.

(21) Appl. No.: 18/131,278

(22) Filed: Apr. 5, 2023

(65) Prior Publication Data

US 2023/0334076 A1 Oct. 19, 2023

Related U.S. Application Data

(60) Provisional application No. 63/331,414, filed on Apr. 15, 2022.

(51) Int. Cl.
*G06F 16/338* (2019.01)
*G06F 16/34* (2025.01)
(Continued)

(52) U.S. Cl.
CPC .......... *G06F 16/338* (2019.01); *G06F 16/345* (2019.01); *G06F 40/40* (2020.01); *G06V 30/413* (2022.01)

(58) Field of Classification Search
CPC ... G06F 16/338; G06F 16/345; G06V 30/413; G06V 10/82
See application file for complete search history.

(56) References Cited

U.S. PATENT DOCUMENTS

| 6,662,357 | B1 * | 12/2003 | Bowman-Amuah | .. | G06Q 10/06 |
| | | | | | 717/120 |
| 6,957,186 | B1 * | 10/2005 | Guheen | ................ | G06Q 90/20 |
| | | | | | 705/323 |

(Continued)

FOREIGN PATENT DOCUMENTS

WO 2015031449 A1 3/2015

OTHER PUBLICATIONS

Colin Raffel et al., "Exploring the Limits of Transfer Learning with a Unified Text-to-Text Transformer", dated Jul. 28, 2020 and retrieved on Aug. 19, 2021 from https://arxiv.org/abs/1910.10683, 67 pages.

(Continued)

*Primary Examiner* — Jesse S Pullias
(74) *Attorney, Agent, or Firm* — Snell & Wilmer L.L.P.

(57) ABSTRACT

Techniques are described for performing automated operations related to identifying and using repair and maintenance information, such as extracting and linking data about repair and maintenance activities performed on various devices or other entities, determining specific repair and/or maintenance information of one or more specified types in response to queries (e.g., for one or more particular such devices that are identified based on those queries), and subsequently using the identified repair information in further automated manners in some situations (e.g., to automatically initiate repair or maintenance actions on a particular target computing device). The extracting of repair and maintenance data may include analyzing information from multiple source documents (from one or more repair activity providers) and/or across multiple repair encounters, and using a combination of both image-based and text-based analyses.

24 Claims, 44 Drawing Sheets
(25 of 44 Drawing Sheet(s) Filed in Color)

(51) Int. Cl.
    *G06F 40/40*      (2020.01)
    *G06V 30/413*    (2022.01)

(56)                     References Cited

U.S. PATENT DOCUMENTS

| | | | | |
|---|---|---|---|---|
| 7,295,719 | B2 * | 11/2007 | Robertson | G06F 16/58 |
| | | | | 707/999.1 |
| 7,890,514 | B1 * | 2/2011 | Mohan | G06F 16/30 |
| | | | | 707/750 |
| 10,733,566 | B1 | 8/2020 | Chan et al. | |
| 11,031,003 | B2 * | 6/2021 | Asi | G06F 40/20 |
| 2010/0131482 | A1 * | 5/2010 | Linthicum | G16H 40/63 |
| | | | | 707/706 |
| 2015/0178345 | A1 * | 6/2015 | Carrier | G06F 16/838 |
| | | | | 707/691 |
| 2018/0060487 | A1 | 3/2018 | Barkan et al. | |
| 2018/0075138 | A1 * | 3/2018 | Perram | G06F 16/93 |
| 2018/0322958 | A1 | 11/2018 | Kalafatis | |
| 2019/0122124 | A1 * | 4/2019 | Kartchner | G06F 16/3329 |
| 2019/0347792 | A1 * | 11/2019 | Pauly | G06T 7/136 |
| 2020/0126663 | A1 * | 4/2020 | Lucas | G06V 30/19013 |
| 2020/0134024 | A1 | 4/2020 | Banisakher et al. | |
| 2020/0226164 | A1 | 7/2020 | Eifert et al. | |
| 2021/0118536 | A1 | 4/2021 | Katouzian et al. | |
| 2021/0319858 | A1 | 10/2021 | Reumann et al. | |
| 2022/0050837 | A1 * | 2/2022 | Weber | G06F 16/243 |

OTHER PUBLICATIONS

Julio Bonis, "A cognitive search engine and question answering system using SparkNLP", dated Jul. 19, 2021 and retrieved on Aug. 19, 2021 from https://medium.com/@drbonis/a-cognitive-search-engine-and-question-answering-system-using-sparknlp-and-t5-b3902e517586, 18 pages.

Santhosh Hari, "Locality Sensitive Hashing for Similar Item Search", dated Jul. 5, 2018 and retrieved on Aug. 19, 2021 from https://towardsdatascience.com/locality-sensitive-hashing-for-music-search-f2f1940ace23, 12 pages.

SQuAD2.0—The Stanford Question Answering Dataset, retrieved on Jan. 24, 2022 from https://rajpurkar.github.io/SQuAD-explorer/, 39 pages.

Qiao Jin et al., "PubMedQA: A Dataset for Biomedical Research Question Answering", dated Sep. 13, 2019 and retrieved on Jan. 24, 2022 from https://arxiv.org/abs/1909.06146, 11 pages.

Emre Varol, "Creating Clinical Knowledge Graph by Spark NLP & Neo4j", dated Sep. 21, 2021, retrieved on Mar. 11, 2022 from medium.com/spark-nlp/creating-knowledge-graph-by-spark-nlp-neo4j-9d18706aa08b, 16 pages.

Veysel Kocaman et al., "Improving Clinical Document Understanding on COVID-19 Research with Spark NLP", dated Dec. 7, 2020, retrieved on Jan. 24, 2022 from https://arxiv.org/abs/2012.04005, 9 pages.

GPT-3, Wikipedia, retrieved on Oct. 16, 2021 from en.wikipedia.org/wiki/GPT-3, 9 pages.

OHDSI OMOP Common Data Model, retrieved on Oct. 14, 2021 from www.ohdsi.org/data-standardization/the-common-data-model/, 2 pages.

Spark NLP, retrieved on Mar. 11, 2022 from nlp.johnsnowlabs.com/, 14 pages.

Federico Fancellu et al., "Neural Networks For Negation Scope Detection", Proceedings of The 54th Annual Meeting of The Association For Computational Linguistics, Aug. 7-12, 2016, 10 pages.

* cited by examiner

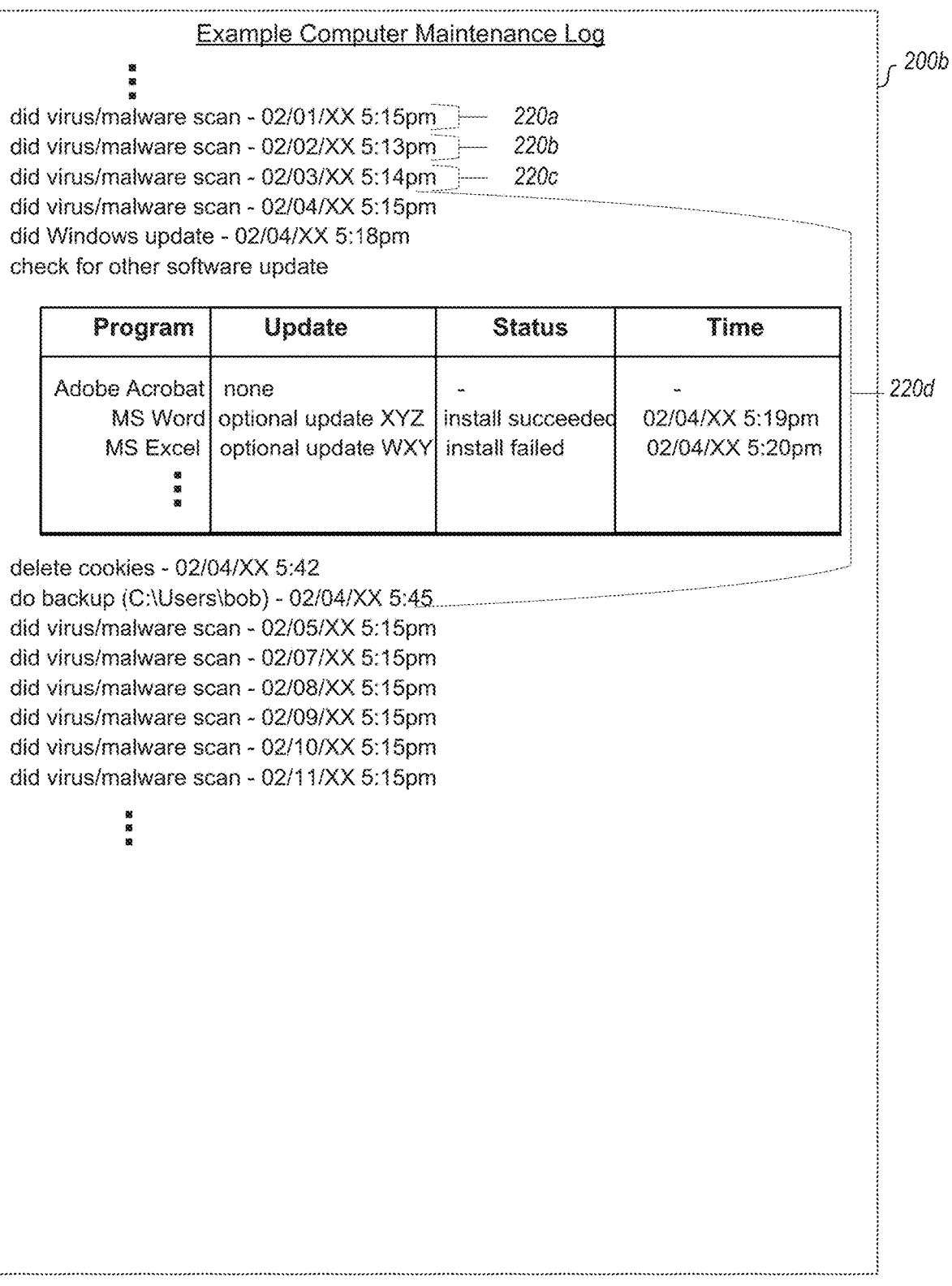

Example Computer Maintenance Log

⋮ did virus/malware scan - 02/01/XX 5:15pm —— 220a
did virus/malware scan - 02/02/XX 5:13pm —— 220b
did virus/malware scan - 02/03/XX 5:14pm —— 220c
did virus/malware scan - 02/04/XX 5:15pm
did Windows update - 02/04/XX 5:18pm
check for other software update

| Program | Update | Status | Time |
|---|---|---|---|
| Adobe Acrobat | none | – | – |
| MS Word | optional update XYZ | install succeeded | 02/04/XX 5:19pm |
| MS Excel | optional update WXY | install failed | 02/04/XX 5:20pm |
| ⋮ | | | |

— 220d delete cookies - 02/04/XX 5:42
do backup (C:\Users\bob) - 02/04/XX 5:45
did virus/malware scan - 02/05/XX 5:15pm
did virus/malware scan - 02/07/XX 5:15pm
did virus/malware scan - 02/08/XX 5:15pm
did virus/malware scan - 02/09/XX 5:15pm
did virus/malware scan - 02/10/XX 5:15pm
did virus/malware scan - 02/11/XX 5:15pm

Example Computer Repair Invoice

COMPUTER REPAIR INVOICE

DETAILS

DATE: _02/01/XX_
INVOICE NO. _0012435_
TECHNICIAN: _TTT_

FROM

COMPANY: _Company EEE_
ATTN: _FFF_
ADDRESS: _2345 XXX_
CITY, STATE: _XXX, XX_
ZIP: _XXXXX_
PHONE: _XXX-XXX-XXXX_
E-MAIL: _XXX_

BILL TO

COMPANY: _Company CCC_
ATTN: _DDD_
ADDRESS: _1234 XXX_
CITY, STATE: _XXX, XX_
ZIP: _XXXXX_
PHONE: _XXX-XXX-XXXX_
E-MAIL: _XXX_

| SERVICE | HOURS | RATE ($/HR) | AMOUNT ($) |
|---|---|---|---|
| Screen Replacement | 2.2 | 75 | 165.00 |
| OS Backup/Restore | 3.1 | 25 | 77.50 |
| | | TOTAL | 242.50 |

| PARTS / MATERIALS | QUANTITY | UNIT PRICE | AMOUNT ($) |
|---|---|---|---|
| Part Name PPP | 1 | 34.00 | 34.00 |
| Part Name QQQ | 2 | 17.55 | 35.10 |
| | | TOTAL | 69.10 |

NOTES 1) Screen giving error (XXX-replaced)
2) Upgrade OS to Windows llvX
3) customer noted prior work about 2 weeks ago to be malware update/scan

| | |
|---|---|
| SUBTOTAL | 311.60 |
| SHIPPING | -- |
| TAX / VAT | 31.20 |
| TOTAL | 342.80 |

*Fig. 2C*

Example Medical Information Transmittal

200d

<doctor contact information>

<doctor name / logo>

Fax

| | | | |
|---|---|---|---|
| To: | <recipient name> | From: | <sender name> |
| Fax: | 877 389 2775 | Pages: | 12 |
| Phone: | | Date | 02/04/20XX |
| Re: | John Doe | cc: | |

☐ Urgent ☐ For Review ☐ Please Comment ☐ Please Reply ☐ Please Recycle

*** CONFIDENTIALITY NOTICE****

The documents accompanying this fax contain confidential information that may be legally privileged and protected by federal and state law. This information is intended for use only by the entity or individual to whom it is addressed. The authorized recipient is obligated to maintain the information in a safe, secure, and confidential manner. The authorized recipient is prohibited from using this information for purposes other than intended, prohibited from disclosing this information to any other party unless required to do so by law or regulation, and is required to destroy the information after its stated need has been fulfilled. If you are in possession of this protected health information, and are not the intended recipient, you are hereby notified that any improper disclosure, copying, or distribution of the contents of this information is strictly prohibited. Please notify the owner of this information immediately and arrange for its return or destruction.

Figure 2E:
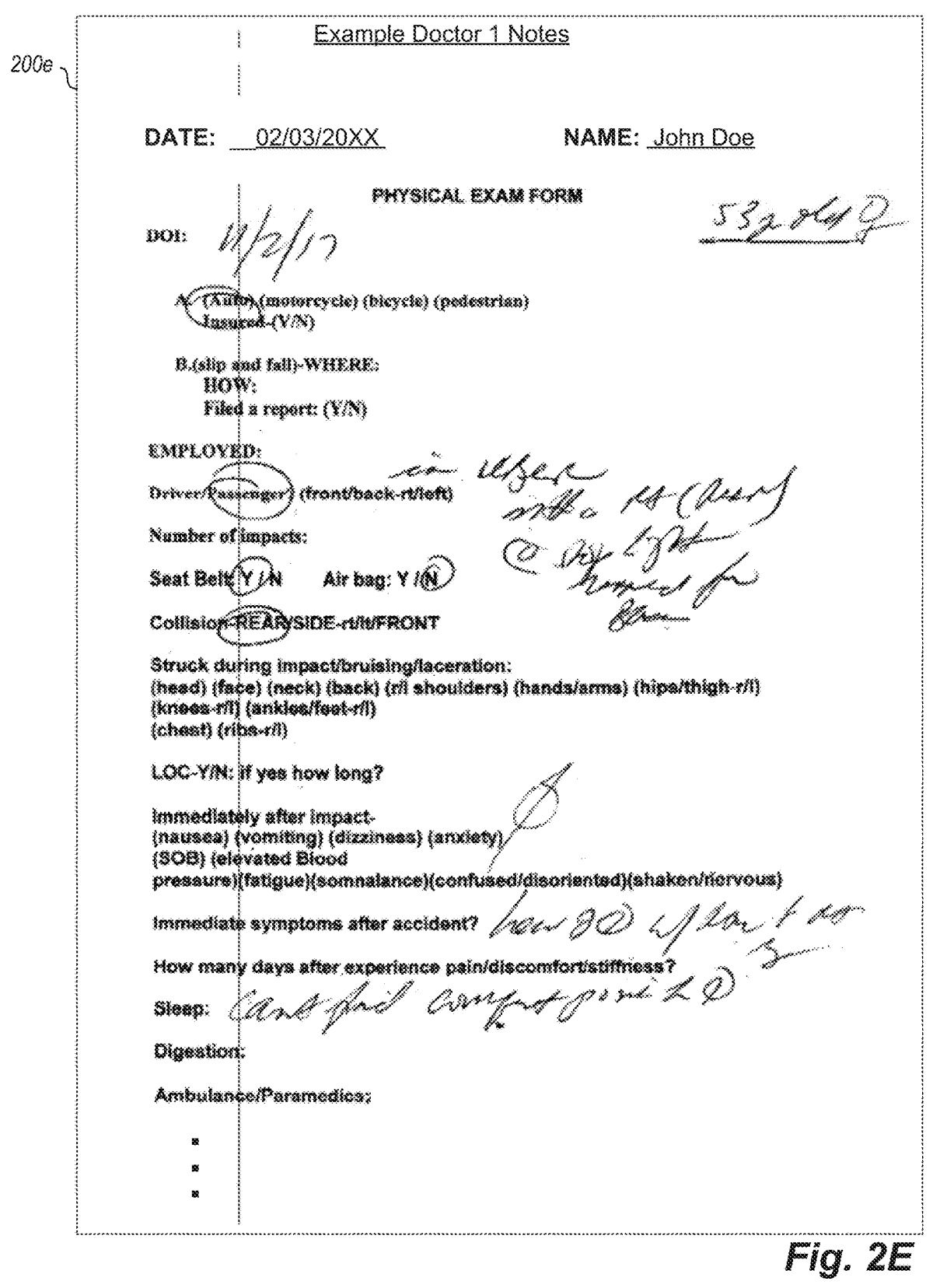

Example Doctor 1 Notes

DATE:    02/03/20XX         NAME: John Doe

PHYSICAL EXAM FORM

DOI:

A. (Auto) (motorcycle) (bicycle) (pedestrian)
Insured- (Y/N)

B.(slip and fall)-WHERE:
     HOW:
     Filed a report: (Y/N)

EMPLOYED:

Driver/Passenger) (front/back-rt/left)

Number of impacts:

Seat Belt: Y / N      Air bag: Y /(N)

Collision-REAR/SIDE-rt/lt/FRONT

Struck during impact/bruising/laceration:
(head) (face) (neck) (back) (r/l shoulders) (hands/arms) (hips/thigh-r/l)
(knees-r/l) (ankles/feet-r/l)
(chest) (ribs-r/l)

LOC-Y/N: if yes how long?

Immediately after impact-
(nausea) (vomiting) (dizziness) (anxiety)
(SOB) (elevated Blood
pressure)(fatigue)(somnalance)(confused/disoriented)(shaken/nervous)

Immediate symptoms after accident?

How many days after experience pain/discomfort/stiffness?

Sleep:

Digestion:

Ambulance/Paramedics:

Example Doctor 1 Visit Treatment Summary

<doctor name / logo / contact information>

RE: John Doe
DATE: 02/04/20XX

| DATE | CODE DESCRIPTION | AMOUNT |
|---|---|---|
| <date 1> | 99203 Complete History and Medical Examination | 200.00 |
| | A9150 Supplements | 40.00 |
| | 97810 Acu 15 min | 65.00 |
| | 97026 Infrared | 30.00 |
| | 97124 Massage | 35.00 |
| <date 2> | 97810 Acu 15 min | 65.00 |
| | 97811 Acu Addtl 15 min | 40.00 |
| | 97026 Infrared | 30.00 |
| | 97124 Massage | 35.00 |
| <date 3> | 97014 Muscle Stim. | 40.00 |
| | 97012 Man Tract. | 40.00 |
| | 97810 Acu 15 min | 65.00 |
| | 97811 Acu Addtl 15 min | 40.00 |
| | 97124 Massage | 35.00 |
| <date 4> | 97810 Acu 15 min | 65.00 |
| | 97811 Acu Addtl 15 min | 40.00 |
| | 97039 LLL therapy | 50.00 |
| | 97124 Massage | 35.00 |
| <date 5> | 99214 Re-Evaluation | 125.00 |
| | 97110 Ther Exer | 40.00 |
| | 97012 Man Tract. | 40.00 |
| | 97810 Acu 15 min | 65.00 |
| | 97811 Acu Addtl 15 min | 40.00 |
| | 97124 Massage | 35.00 |
| <date 6> | 97012 Man Tract. | 40.00 |
| | 97810 Acu 15 min | 65.00 |
| | 97811 Acu Addtl 15 min | 40.00 |
| | 97039 LLL therapy | 50.00 |
| | 97124 Massage | 35.00 |
| <date 7> | 99214 Re-Evaluation | 125.00 |
| | 97110 Ther Exer | 40.00 |
| | 97810 Acu 15 min | 65.00 |
| | 97811 Acu Addtl 15 min | 40.00 |
| | 97026 Infrared | 30.00 |
| | 97124 Massage | 35.00 |

| TOTAL CHARGES TO DATE: | $ 1,860.00 |
|---|---|

*Fig. 2F*

Doe, John    <u>Example Doctor 2 Notes</u>

Office/Outpatient Consultation
Visit Date: Dec 6, 2019 03:33 pm
Provider: Jake Davis, P.A.

Electronically signed by Jake Davis, P.A. on 12/08/2019 05:45:51 PM
SUBJECTIVE:

<u>CC:</u>
Mr. Doe is a 46 year old White male. He has been referred by Dr. Snow for a consultation. He presents with low back pain, left leg pain, and left knee pain.

Patient complains of low back pain. The discomfort is most prominent in the right sided lower lumbar spine. This radiates to the right buttock, left outer thigh, and left calf. This is an acute episode. The event which precipitated this pain was a motor-vehicle accident (took place on October 26, 2019; he was rear-ended; he was the driver; was wearing a seat belt; the air bag did not deploy; damage to the vehicle was extensive; he experienced muscle spasms immediately after the accident; the police were called to the scene; the pain symptoms are new and he did not have these pain symptoms prior to the accident). He characterizes it as intermittent, moderate to severe, sharp, cramping, shooting, and stabbing. Associated symptoms include numbness in the left thigh and left lower leg and muscle spasms. He notes some pain relief with pain medications. The pain worsens with not taking pain meds. Pain interferes significantly with sleep, work, and fulfillment of household responsibilities. The pain symptoms following the accident have been affecting his sexual activities and have been affecting the relationship with his family and friend. Past treatment includes pain medications, back surgery, muscle relaxant, and NSAIDs. Medical history is significant for back surgery. He states that about 20 years ago he underwent a successful lumbar surgical intervention. He states that prior to this MVA he did have some pain in his low back that was tolerable with the help of medication. He states that the pain was located in the middle of his low back. He states that since the MVA he now has the new symptoms of right sided low back pain, left leg pain, and left knee pain.

Concerning knee pain, this is the left knee. Injury mechanism was a MVA that occurred on October 26, 2019. He describes the intensity of pain as moderate to severe. The pattern of joint symptoms has been stable and nonprogressive. Pain character is intermittent, sharp, aching, grinding, shooting, stabbing, and cramping. No associated symptoms are reported. Patient denies locking/popping/giving away and numbness/tingling. Pain better with pain medications. Pain worse with not taking pain medications. Pain interferes with sleep and work. Medical history is unremarkable for pertinent conditions.

<u>ROS:</u>
CONSTITUTIONAL: Negative for chills, fatigue, fever, and weight change.
EYES: Negative for blurred vision, eye pain, and photophobia.
E/N/T: Negative for hearing problems, E/N/T pain, congestion, rhinorrhea, epistaxis, hoarseness, and dental problems.
CARDIOVASCULAR: Negative for chest pain, palpitations, tachycardia, orthopnea, and edema.
RESPIRATORY: Negative for cough, dyspnea, and hemoptysis.
GASTROINTESTINAL: Negative for abdominal pain, heartburn, constipation, diarrhea, and stool changes.
GENITOURINARY: Negative for dysuria, genital lesions, hematuria, impotence, polyuria, and changes in urine stream.
MUSCULOSKELETAL: See HPI
INTEGUMENTARY: Negative for atypical moles, dry skin, pruritis, and rashes.
NEUROLOGICAL: See HPI
ENDOCRINE: Negative for hair loss, heat/cold intolerance, polydipsia, and polyphagia

*200g*    *< continued on additional pages>*    Fig. 2G

Figure 2H:
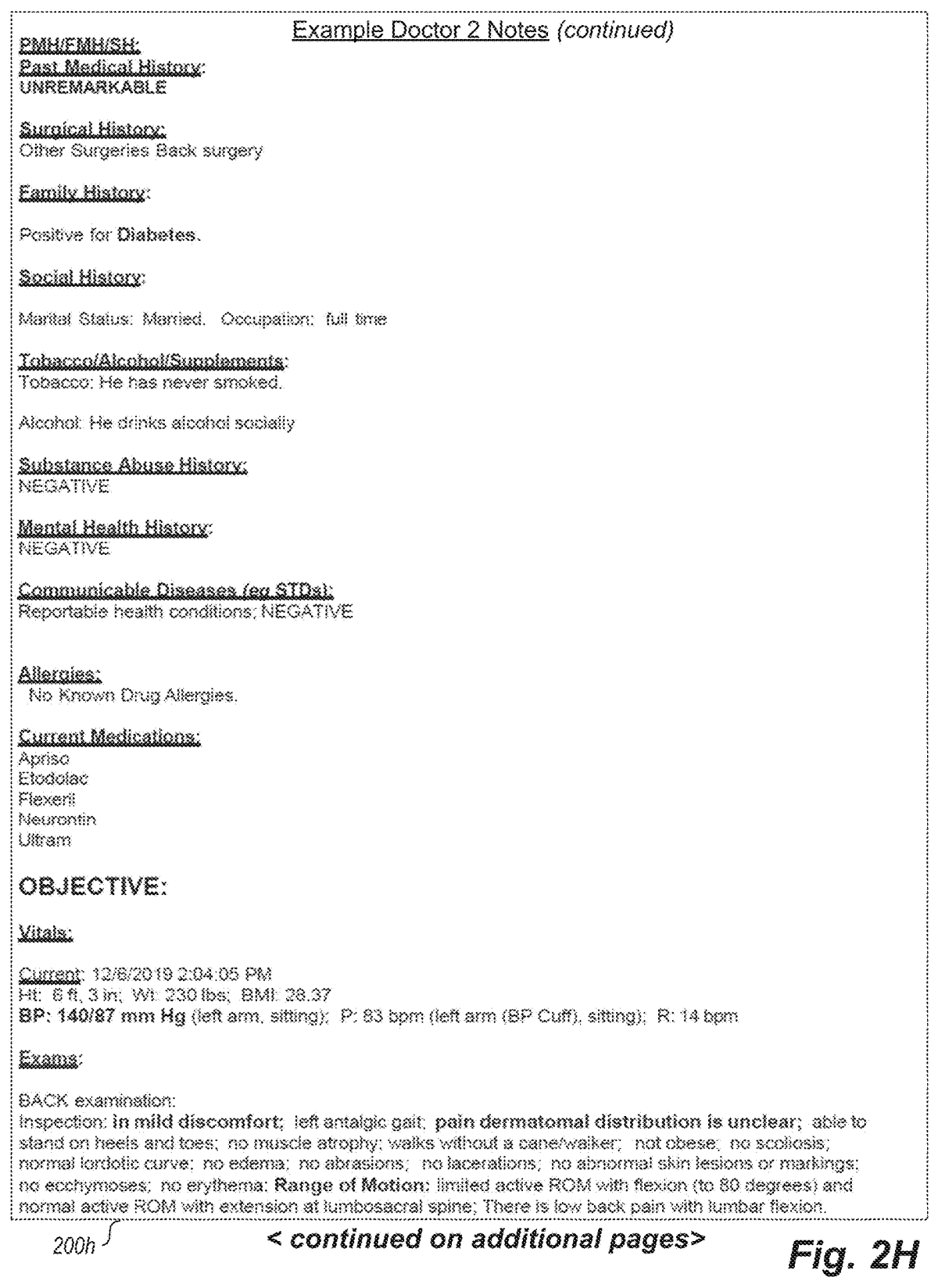

Example Doctor 2 Notes *(continued)*

PMH/FMH/SH:
Past Medical History:
UNREMARKABLE

Surgical History:
Other Surgeries: Back surgery

Family History:

Positive for Diabetes.

Social History:

Marital Status: Married.  Occupation:  full time

Tobacco/Alcohol/Supplements:
Tobacco: He has never smoked.

Alcohol: He drinks alcohol socially

Substance Abuse History:
NEGATIVE

Mental Health History:
NEGATIVE

Communicable Diseases (eg STDs):
Reportable health conditions: NEGATIVE

Allergies:
  No Known Drug Allergies.

Current Medications:
Apriso
Etodolac
Flexeril
Neurontin
Ultram

OBJECTIVE:

Vitals:

Current: 12/6/2019 2:04:05 PM
Ht: 6 ft, 3 in;  Wt: 230 lbs;  BMI: 28.37
BP: 140/87 mm Hg (left arm, sitting);  P: 83 bpm (left arm (BP Cuff), sitting);  R: 14 bpm Exams:

BACK examination:
Inspection: in mild discomfort;  left antalgic gait;  pain dermatomal distribution is unclear;  able to stand on heels and toes;  no muscle atrophy; walks without a cane/walker;  not obese;  no scoliosis; normal lordotic curve;  no edema;  no abrasions;  no lacerations;  no abnormal skin lesions or markings; no ecchymoses;  no erythema: Range of Motion: limited active ROM with flexion (to 80 degrees) and normal active ROM with extension at lumbosacral spine; There is low back pain with lumbar flexion.

Example Doctor 2 Notes *(continued)*

Palpation: right sided paraspinous tenderness to palpation. Muscular Strength: 5/5 graded muscle strength of the iliopsoas, quadriceps, hip adductors, gluteus maximus and medius; Maneuvers: (+) left straight leg raise; (-) Patrick Test Neurovascular: sensory deficit noted in the left (S1) dermatomal distribution; deep tendon reflexes are intact; brisk bilateral femoral pulse;

Waddell's Signs-
Tenderness test- anatomical tenderness.
Simulation test- no pain with axial loading or simulated rotation.
Distraction test- findings are consistent with distraction.
Regional disturbances- no regional weakness or sensory changes.
Overreaction- no verbal, fascial or withdrawal overreaction.
Total score- 0/5.
LEFT KNEE examination: Inspection: in mild discomfort; no muscular atrophy; no apparent effusion; no erythema; no ecchymosis; no edema; no deformity; no abrasions; no lacerations; normal tibial angle; patella neutral; neutral patella alignment .
Range of Motion: full active ROM in flexion, extension, internal and external rotation;
Palpation: pain noted at the medial jointline ; mild tenderness over the joint;
Muscular Strength: 5/5 graded muscle strength of the quadriceps, hamstring and gastrocnemius;
PHYSICAL EXAM:
GENERAL: well developed, well nourished; well groomed;
EYES: extraocular movements intact; conjunctiva and cornea are normal; pupils and irises are normal;
E/N/T: normal EACs, TMs, nasal/oral mucosa, teeth, gingiva, and oropharynx;
NECK: trachea is midline; thyroid is non-palpable; jugular veins are normal;
RESPIRATORY: normal appearance and symmetric expansion of chest wall; normal respiratory rate and pattern with no distress;
CARDIOVASCULAR: normal PMI placement; no thrills, heaves, or lifts; normal rate; rhythm is regular; 2+ carotid, radial, femoral, and pedal pulses; no cyanosis; no cyanosis; no varicosities;
GASTROINTESTINAL: nontender, nondistended; no hepatosplenomegaly or masses; no bruits; nontender; normal bowel sounds; no organomegaly; no masses; no shifting dullness or fluid wave;
MUSCULOSKELETAL: as stated above;
NEUROLOGIC: as stated above;
PSYCHIATRIC: appropriate affect and demeanor; normal speech pattern; grossly normal memory;

ASSESSMENT:

| | |
|---|---|
| 724.4 | Lumbar radicular syndrome |
| 959.7 | Traumatic knee arthropathy |
| 722.10 | lumbar discogenic syndrome |
| 724.8 | Facet syndrome |
| 847.2 | Lumbar sprain |
| 729.1 | Myofascial pain syndrome |

PLAN:

Lumbar radicular syndrome
Studies: MRI (lumbar). Medication: Continue present medications Mr. Doe will return to clinic in two weeks.

Causation: In my opinion the patient's symptoms for which he is being seen are directly related to the above mentioned accident. This opinion is based on patient's history and physical exam. My opinion could change with additional information provided to me in the future.

The HPI, exam, assessment and plan were discussed with Dr. Miller. Patient's questions were answered.

Thank you Dr. Snow for allowing us to participate in taking care of Mr. Doe.

2001

< continued on additional pages>

*Fig. 2l*

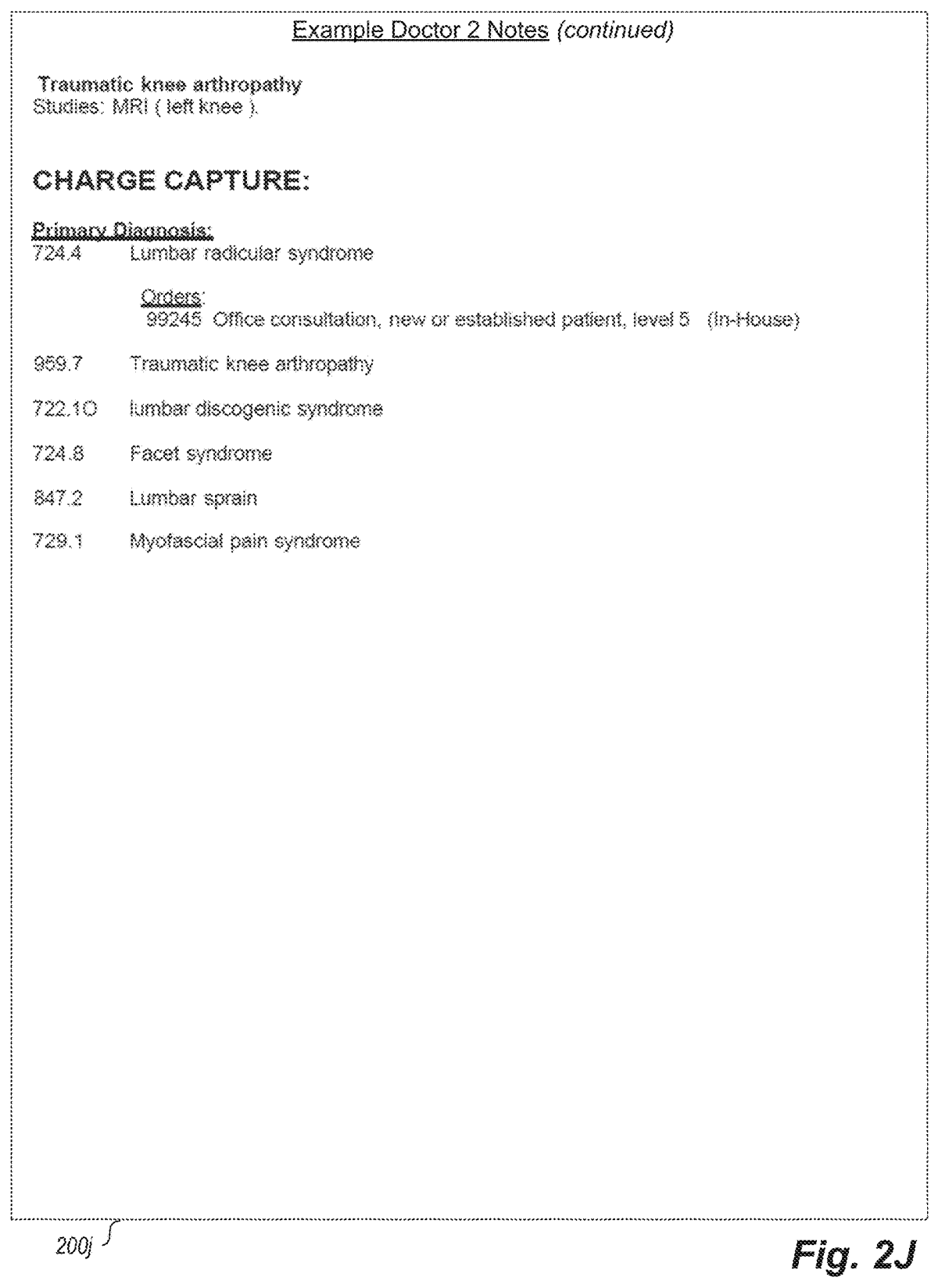

Example Doctor 2 Notes (continued)

Traumatic knee arthropathy
Studies: MRI ( left knee ).

CHARGE CAPTURE:

Primary Diagnosis:
724.4     Lumbar radicular syndrome

Orders:
          99245  Office consultation, new or established patient, level 5   (In-House)

959.7     Traumatic knee arthropathy 722.10    lumbar discogenic syndrome 724.8     Facet syndrome 847.2     Lumbar sprain 729.1     Myofascial pain syndrome 200j

*Fig. 2J*

Figure 2K:
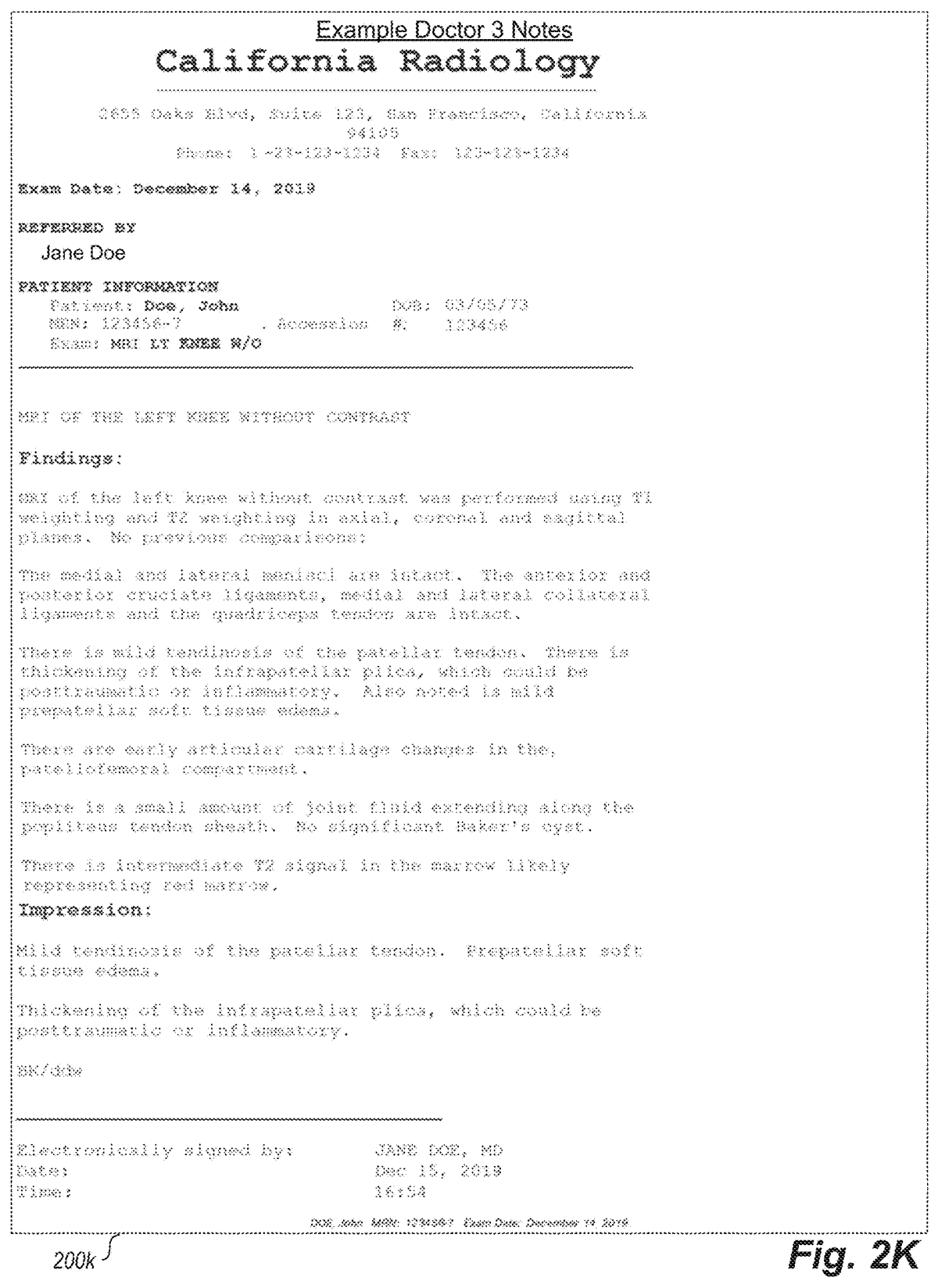

Example Doctor 3 Notes

California Radiology

2655 Oaks Blvd, Suite 123, San Francisco, California
94105
Phone: 1-23-123-1234  Fax: 123-123-1234

Exam Date: December 14, 2019

REFERRED BY
Jane Doe

PATIENT INFORMATION
Patient: Doe, John     DOB: 03/05/73
SSN: 123456-7     , Accession #: 123456
Exam: MRI LT KNEE W/O

MRI OF THE LEFT KNEE WITHOUT CONTRAST

Findings:

MRI of the left knee without contrast was performed using T1 weighting and T2 weighting in axial, coronal and sagittal planes. No previous comparisons.

The medial and lateral menisci are intact. The anterior and posterior cruciate ligaments, medial and lateral collateral ligaments and the quadriceps tendon are intact.

There is mild tendinosis of the patellar tendon. There is thickening of the infrapatellar plica, which could be posttraumatic or inflammatory. Also noted is mild prepatellar soft tissue edema.

There are early articular cartilage changes in the patellofemoral compartment.

There is a small amount of joint fluid extending along the popliteus tendon sheath. No significant Baker's cyst.

There is intermediate T2 signal in the marrow likely representing red marrow.

Impression:

Mild tendinosis of the patellar tendon. Prepatellar soft tissue edema.

Thickening of the infrapatellar plica, which could be posttraumatic or inflammatory.

SK/drb

Electronically signed by:     JANE DOE, MD
Date:     Dec 15, 2019
Time:     16:54

Doe, John SSN: 123456 Exam Date: December 14, 2019

Figure 2L1:
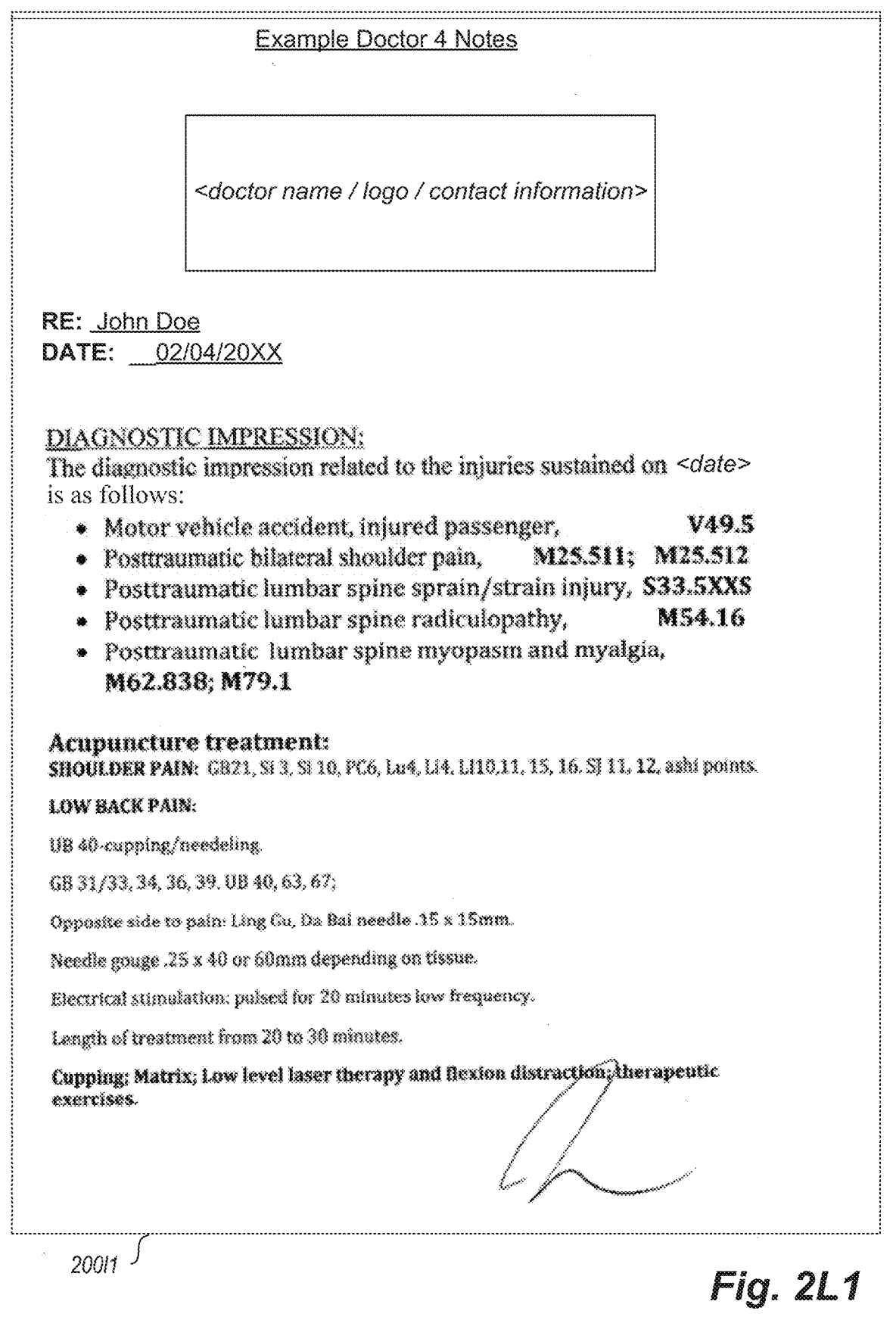

Example Doctor 4 Notes

<doctor name / logo / contact information>

RE: John Doe
DATE:     02/04/20XX

DIAGNOSTIC IMPRESSION:
The diagnostic impression related to the injuries sustained on <date>
is as follows:

- Motor vehicle accident, injured passenger,              V49.5
- Posttraumatic bilateral shoulder pain,        M25.511;  M25.512
- Posttraumatic lumbar spine sprain/strain injury, S33.5XXS
- Posttraumatic lumbar spine radiculopathy,              M54.16
- Posttraumatic  lumbar spine myopasm and myalgia,
  M62.838; M79.1

Acupuncture treatment:
SHOULDER PAIN: GB21, SI 3, SI 10, PC6, Lu4, LI4, LI10,11, 15, 16, SJ 11, 12, ashi points.

LOW BACK PAIN:

UB 40-cupping/needeling.

GB 31/33, 34, 36, 39. UB 40, 63, 67;

Opposite side to pain: Ling Gu, Da Bai needle .15 x 15mm.

Needle gouge .25 x 40 or 60mm depending on tissue.

Electrical stimulation: pulsed for 20 minutes low frequency.

Length of treatment from 20 to 30 minutes.

Cupping; Matrix; Low level laser therapy and flexion distraction;therapeutic exercises.

Figure 2L2:
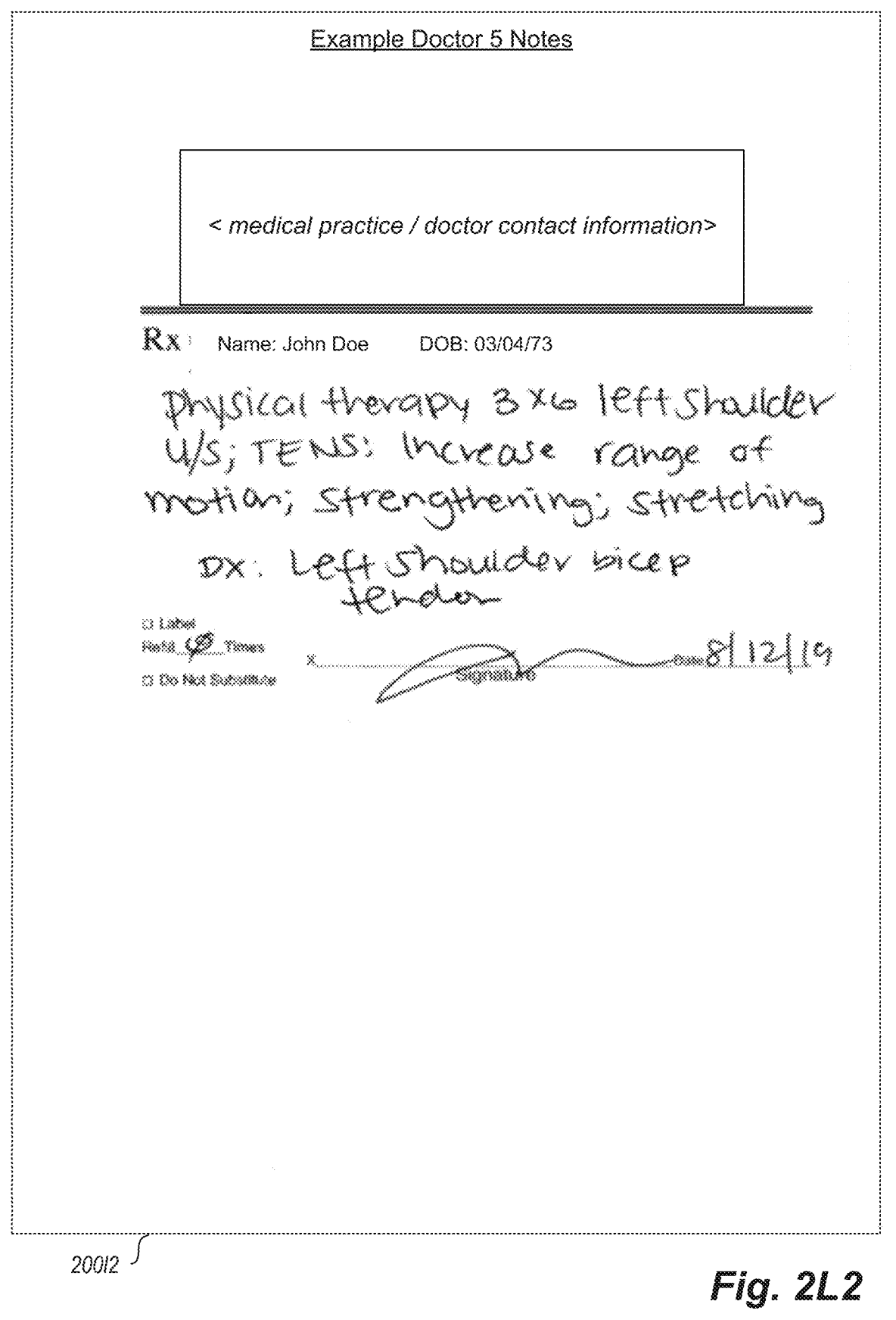

Example Doctor 5 Notes

< medical practice / doctor contact information>

Rx    Name: John Doe    DOB: 03/04/73

Physical therapy 3 x6 left Shoulder
U/S; TENS; increase range of
motion; strengthening; stretching
Dx: Left Shoulder bicep
tendon ☐ Label
Refill ___ ⊘ ___ Times
☐ Do Not Substitute
x _____ 8/12/19

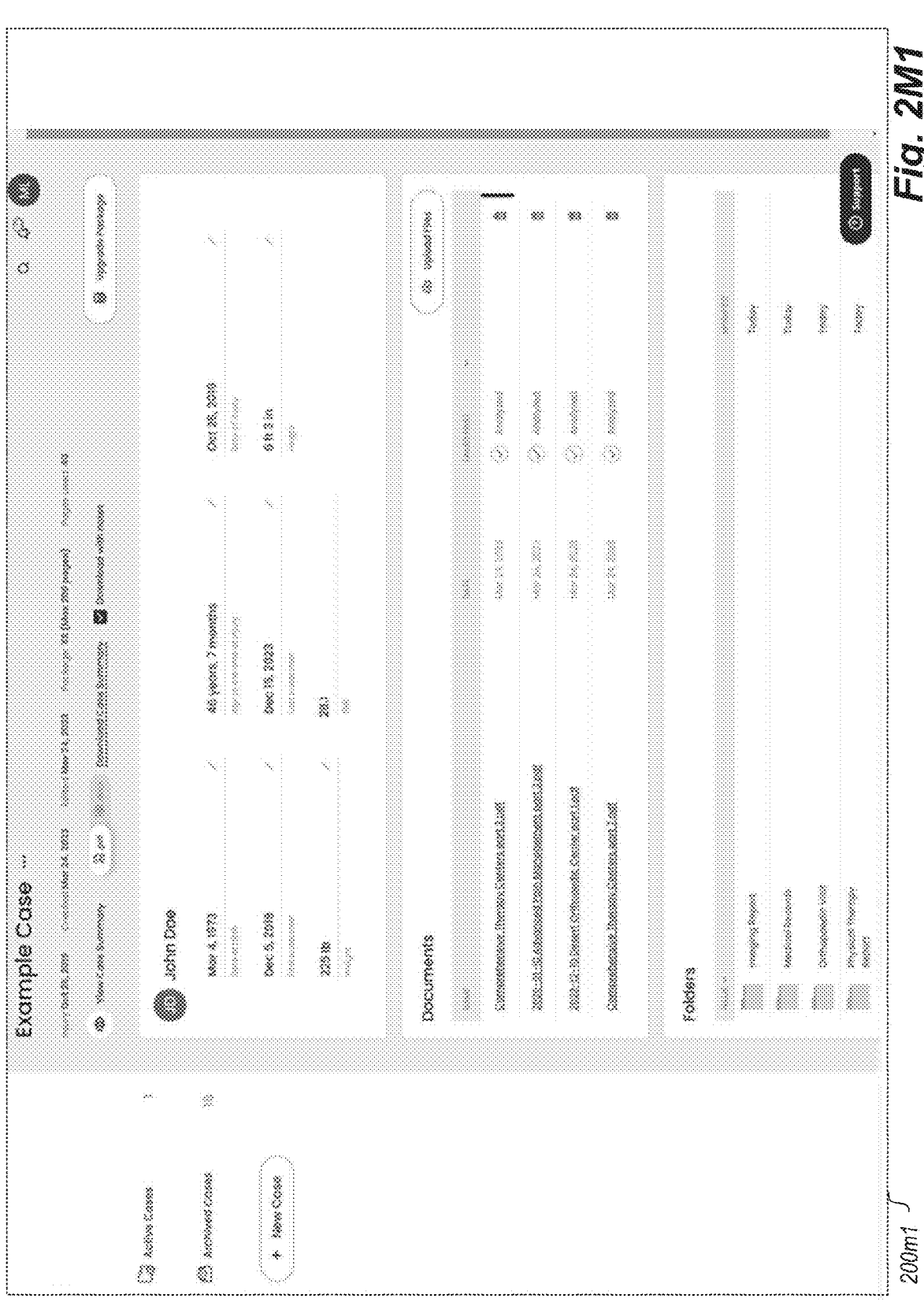
*Fig. 2M1*
200m1

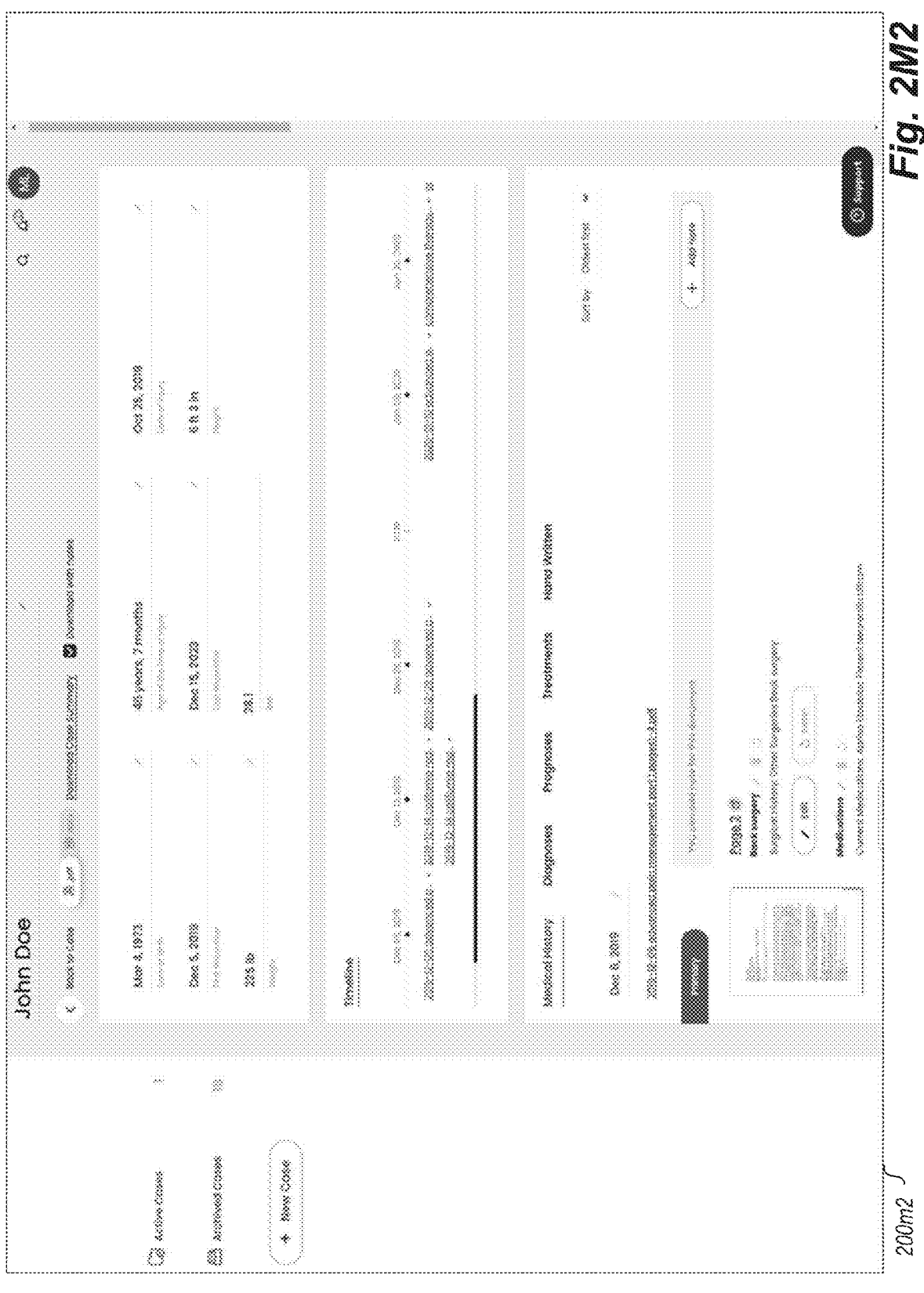
Fig. 2M2

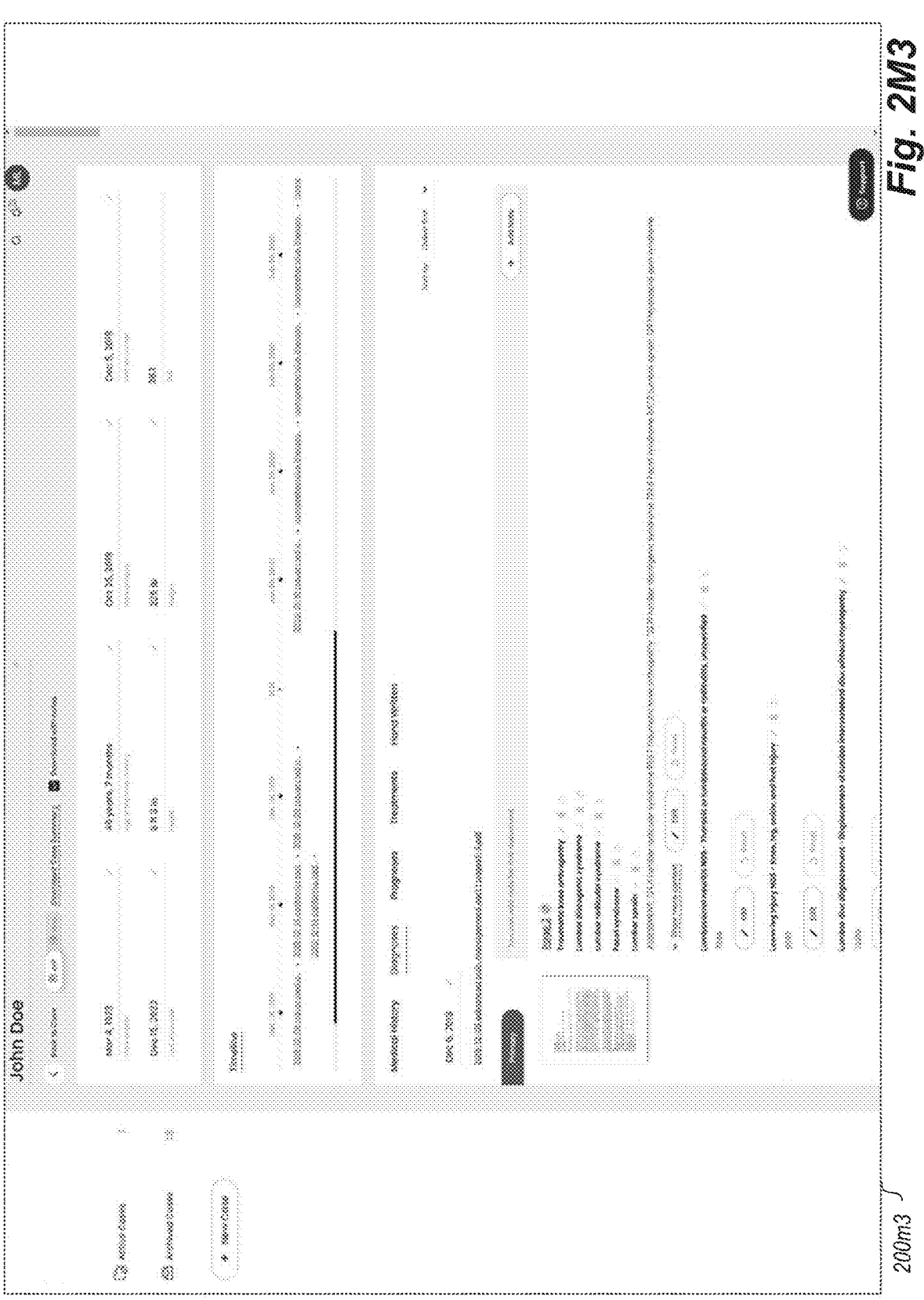
Fig. 2M3

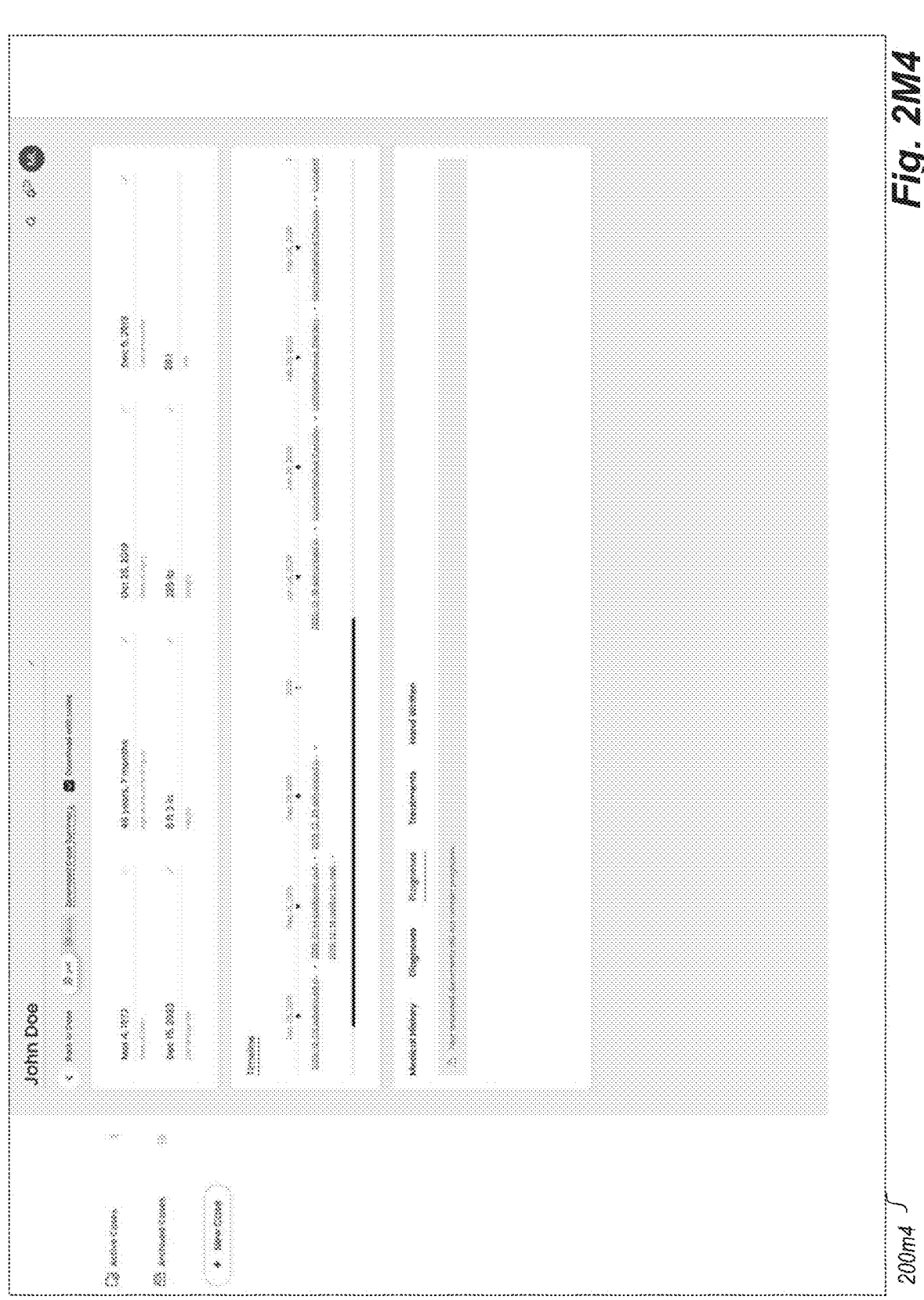
Fig. 2M4

Fig. 2M5

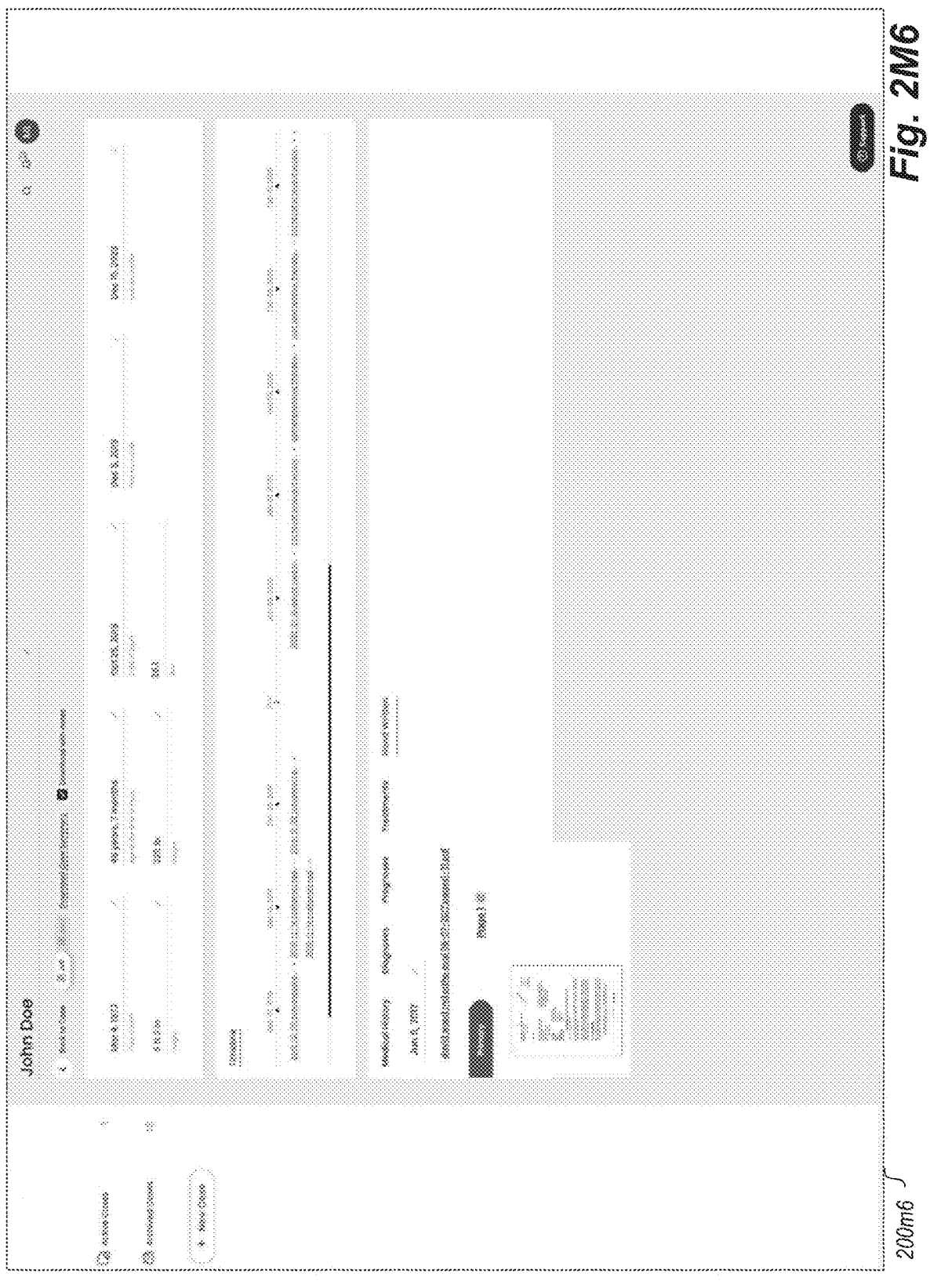
Fig. 2M6

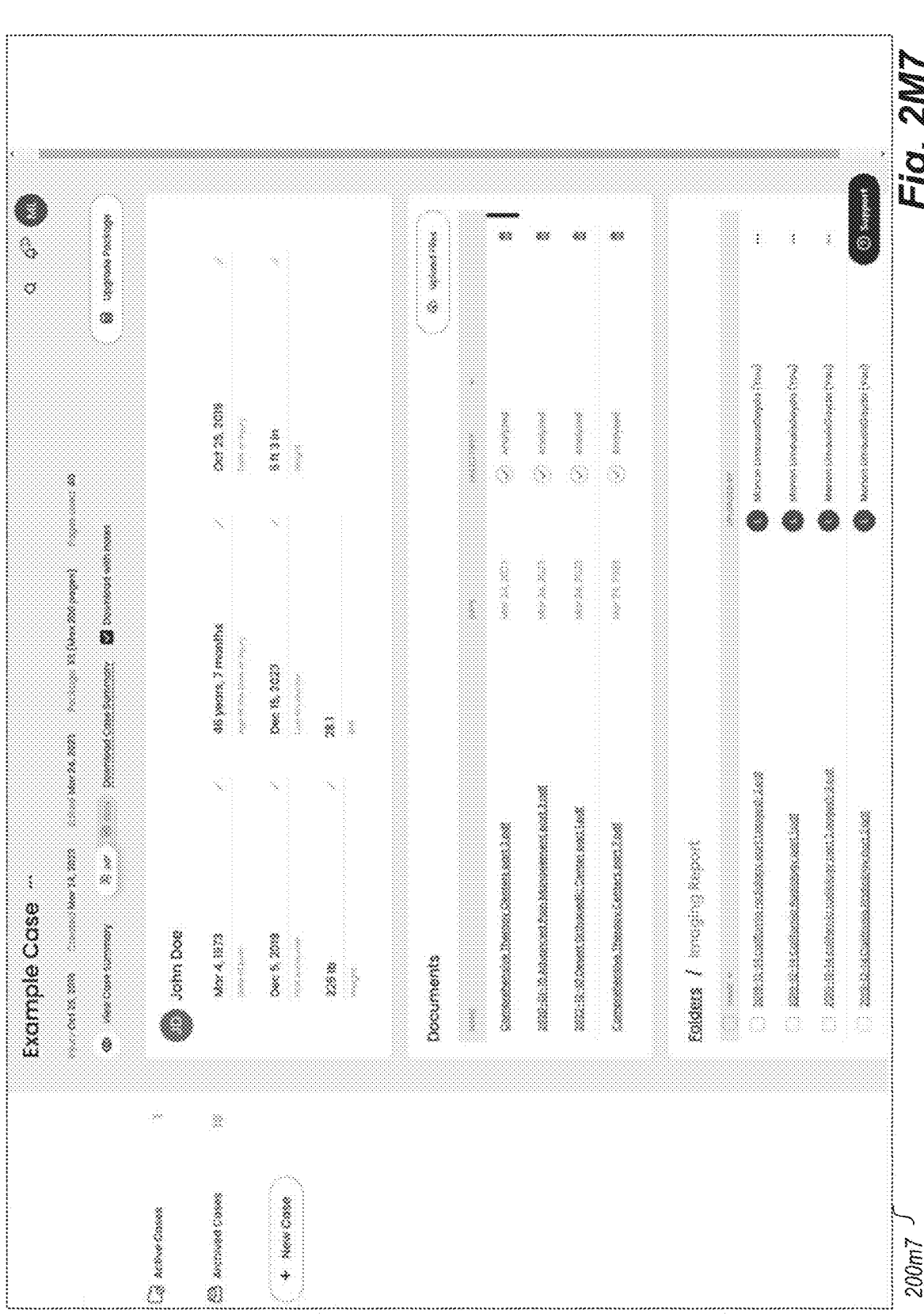
Fig. 2M7

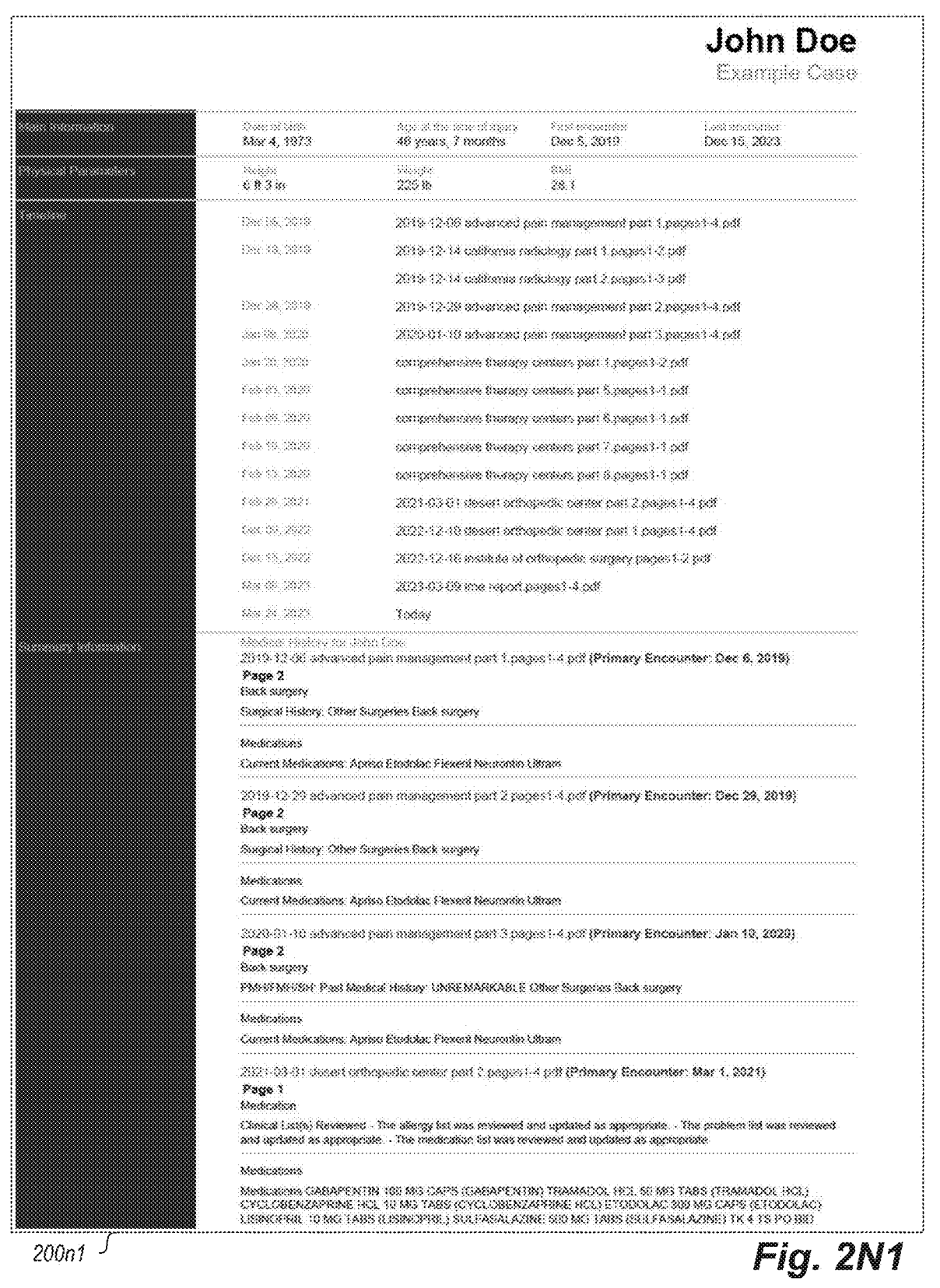

John Doe
Example Case

Date of birth
Mar 4, 1973

Age at the onset of injury
46 years, 7 months

First encounter
Dec 6, 2019

Last encounter
Dec 15, 2023

Height
6 ft 3 in

Weight
225 lb

BMI
28.1

Dec 06, 2019    2019-12-06 advanced pain management part 1 pages 1-4.pdf

Dec 13, 2019    2019-12-14 california radiology part 1 pages 1-2.pdf 2019-12-14 california radiology part 2 pages 1-3.pdf Dec 29, 2019    2019-12-29 advanced pain management part 2 pages 1-4.pdf Jan 08, 2020    2020-01-10 advanced pain management part 3 pages 1-4.pdf Jan 30, 2020    comprehensive therapy centers part 1 pages 1-2.pdf Feb 05, 2020    comprehensive therapy centers part 5 pages 1-1.pdf Feb 08, 2020    comprehensive therapy centers part 6 pages 1-1.pdf Feb 10, 2020    comprehensive therapy centers part 7 pages 1-1.pdf Feb 13, 2020    comprehensive therapy centers part 8 pages 1-1.pdf Feb 29, 2021    2021-03-01 desert orthopedic center part 2 pages 1-4.pdf Dec 05, 2022    2022-12-10 desert orthopedic center part 1 pages 1-4.pdf Dec 15, 2022    2022-12-16 institute of orthopedic surgery pages 1-2.pdf Mar 08, 2023    2023-03-09 ime report pages 1-4.pdf Mar 24, 2023    Today Medical History for John Doe
2019-12-06 advanced pain management part 1 pages 1-4.pdf (Primary Encounter: Dec 6, 2019)
Page 2
Back surgery
Surgical History: Other Surgeries Back surgery Medications
Current Medications: Apriso Etodolac Flexeril Neurontin Ultram 2019-12-29 advanced pain management part 2 pages 1-4.pdf (Primary Encounter: Dec 29, 2019)
Page 2
Back surgery
Surgical History: Other Surgeries Back surgery Medications
Current Medications: Apriso Etodolac Flexeril Neurontin Ultram 2020-01-10 advanced pain management part 3 pages 1-4.pdf (Primary Encounter: Jan 10, 2020)
Page 2
Back surgery
PMH/PMHSH Past Medical History: UNREMARKABLE Other Surgeries Back surgery Medications
Current Medications: Apriso Etodolac Flexeril Neurontin Ultram 2021-03-01 desert orthopedic center part 2 pages 1-4.pdf (Primary Encounter: Mar 1, 2021)
Page 1
Medication
Clinical List(s) Reviewed - The allergy list was reviewed and updated as appropriate. - The problem list was reviewed and updated as appropriate. - The medication list was reviewed and updated as appropriate Medications
Medications GABAPENTIN 100 MG CAPS (GABAPENTIN) TRAMADOL HCL 50 MG TABS (TRAMADOL HCL) CYCLOBENZAPRINE HCL 10 MG TABS (CYCLOBENZAPRINE HCL) ETODOLAC 300 MG CAPS (ETODOLAC) LISINOPRIL 10 MG TABS (LISINOPRIL) SULFASALAZINE 500 MG TABS (SULFASALAZINE) TK 4 TS PO BID 200n1

*Fig. 2N1*

Figure 2N2:
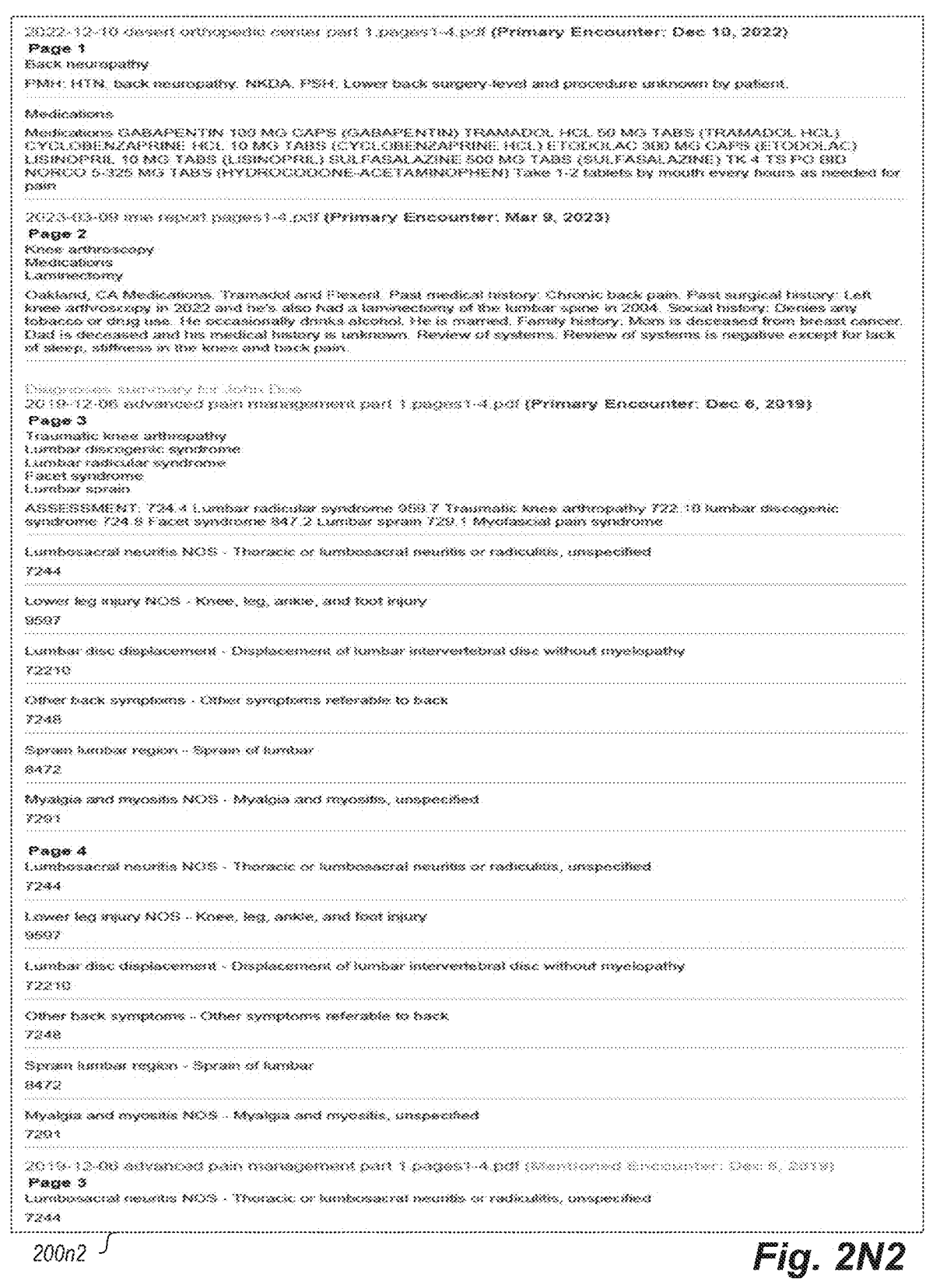

2022-12-10 desert orthopedic center part 1 pages1-4.pdf (Primary Encounter: Dec 10, 2022)
Page 1
Back neuropathy
PMH: HTN, back neuropathy. NKDA. PSH: Lower back surgery-level and procedure unknown by patient.

Medications
Medications GABAPENTIN 100 MG CAPS (GABAPENTIN) TRAMADOL HCL 50 MG TABS (TRAMADOL HCL) CYCLOBENZAPRINE HCL 10 MG TABS (CYCLOBENZAPRINE HCL) ETODOLAC 300 MG CAPS (ETODOLAC) LISINOPRIL 10 MG TABS (LISINOPRIL) SULFASALAZINE 500 MG TABS (SULFASALAZINE) TK 4 TS PO BID NORCO 5-325 MG TABS (HYDROCODONE-ACETAMINOPHEN) Take 1-2 tablets by mouth every hours as needed for pain 2023-03-09 ime report pages1-4.pdf (Primary Encounter: Mar 9, 2023)
Page 2
Knee arthroscopy
Medications
Laminectomy Oakland, CA Medications. Tramadol and Flexeril. Past medical history: Chronic back pain. Past surgical history: Left knee arthroscopy in 2022 and he's also had a laminectomy of the lumbar spine in 2004. Social history: Denies any tobacco or drug use. He occasionally drinks alcohol. He is married. Family history: Mom is deceased from breast cancer. Dad is deceased and his medical history is unknown. Review of systems. Review of systems is negative except for lack of sleep, stiffness in the knee and back pain.

Diagnoses summary for John Doe
2019-12-06 advanced pain management part 1 pages1-4.pdf (Primary Encounter: Dec 6, 2019)
Page 3
Traumatic knee arthropathy
Lumbar discogenic syndrome
Lumbar radicular syndrome
Facet syndrome
Lumbar sprain
ASSESSMENT: 724.4 Lumbar radicular syndrome 959.7 Traumatic knee arthropathy 722.10 lumbar discogenic syndrome 724.8 Facet syndrome 847.2 Lumbar sprain 729.1 Myofascial pain syndrome Lumbosacral neuritis NOS - Thoracic or lumbosacral neuritis or radiculitis, unspecified
7244

Lower leg injury NOS - Knee, leg, ankle, and foot injury
9597

Lumbar disc displacement - Displacement of lumbar intervertebral disc without myelopathy
72210

Other back symptoms - Other symptoms referable to back
7248

Sprain lumbar region - Sprain of lumbar
8472

Myalgia and myositis NOS - Myalgia and myositis, unspecified
7291

Page 4
Lumbosacral neuritis NOS - Thoracic or lumbosacral neuritis or radiculitis, unspecified
7244

Lower leg injury NOS - Knee, leg, ankle, and foot injury
9597

Lumbar disc displacement - Displacement of lumbar intervertebral disc without myelopathy
72210

Other back symptoms - Other symptoms referable to back
7248

Sprain lumbar region - Sprain of lumbar
8472

Myalgia and myositis NOS - Myalgia and myositis, unspecified
7291

2019-12-06 advanced pain management part 1 pages1-4.pdf (Mentioned Encounter: Dec 6, 2019)
Page 3
Lumbosacral neuritis NOS - Thoracic or lumbosacral neuritis or radiculitis, unspecified
7244

Lower leg injury NOS - Knee, leg, ankle, and foot injury
9597

Lumbar disc displacement - Displacement of lumbar intervertebral disc without myelopathy
72210

Other back symptoms - Other symptoms referable to back
7248

Sprain lumbar region - Sprain of lumbar
8472

Myalgia and myositis NOS - Myalgia and myositis, unspecified
7291

2019-12-06 advanced pain management part 1 pages1-4.pdf (Mentioned Encounter: Dec 6, 2019)
Page 4
Lumbosacral neuritis NOS - Thoracic or lumbosacral neuritis or radiculitis, unspecified
7244

Lower leg injury NOS - Knee, leg, ankle, and foot injury
9597

Lumbar disc displacement - Displacement of lumbar intervertebral disc without myelopathy
72210

Other back symptoms - Other symptoms referable to back
7248

Sprain lumbar region - Sprain of lumbar
8472

Myalgia and myositis NOS - Myalgia and myositis, unspecified
7291

2019-12-14 california radiology part 1 pages1-2.pdf (Primary Encounter: Dec 14, 2019)
Page 1
Prepatellar soft tissue edema
Patellofemoral compartment articular cartilage changes
Infrapatellar plica posttraumatic
Popliteus tendon sheath joint fluid
Anterior patellar tendon tendinosis
Infrapatellar plica thickening
Marrow T2 signal Findings: MRI of the left knee without contrast was performed using T1 weighting and T2 weighting in axial, coronal and sagittal planes. No previous comparisons: The medial and lateral menisci are intact. The anterior and posterior cruciate ligaments, medial and lateral collateral ligaments and the quadriceps tendon are intact. There is mild tendinosis of the patellar tendon. There is thickening of the infrapatellar plica, which could be posttraumatic or inflammatory. Also noted is mild prepatellar soft tissue edema. There are early articular cartilage changes in the, patellofemoral compartment. There is a small amount of joint fluid extending along the popliteus tendon sheath. No significant Baker's cyst. There is intermediate T1 signal in the marrow likely representing red marrow.

Page 2
Infrapatellar plica
Patellar tendon tendinosis
Prepatellar soft tissue edema Impression: Mild tendinosis of the patellar tendon. Prepatellar soft tissue edema. . Thickening of the infrapatellar plica, which could be posttraumatic or inflammatory. BK/ddw comprehensive therapy centers part 1 pages1-2.pdf (Primary Encounter: Jan 21, 2020)
Page 2
Limited activity tolerance
Rehab Potential Good
Functional mobility
L side depressed reflexes
Pleasant
LBP Assessment Long In 4 weeks 1. Pt will report 80% decrease with LE symptoms frequency 2. Pt will be able to self correct posture 80-100% of the time 3. Pt will regain 5/5 L Estrength Assessment This pleasant 41 year old male presents with intermittent LBP, entire L LE pain, decreased strength and depressed reflexes on the L side as well as limited activity tolerance and functional mobility. These impairments are not allowing the patient to perform all normal ADL. Skilled PT is required to correct the impairments and return the patient to normal, pain free ADL. Pt was educated on proper posture and positioning when sitting and sleeping to decrease symptoms. Rehab Potential Good. Patient understands diagnosis/prognosis and consents with treatment above: Yes 200n3

*Fig. 2N3* comprehensive therapy centers part 5 pages1-1.pdf (Primary Encounter: Feb 4, 2020)

Page 1
Unable to tolerate mobs
Lumbar PA's (A) Pt still has considerable amount of pain with lumbar PA's and is unable to tolerate mobs greater than grade II. Pt will benefit from increasing lumbar extension ROM comprehensive therapy centers part 6 pages1-1.pdf (Primary Encounter: Feb 7, 2020)

Page 1
Unable to tolerate mobs
Lumbar PA's (A) Pt still has considerable amount of pain with lumbar PA's and is unable to tolerate mobs greater than grade II. Pt will benefit from increasing lumbar extension ROM comprehensive therapy centers part 7 pages1-1.pdf (Primary Encounter: Feb 11, 2020)

Page 1
Unable to tolerate mobs
Lumbar PA's (A) Pt still has considerable amount of pain with lumbar PA's and is unable to tolerate mobs greater than grade II. Pt will benefit from increasing lumbar extension ROM comprehensive therapy centers part 8 pages1-1.pdf (Primary Encounter: Feb 14, 2020)

Page 1
Ability to self correct posture
Perform prolonged activity
Postural awareness
Symptoms Assessment Pt made excellent progress with L LE radicular symptoms as well as LBP as a result of therapy. Pt improved with postural awareness and ability to self correct posture. Pt is now able to perform prolonged activity, such as sitting and driving w/o increase in symptoms. Pt will benefit from few more therapy visits to ensure independence with HEP.

2022-12-10 desert orthopedic center part 1 pages1-4.pdf (Primary Encounter: Dec 10, 2022)

Page 3
Left knee medial sided tear
Left knee medial plica

Impression Left knee medial sided tear, medial plica 2022-12-16 institute of orthopedic surgery.pages1-2.pdf (Primary Encounter: Dec 16, 2022)

Page 1
Left knee plica

PRE-OPERATIVE DIAGNOSIS: Left knee, plica.

Left patella knee chondral injury
Patellofemoral joint Synovitis

POST-OPERATIVE DIAGNOSES: 1. Left knee, chondral injury of the patella. 2. Synovitis of the patellofemoral joint.

2019-12-14 california radiology part 2 pages1-3.pdf (Primary Encounter: Dec 14, 2019)

Page 1
Intervertebral disc height
Facet joint hypertrophic changes
Disc desiccation
Right lateral neural foramina recess narrowing
Posterior bulge At L2-3, there is mild decrease in intervertebral disc height and disc desiccation. There is broad-based posterior annular bulge with ligamentum flavum and facet joint hypertrophic changes causing mild to moderate narrowing of the right lateral recess and right neural foramina and mild narrowing of the left lateral recess left neural foramina. The AP diameter of the spinal canal is 1.9 cm.

Page 2
Schmorl's nodes intervertebral disc height
Central disc protrusion
Left spinal canal hemilaminectomy changes
Disc osteophyte complex
Facet joint hypertrophic changes
L4-L5 spinal canal disc desiccation
Intervertebral disc Schmorl's nodes endplate changes
Left lateral neural foramina narrowing
Posterior L3-4 bulge At L3-4, there is broad-based posterior annular bulge with ligamentum flavum and facet joint hypertrophic changes causing moderate narrowing of the left lateral recess and left neural foramina and mild to moderate narrowing of the right lateral recess and right neural foramina. The AP diameter of the spinal canal is 1.9 cm. At L4-L5, there is disc desiccation and broad-based posterior annular bulge. There is approximately 3 mm central disc protrusion. There is ligamentum flavum and facet joint hypertrophic changes. Combination of these findings causes moderate-to-severe narrowing of the lateral recess and neural foramina. The AP diameter of the spinal canal is 1.4 cm. There are left hemilaminectomy changes. At L5-S1, there is mild to moderate decrease in intervertebral disc height, endplate changes and Schmorl's nodes. There is broad-based disc osteophyte complex with ligamentum flavum and facet joint hypertrophic changes causing moderate to severe narrowing of the lateral recess and neural The AP diameter of the spinal canal is 1.5 cm. There are left hemilaminectomy changes.

Figure 2N5:
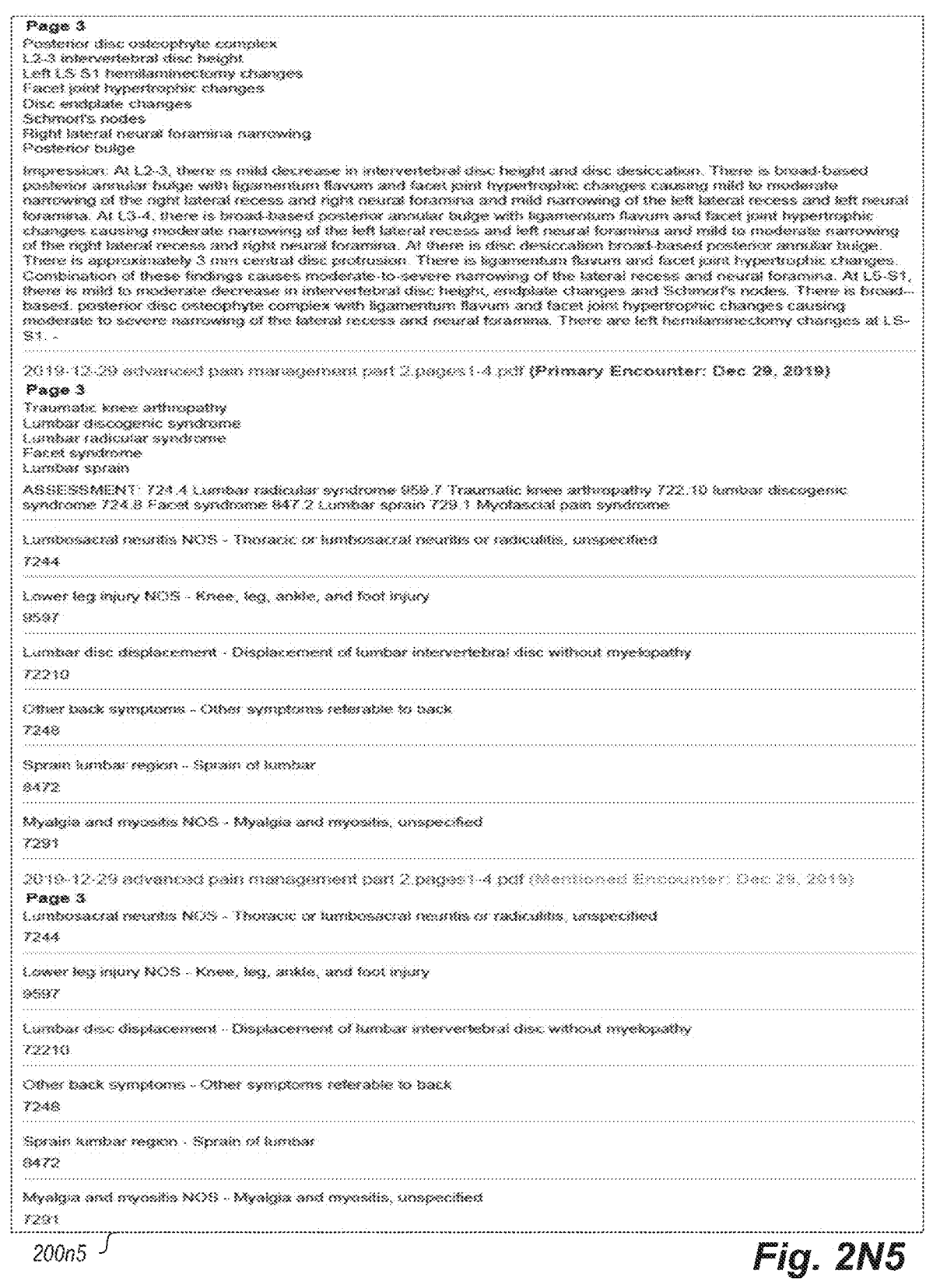

Page 3
Posterior disc osteophyte complex
L2-3 intervertebral disc height
Left L5-S1 hemilaminectomy changes
Facet joint hypertrophic changes
Disc endplate changes
Schmorl's nodes
Right lateral neural foramina narrowing
Posterior bulge Impression: At L2-3, there is mild decrease in intervertebral disc height and disc desiccation. There is broad-based posterior annular bulge with ligamentum flavum and facet joint hypertrophic changes causing mild to moderate narrowing of the right lateral recess and right neural foramina and mild narrowing of the left lateral recess and left neural foramina. At L3-4, there is broad-based posterior annular bulge with ligamentum flavum and facet joint hypertrophic changes causing moderate narrowing of the left lateral recess and left neural foramina and mild to moderate narrowing of the right lateral recess and right neural foramina. At there is disc desiccation broad-based posterior annular bulge. There is approximately 3 mm central disc protrusion. There is ligamentum flavum and facet joint hypertrophic changes. Combination of these findings causes moderate-to-severe narrowing of the lateral recess and neural foramina. At L5-S1, there is mild to moderate decrease in intervertebral disc height, endplate changes and Schmorl's nodes. There is broad-based posterior disc osteophyte complex with ligamentum flavum and facet joint hypertrophic changes causing moderate to severe narrowing of the lateral recess and neural foramina. There are left hemilaminectomy changes at L5-S1. -

2019-12-29 advanced pain management part 2.pages 1-4.pdf (Primary Encounter: Dec 29, 2019)
Page 3
Traumatic knee arthropathy
Lumbar discogenic syndrome
Lumbar radicular syndrome
Facet syndrome
Lumbar sprain ASSESSMENT: 724.4 Lumbar radicular syndrome 959.7 Traumatic knee arthropathy 722.10 lumbar discogenic syndrome 724.8 Facet syndrome 847.2 Lumbar sprain 729.1 Myofascial pain syndrome Lumbosacral neuritis NOS - Thoracic or lumbosacral neuritis or radiculitis, unspecified
7244

Lower leg injury NOS - Knee, leg, ankle, and foot injury
9597

Lumbar disc displacement - Displacement of lumbar intervertebral disc without myelopathy
72210

Other back symptoms - Other symptoms referable to back
7248

Sprain lumbar region - Sprain of lumbar
8472

Myalgia and myositis NOS - Myalgia and myositis, unspecified
7291

2019-12-29 advanced pain management part 2.pages 1-4.pdf (Mentioned Encounter: Dec 29, 2019)
Page 3
Lumbosacral neuritis NOS - Thoracic or lumbosacral neuritis or radiculitis, unspecified
7244

Lower leg injury NOS - Knee, leg, ankle, and foot injury
9597

Lumbar disc displacement - Displacement of lumbar intervertebral disc without myelopathy
72210

Other back symptoms - Other symptoms referable to back
7248

Sprain lumbar region - Sprain of lumbar
8472

Myalgia and myositis NOS - Myalgia and myositis, unspecified
7291

Figure 2N6:
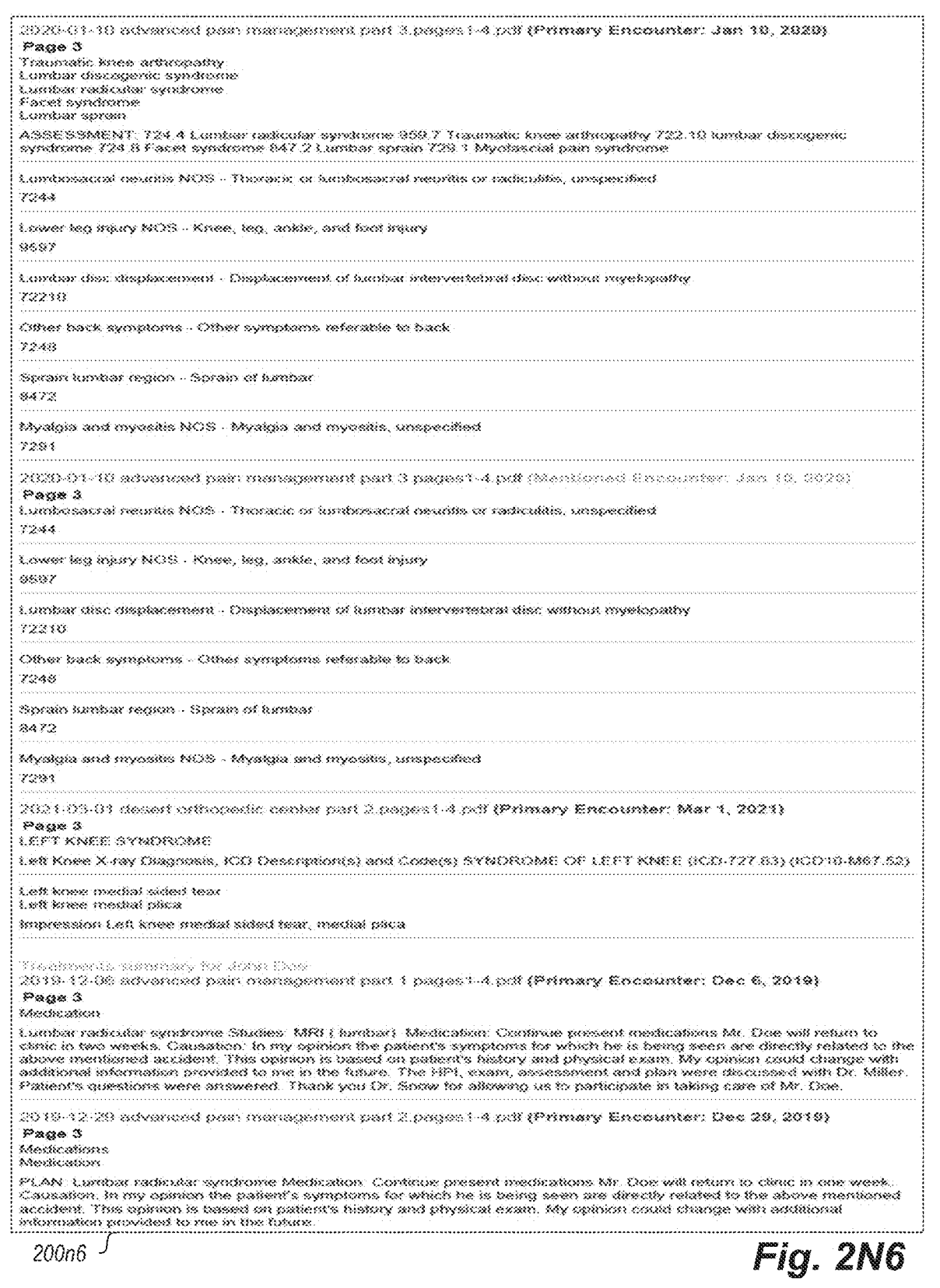

2020-01-10 advanced pain management part 3 pages 1-4.pdf (Primary Encounter: Jan 10, 2020)
Page 3
Traumatic knee arthropathy
Lumbar discogenic syndrome
Lumbar radicular syndrome
Facet syndrome
Lumbar sprain
ASSESSMENT: 724.4 Lumbar radicular syndrome 959.7 Traumatic knee arthropathy 722.10 lumbar discogenic syndrome 724.8 Facet syndrome 847.2 Lumbar sprain 729.1 Myofascial pain syndrome Lumbosacral neuritis NOS - Thoracic or lumbosacral neuritis or radiculitis, unspecified
724.4

Lower leg injury NOS - Knee, leg, ankle, and foot injury
959.7

Lumbar disc displacement - Displacement of lumbar intervertebral disc without myelopathy
722.10

Other back symptoms - Other symptoms referable to back
724.8

Sprain lumbar region - Sprain of lumbar
847.2

Myalgia and myositis NOS - Myalgia and myositis, unspecified
729.1

2020-01-10 advanced pain management part 3 pages 1-4.pdf (Mentioned Encounter: Jan 10, 2020)
Page 3
Lumbosacral neuritis NOS - Thoracic or lumbosacral neuritis or radiculitis, unspecified
724.4

Lower leg injury NOS - Knee, leg, ankle, and foot injury
959.7

Lumbar disc displacement - Displacement of lumbar intervertebral disc without myelopathy
722.10

Other back symptoms - Other symptoms referable to back
724.8

Sprain lumbar region - Sprain of lumbar
847.2

Myalgia and myositis NOS - Myalgia and myositis, unspecified
729.1

2021-03-01 desert orthopedic center part 2 pages 1-4.pdf (Primary Encounter: Mar 1, 2021)
Page 3
LEFT KNEE SYNDROME
Left Knee X-ray Diagnosis, ICD Description(s) and Code(s) SYNDROME OF LEFT KNEE (ICD-727.83) (ICD10-M67.52)

Left knee medial sided tear
Left knee medial plica
Impression: Left knee medial sided tear, medial plica Treatment summary for John Doe
2019-12-06 advanced pain management part 1 pages 1-4.pdf (Primary Encounter: Dec 6, 2019)
Page 3
Medication
Lumbar radicular syndrome Studies: MRI ( lumbar) Medication: Continue present medications Mr. Doe will return to clinic in two weeks. Causation: In my opinion the patient's symptoms for which he is being seen are directly related to the above mentioned accident. This opinion is based on patient's history and physical exam. My opinion could change with additional information provided to me in the future. The HPI, exam, assessment and plan were discussed with Dr. Miller. Patient's questions were answered. Thank you Dr. Snow for allowing us to participate in taking care of Mr. Doe.

2019-12-29 advanced pain management part 2 pages 1-4.pdf (Primary Encounter: Dec 29, 2019)
Page 3
Medications
Medication
PLAN: Lumbar radicular syndrome Medication: Continue present medications Mr. Doe will return to clinic in one week. Causation: In my opinion the patient's symptoms for which he is being seen are directly related to the above mentioned accident. This opinion is based on patient's history and physical exam. My opinion could change with additional information provided to me in the future.

2020-01-10 advanced pain management part 3 pages 1-4.pdf (Primary Encounter: Jan 10, 2020)

Page 3
Transforaminal epidural steroid injection
Medications
Treatments
Procedure Lumbar radicular syndrome Medication: Continue present medications Recommend – bilateral LS (L5-S1) and S1 transforaminal epidural steroid injection(s). For therapeutic and diagnostic purposes. The procedure, risks, benefits and alternative treatments have been explained to the patient. All his questions have been answered. Mr. Doe will return to clinic after the procedure. He would like to wait to schedule the recommended procedure until he knows what his out of pocket will be. Causation: In my opinion the patient's symptoms for which he is being seen are directly related to the above mentioned accident. This opinion is based on patient's history and physical exam. My opinion could change with additional information provided to me in the future.

comprehensive therapy centers part 1 pages 1-2.pdf (Primary Encounter: Jan 21, 2020)

Page 2
Electrical stimulation
Therapeutic exercises
Restore joint motion
Hot/cold pack
Treatment I will establish a treatment program to include electrical stimulation and hot/cold pack to reduce pain and inflammation. Manual techniques and therapeutic exercises will be used to restore joint motion and strength, functional activities will be used to restore ADL and I will develop a home program for this patient. and Duration comprehensive therapy centers part 5 pages 1-1.pdf (Primary Encounter: Feb 4, 2020)

Page 1
Treatment (P) Continue with current treatment plan comprehensive therapy centers part 6 pages 1-1.pdf (Primary Encounter: Feb 7, 2020)

Page 1
Treatment (P) Continue with current treatment plan comprehensive therapy centers part 7 pages 1-1.pdf (Primary Encounter: Feb 11, 2020)

Page 1
Treatment (P) Continue with current treatment plan comprehensive therapy centers part 8 pages 1-1.pdf (Primary Encounter: Feb 14, 2020)

Page 1
Physical Therapy

Physical Therapy Plan I recommend we continue on our established plan of care. Frequency and Duration _1-2_ times per week for 2_ weeks 2021-03-01 desert orthopedic center part 2 pages 1-4.pdf (Primary Encounter: Mar 1, 2021)

Page 3
Surgical interventions
Treatment
Surgery

Plan Explanation and reassurance were provided to the patient. I discussed a treatment plan in detail with patient. All of the patient's questions were answered. He has failed all non-surgical treatment. I discussed all treatment options including non-surgical and surgical interventions. We discussed proceeding with an arthroscopy to address the plica and to evaluate the medial compartment for further pathology. The patient is starting a new job and will need to clear out the best time to move forward on surgery. He will call when he is ready to schedule.

2022-12-10 desert orthopedic center part 1 pages 1-4.pdf (Primary Encounter: Dec 10, 2022)

Page 3
Left knee arthroscopic plica excision
Remove sutures
Treatment
Procedure
Surgery Plan Explanation and reassurance were provided to the patient. I discussed a treatment plan in detail with patient. All of the patient's questions were answered. I reviewed exam and imaging studies with patient and discussed a treatment plan in detail with patient as well. All of the patient's questions were answered regarding the treatment plan. Patient is scheduled for a left knee arthroscopic plica excision on 12/16/2032. We discussed the procedure as well as expected recovery and possible side effects. He was given a prescription for Norco 5-325 mg for pain to be taken after the surgery. We will see him back for his first follow-up but 10 days after surgery to remove sutures and evaluate his knee range of motion.

Modified activity
Knee arthroscopy
Relative rest

After discussion with the patient, I have recommended left knee arthroscopy for left plica excision. The nature of the patient's clinical problem was explained in detail along with the alternative forms of treatment, which include continued observation, relative rest, or modified activity. The surgical alternatives were also discussed in detail including the procedure itself, the intended benefits, limitations and risks, specifically as they are related to associated pathology such as degenerative 200n7

Fig. 2N7

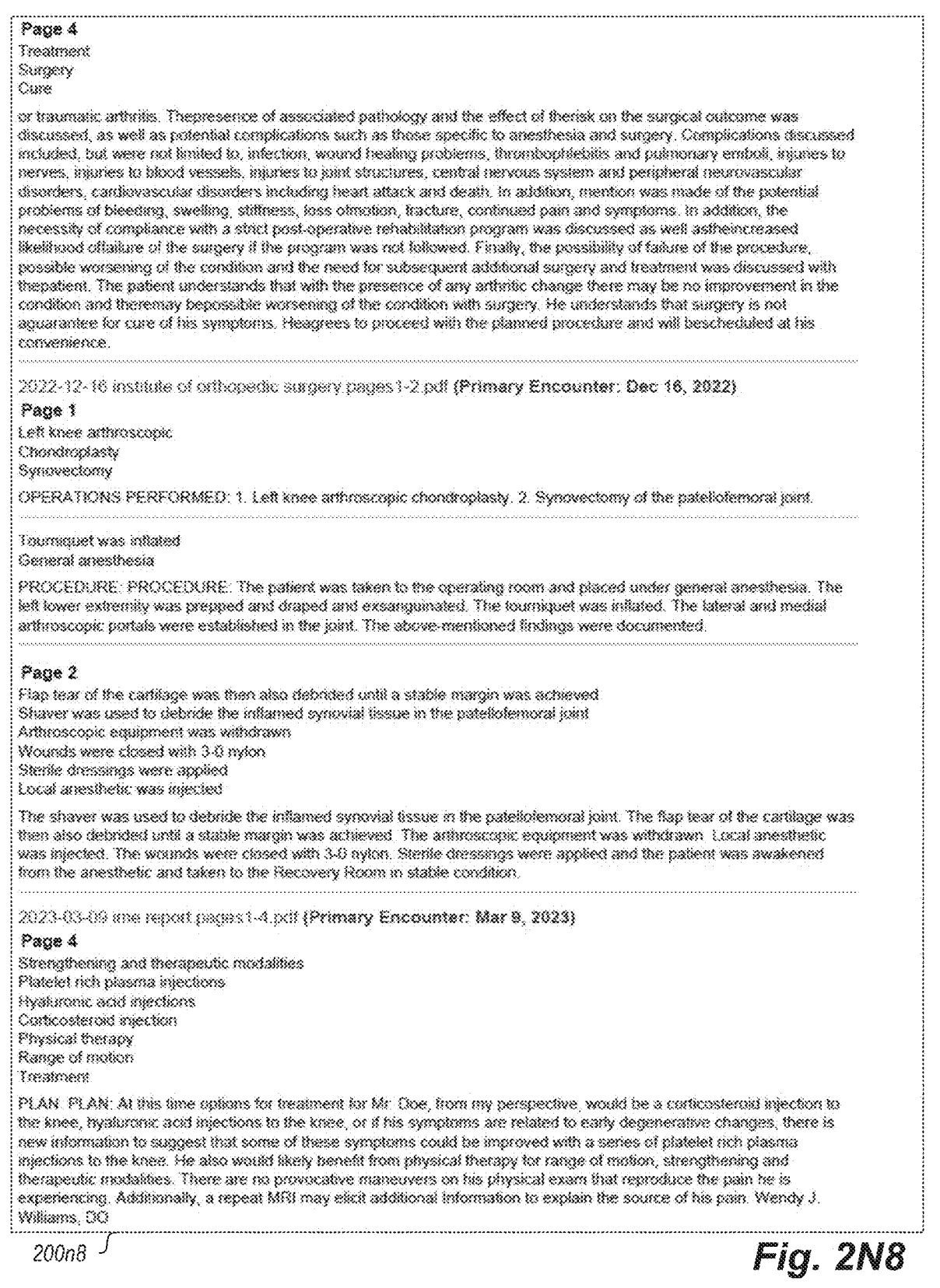

Page 4
Treatment
Surgery
Cure or traumatic arthritis. Thepresence of associated pathology and the effect of therisk on the surgical outcome was discussed, as well as potential complications such as those specific to anesthesia and surgery. Complications discussed included, but were not limited to, infection, wound healing problems, thrombophlebitis and pulmonary emboli, injuries to nerves, injuries to blood vessels, injuries to joint structures, central nervous system and peripheral neurovascular disorders, cardiovascular disorders including heart attack and death. In addition, mention was made of the potential problems of bleeding, swelling, stiffness, loss ofmotion, fracture, continued pain and symptoms. In addition, the necessity of compliance with a strict post-operative rehabilitation program was discussed as well astheincreased likelihood offailure of the surgery if the program was not followed. Finally, the possibility of failure of the procedure, possible worsening of the condition and the need for subsequent additional surgery and treatment was discussed with thepatient. The patient understands that with the presence of any arthritic change there may be no improvement in the condition and theremay bepossible worsening of the condition with surgery. He understands that surgery is not aguarantee for cure of his symptoms. Heagrees to proceed with the planned procedure and will bescheduled at his convenience.

2022-12-16 institute of orthopedic surgery pages1-2.pdf (Primary Encounter: Dec 16, 2022)
Page 1
Left knee arthroscopic
Chondroplasty
Synovectomy OPERATIONS PERFORMED: 1. Left knee arthroscopic chondroplasty. 2. Synovectomy of the patellofemoral joint.

Tourniquet was inflated
General anesthesia

PROCEDURE: PROCEDURE: The patient was taken to the operating room and placed under general anesthesia. The left lower extremity was prepped and draped and exsanguinated. The tourniquet was inflated. The lateral and medial arthroscopic portals were established in the joint. The above-mentioned findings were documented.

Page 2
Flap tear of the cartilage was then also debrided until a stable margin was achieved
Shaver was used to debride the inflamed synovial tissue in the patellofemoral joint
Arthroscopic equipment was withdrawn
Wounds were closed with 3-0 nylon
Sterile dressings were applied
Local anesthetic was injected The shaver was used to debride the inflamed synovial tissue in the patellofemoral joint. The flap tear of the cartilage was then also debrided until a stable margin was achieved. The arthroscopic equipment was withdrawn. Local anesthetic was injected. The wounds were closed with 3-0 nylon. Sterile dressings were applied and the patient was awakened from the anesthetic and taken to the Recovery Room in stable condition.

2023-03-09 ame report pages1-4.pdf (Primary Encounter: Mar 9, 2023)
Page 4
Strengthening and therapeutic modalities
Platelet rich plasma injections
Hyaluronic acid injections
Corticosteroid injection
Physical therapy
Range of motion
Treatment PLAN: PLAN: At this time options for treatment for Mr. Doe, from my perspective, would be a corticosteroid injection to the knee, hyaluronic acid injections to the knee, or if his symptoms are related to early degenerative changes, there is new information to suggest that some of these symptoms could be improved with a series of platelet rich plasma injections to the knee. He also would likely benefit from physical therapy for range of motion, strengthening and therapeutic modalities. There are no provocative maneuvers on his physical exam that reproduce the pain he is experiencing. Additionally, a repeat MRI may elicit additional information to explain the source of his pain. Wendy J. Williams, DO 200n8

*Fig. 2N8*

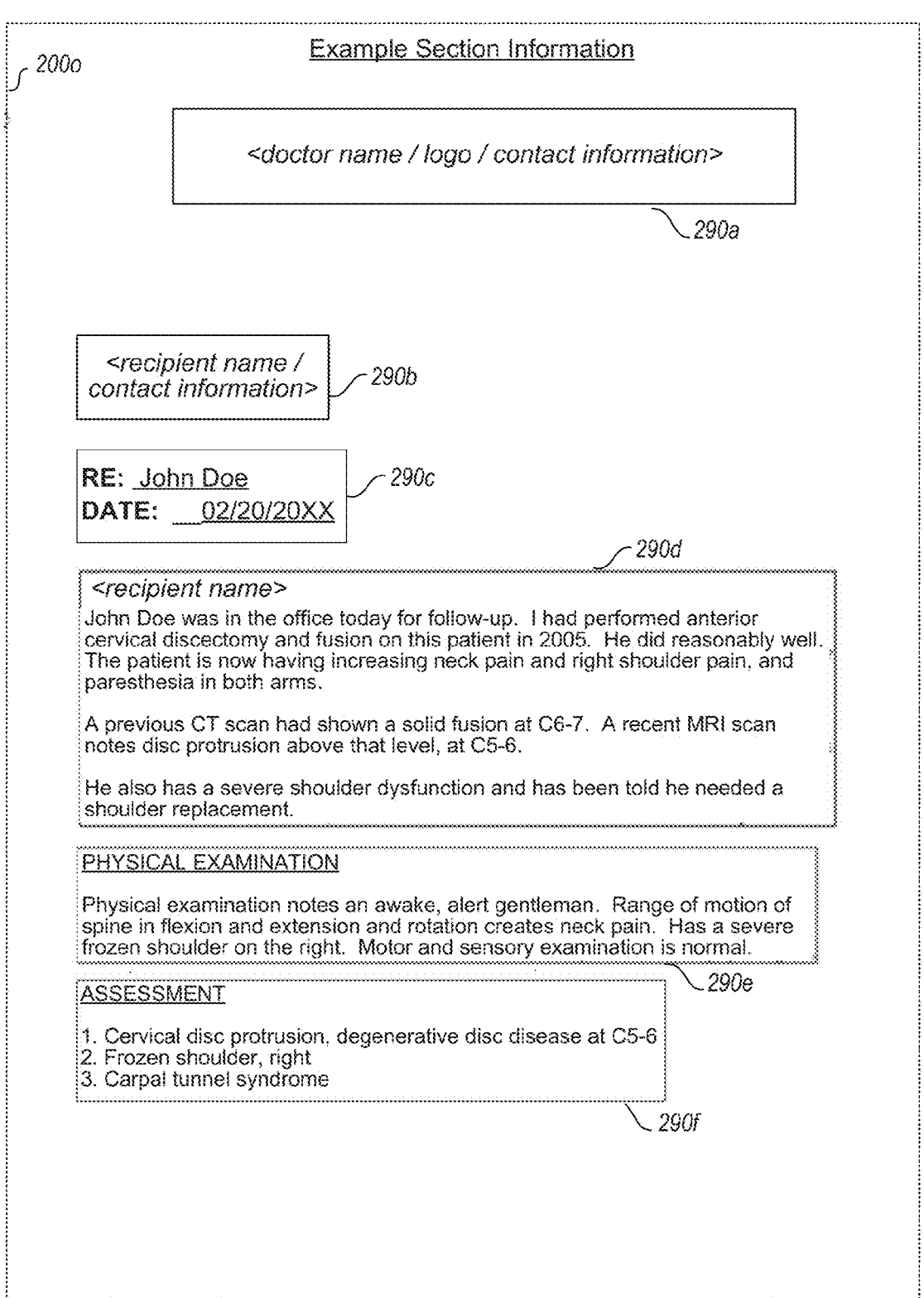
Fig. 2-O

Example Section Information *(continued)*

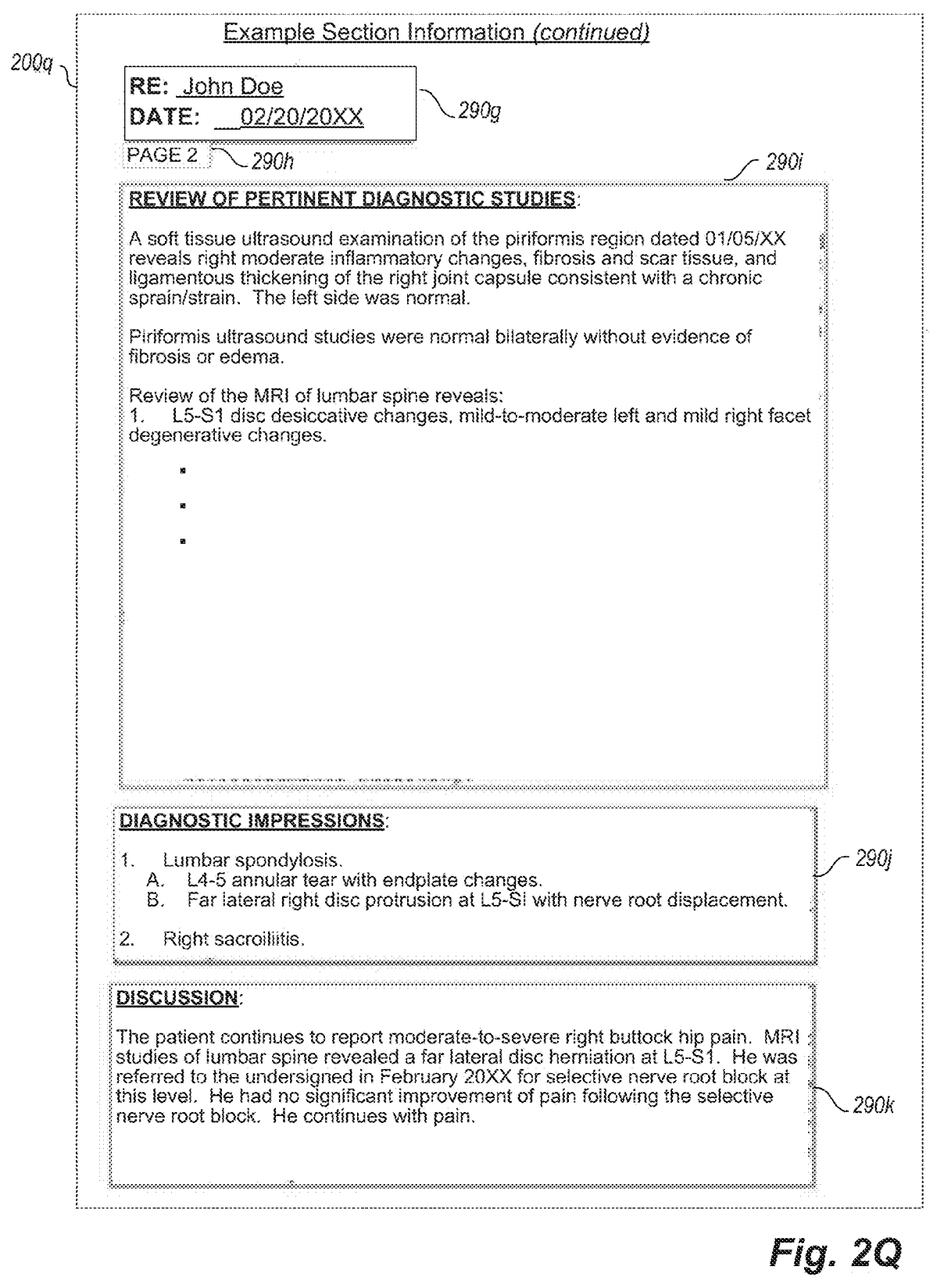

Example Section Information *(continued)*

200q

RE:  John Doe
DATE:  02/20/20XX  — 290g

PAGE 2  — 290h                                                                      290i

REVIEW OF PERTINENT DIAGNOSTIC STUDIES:

A soft tissue ultrasound examination of the piriformis region dated 01/05/XX reveals right moderate inflammatory changes, fibrosis and scar tissue, and ligamentous thickening of the right joint capsule consistent with a chronic sprain/strain. The left side was normal.

Piriformis ultrasound studies were normal bilaterally without evidence of fibrosis or edema.

Review of the MRI of lumbar spine reveals:
1.   L5-S1 disc desiccative changes, mild-to-moderate left and mild right facet degenerative changes.

DIAGNOSTIC IMPRESSIONS:

1.   Lumbar spondylosis.                                                          290j
     A.   L4-5 annular tear with endplate changes.
     B.   Far lateral right disc protrusion at L5-S1 with nerve root displacement.

2.   Right sacroiliitis.

DISCUSSION:

The patient continues to report moderate-to-severe right buttock hip pain. MRI studies of lumbar spine revealed a far lateral disc herniation at L5-S1. He was referred to the undersigned in February 20XX for selective nerve root block at this level. He had no significant improvement of pain following the selective nerve root block. He continues with pain.  — 290k

*Fig. 2Q*

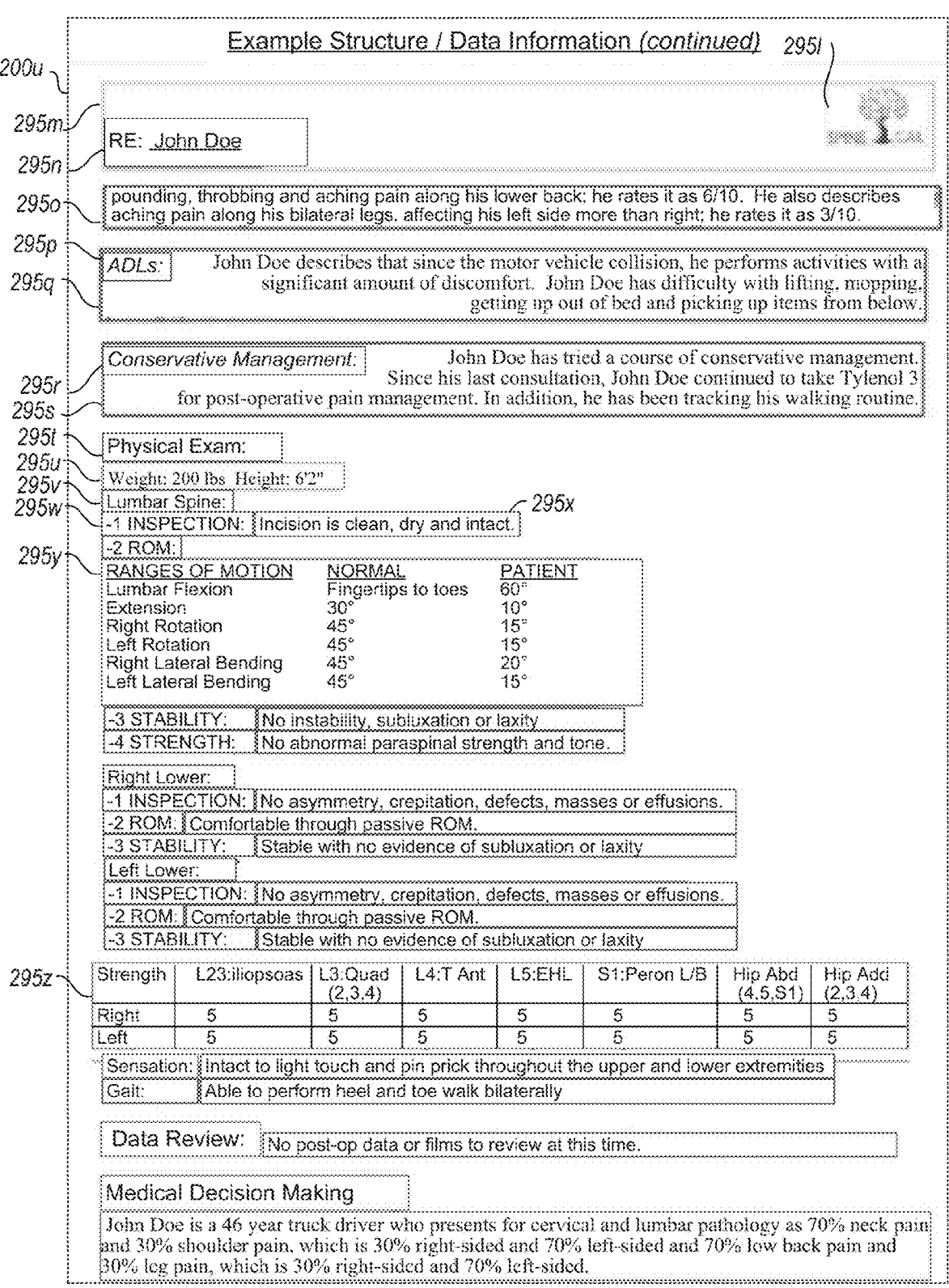

Example Structure / Data Information *(continued)*   295*l*

RE:  John Doe pounding, throbbing and aching pain along his lower back; he rates it as 6/10. He also describes aching pain along his bilateral legs, affecting his left side more than right; he rates it as 3/10.

*ADLs:*    John Doe describes that since the motor vehicle collision, he performs activities with a significant amount of discomfort.  John Doe has difficulty with lifting, mopping, getting up out of bed and picking up items from below.

*Conservative Management:*    John Doe has tried a course of conservative management. Since his last consultation, John Doe continued to take Tylenol 3 for post-operative pain management. In addition, he has been tracking his walking routine.

Physical Exam:

Weight: 200 lbs  Height: 6'2"

Lumbar Spine:

-1 INSPECTION: Incision is clean, dry and intact.

-2 ROM:

| RANGES OF MOTION | NORMAL | PATIENT |
|---|---|---|
| Lumbar Flexion | Fingertips to toes | 60° |
| Extension | 30° | 10° |
| Right Rotation | 45° | 15° |
| Left Rotation | 45° | 15° |
| Right Lateral Bending | 45° | 20° |
| Left Lateral Bending | 45° | 15° |

-3 STABILITY:   No instability, subluxation or laxity
-4 STRENGTH:   No abnormal paraspinal strength and tone.

Right Lower:
-1 INSPECTION: No asymmetry, crepitation, defects, masses or effusions.
-2 ROM: Comfortable through passive ROM.
-3 STABILITY:   Stable with no evidence of subluxation or laxity Left Lower:
-1 INSPECTION: No asymmetry, crepitation, defects, masses or effusions.
-2 ROM: Comfortable through passive ROM.
-3 STABILITY:   Stable with no evidence of subluxation or laxity

| Strength | L23:iliopsoas | L3:Quad (2,3,4) | L4:T Ant | L5:EHL | S1:Peron L/B | Hip Abd (4,5,S1) | Hip Add (2,3,4) |
|---|---|---|---|---|---|---|---|
| Right | 5 | 5 | 5 | 5 | 5 | 5 | 5 |
| Left | 5 | 5 | 5 | 5 | 5 | 5 | 5 |

Sensation: Intact to light touch and pin prick throughout the upper and lower extremities
Gait:    Able to perform heel and toe walk bilaterally Data Review:  No post-op data or films to review at this time.

Medical Decision Making

John Doe is a 46 year truck driver who presents for cervical and lumbar pathology as 70% neck pain and 30% shoulder pain, which is 30% right-sided and 70% left-sided and 70% low back pain and 30% leg pain, which is 30% right-sided and 70% left-sided.

*Fig. 2U*

Example Data Extraction and Linking

285a    RE: *<patient name>*
Employer: *<employer name>*

285b    Weight: 200 lbs
Height: 6' 2"

285c    Lumbar Flexion: 60°
Extension: 10°

285d    CT Scan: solid fusion at C6-7
MRI Scan: protrusion at C6-7

285e    Medications: XXX

285f    Past Procedures: XXX

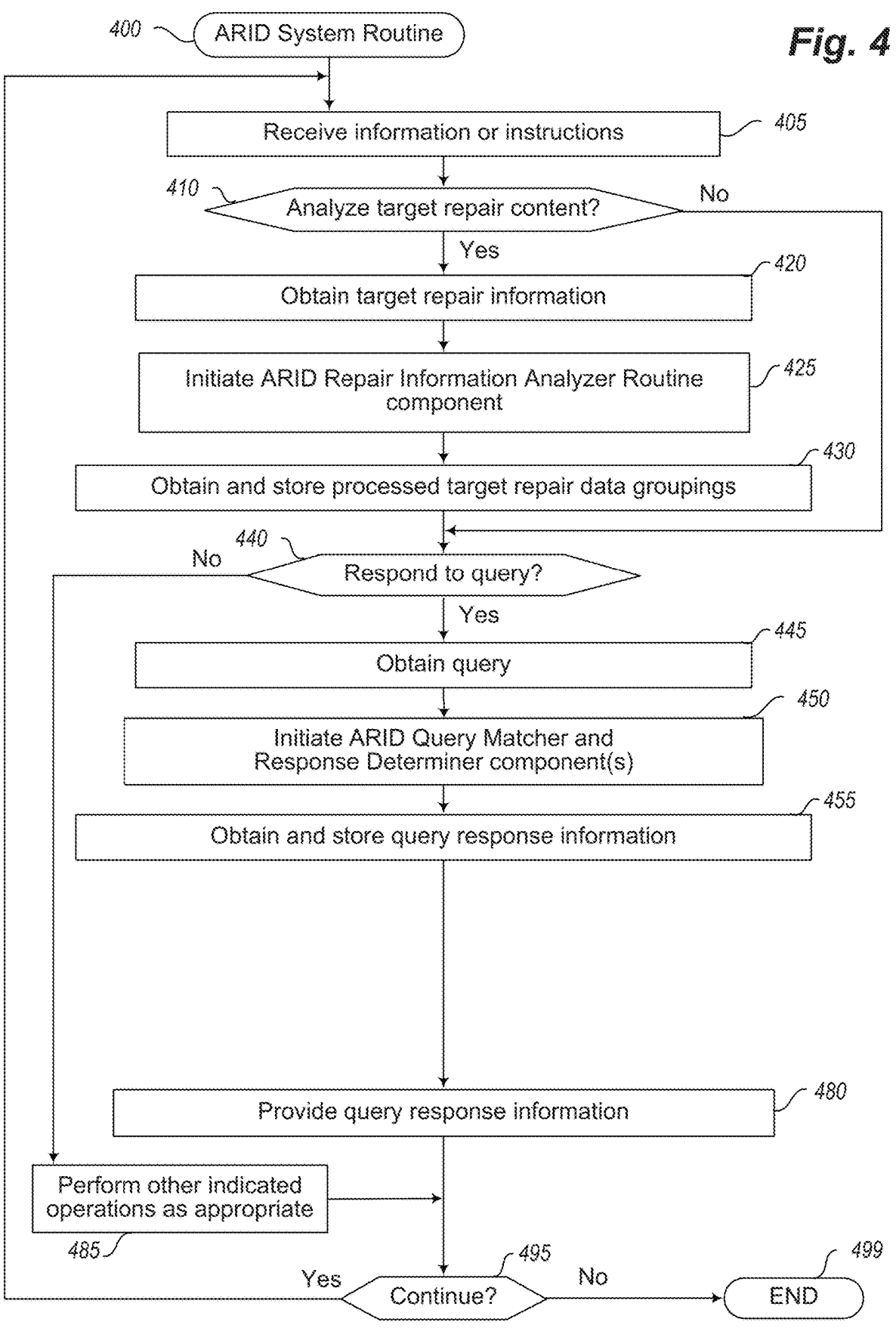

*Fig. 4*

400 — ARID System Routine

405 — Receive information or instructions

410 — Analyze target repair content?    No

Yes

420 — Obtain target repair information

425 — Initiate ARID Repair Information Analyzer Routine component

430 — Obtain and store processed target repair data groupings

440 — Respond to query?    No

Yes

445 — Obtain query

450 — Initiate ARID Query Matcher and Response Determiner component(s)

455 — Obtain and store query response information

480 — Provide query response information

485 — Perform other indicated operations as appropriate

495 — Continue?    Yes    No    499 — END

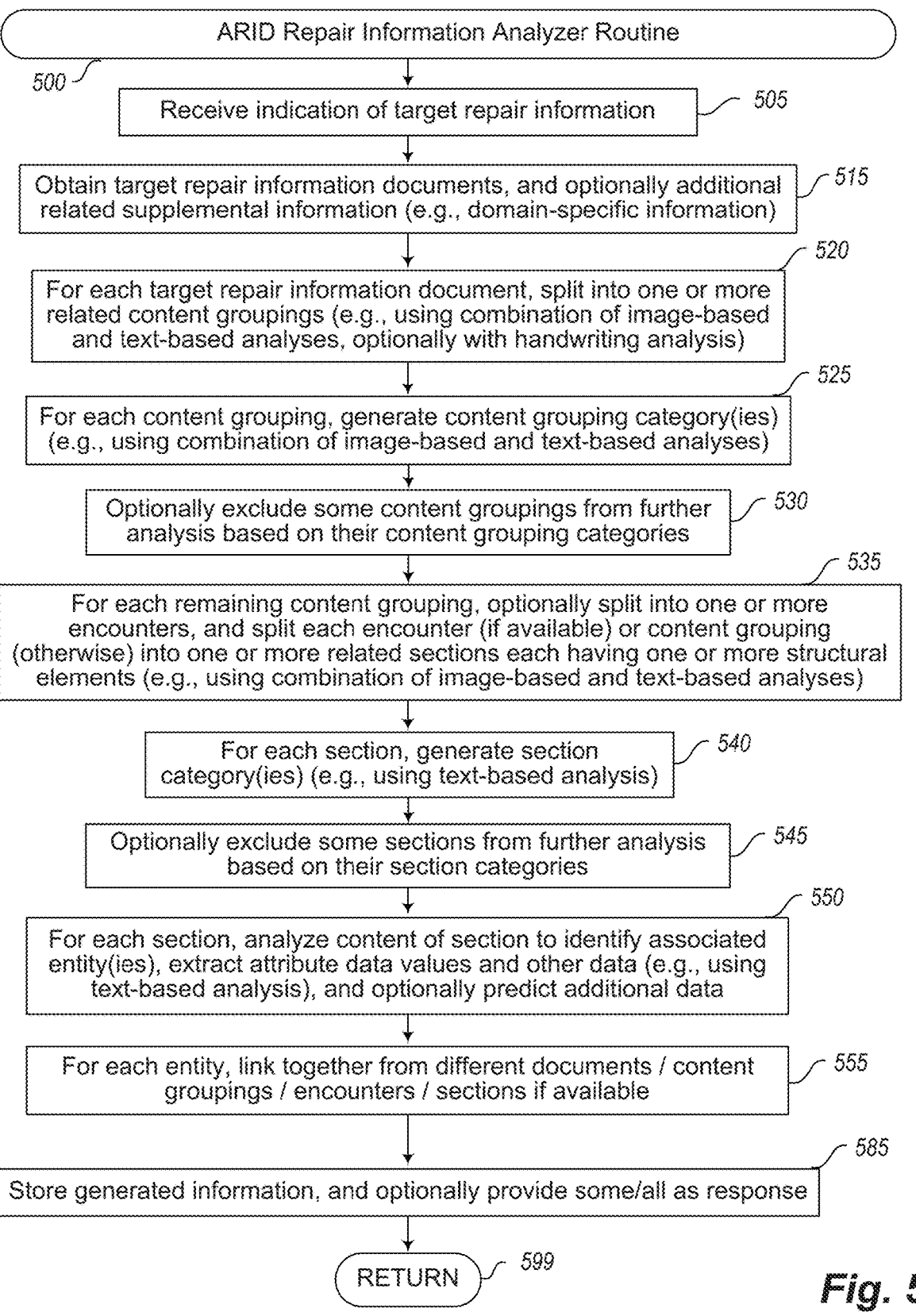

ARID Repair Information Analyzer Routine

500

Receive indication of target repair information — 505

Obtain target repair information documents, and optionally additional related supplemental information (e.g., domain-specific information) — 515

For each target repair information document, split into one or more related content groupings (e.g., using combination of image-based and text-based analyses, optionally with handwriting analysis) — 520

For each content grouping, generate content grouping category(ies) (e.g., using combination of image-based and text-based analyses) — 525

Optionally exclude some content groupings from further analysis based on their content grouping categories — 530

For each remaining content grouping, optionally split into one or more encounters, and split each encounter (if available) or content grouping (otherwise) into one or more related sections each having one or more structural elements (e.g., using combination of image-based and text-based analyses) — 535

For each section, generate section category(ies) (e.g., using text-based analysis) — 540

Optionally exclude some sections from further analysis based on their section categories — 545

For each section, analyze content of section to identify associated entity(ies), extract attribute data values and other data (e.g., using text-based analysis), and optionally predict additional data — 550

For each entity, link together from different documents / content groupings / encounters / sections if available — 555

Store generated information, and optionally provide some/all as response — 585

RETURN — 599

*Fig. 5*

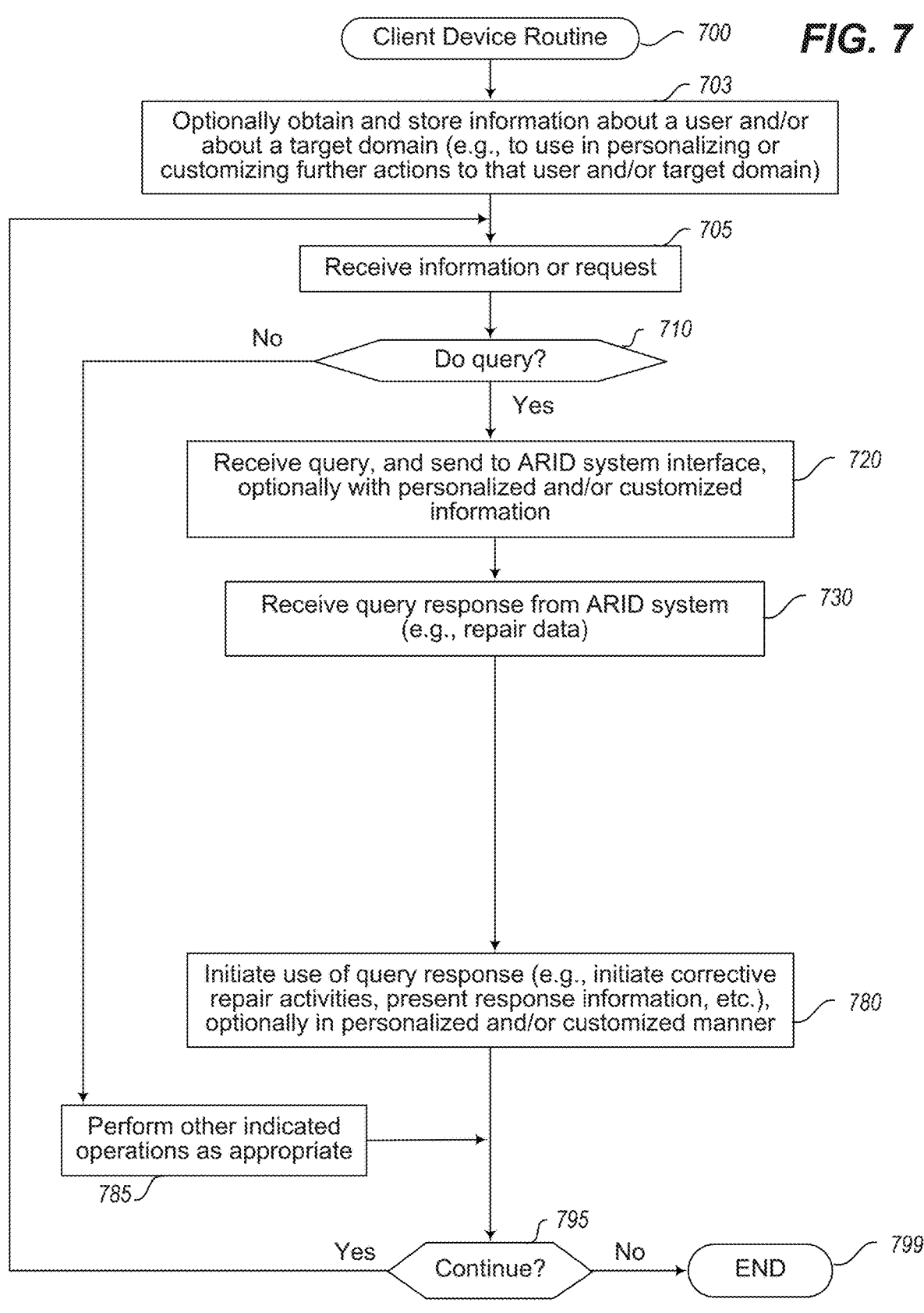

FIG. 7

Client Device Routine — 700

703
Optionally obtain and store information about a user and/or about a target domain (e.g., to use in personalizing or customizing further actions to that user and/or target domain)

705
Receive information or request

710
Do query?
No
Yes

720
Receive query, and send to ARID system interface, optionally with personalized and/or customized information 730
Receive query response from ARID system (e.g., repair data)

780
Initiate use of query response (e.g., initiate corrective repair activities, present response information, etc.), optionally in personalized and/or customized manner 785
Perform other indicated operations as appropriate 795
Continue?
Yes
No

799
END

DETERMINING REPAIR INFORMATION VIA AUTOMATED ANALYSIS OF STRUCTURED AND UNSTRUCTURED REPAIR DATA

CROSS REFERENCE TO RELATED APPLICATIONS

This application claims the benefit of U.S. Provisional Patent Application No. 63/331,414, filed Apr. 15, 2022 and entitled "Determining Repair Information Via Automated Analysis Of Structured And Unstructured Repair Data", which is hereby incorporated by reference in its entirety.

TECHNICAL FIELD

The following disclosure relates generally to automated techniques for determining repair information based at least in part on analysis of structured and unstructured repair data, such as to perform a combination of automated image-based and textual-based analysis of the repair data for use in automatically determining repairs of specific types that have been made to computing devices or for other types of repair and maintenance information.

BACKGROUND

An abundance of information is available to users on a wide variety of topics from a variety of sources. For example, portions of the World Wide Web ("the Web") are akin to an electronic library of documents and other data resources distributed over the Internet, with billions of documents available, including groups of documents directed to various specific topic areas. In addition, various other information is available via other communication mediums.

However, existing search engines and other techniques for identifying information of interest suffer from various problems. Non-exclusive examples include a difficulty in identifying and using specific search terms in a useful manner, difficulty in finding answers specific to a particular topic of interest, receiving an overabundance of responses to a query that are too extensive to easily review and with many or most (or sometimes all) being only partially relevant or not relevant to the query (and that thus obscure relevant information if it actually is included in the responses), etc.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 illustrates a flow diagram of an example embodiment of an Automated Repair Information Determination ("ARID") system routine.

FIG. 5 illustrates a flow diagram of an example embodiment of an ARID Repair Information Analyzer component routine.

FIG. 7 illustrates a flow diagram of an example embodiment of a client device routine.

DETAILED DESCRIPTION

Figure 1A:
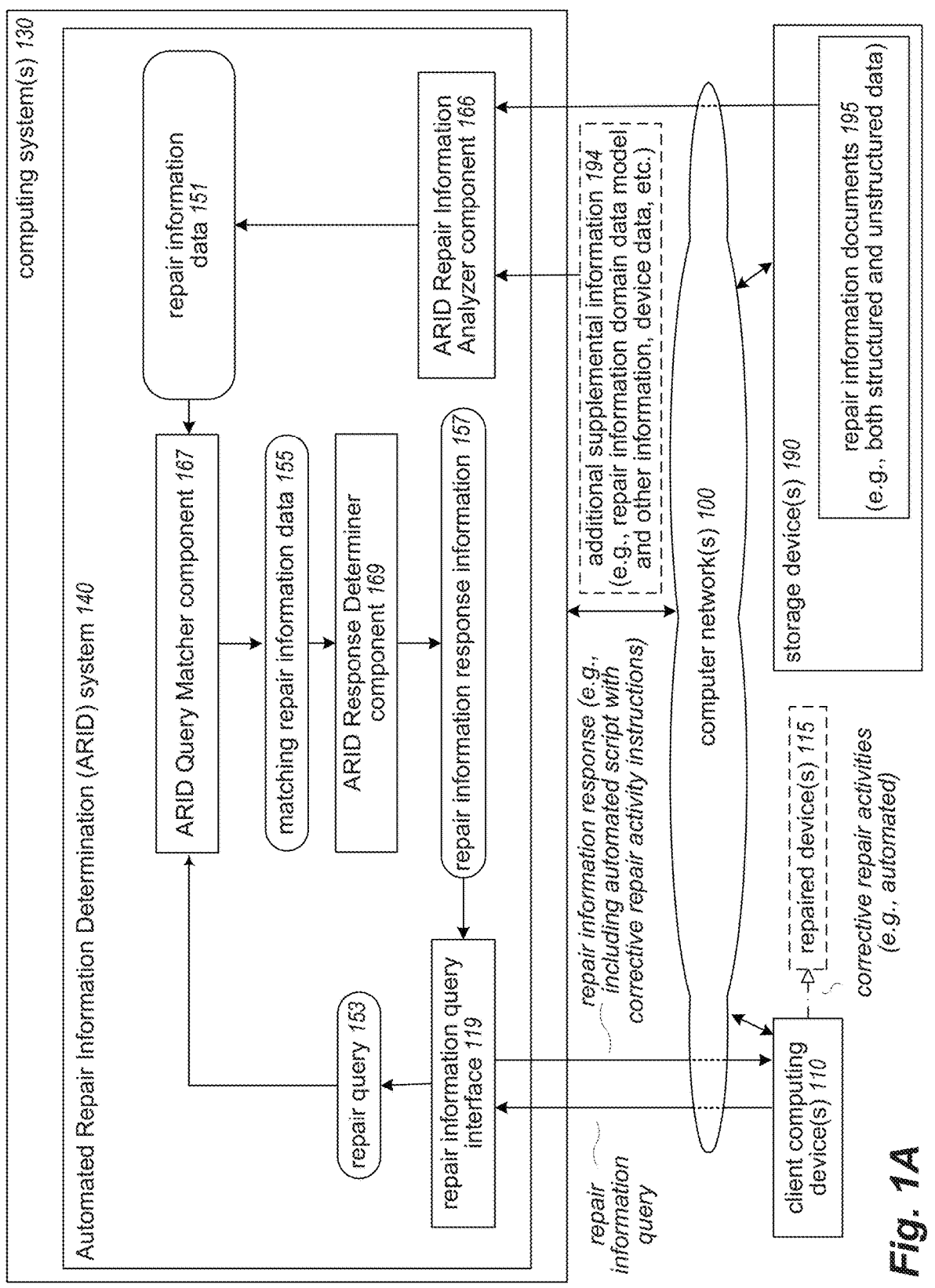
FIGS. 1A and 1B are network diagrams illustrating an example environment and a system for performing described techniques, including automatically determining repair or maintenance information via automated analysis of structured and unstructured data, such as for use in responding to queries related to computing devices or to other types of repair or maintenance information.

The present disclosure describes techniques for using computing devices to perform automated operations related to identifying and using repair and/or maintenance information—such techniques may include, for example, extracting and linking data about repair and maintenance activities performed on various devices (e.g., multiple devices of multiple types), determining specific repair and/or maintenance information of one or more specified types in response to queries (e.g., for one or more particular such devices that are identified based on those queries), and subsequently using the identified repair and/or maintenance information in one or more further automated manners in some situations. In at least some embodiments, the identified information about repair and/or maintenance activities relates to computing devices (e.g., computer systems, such as desktop computers, laptop computers, tablet computers, server computing systems, etc.; smart phones; etc.), with the identified repair and/or maintenance activity information (referred to subsequently herein at times as "repair" activities or "repair" information but intended to also include maintenance activities or information, respectively, unless otherwise indicated explicitly or by context) being analyzed in some such embodiments and situations to identify areas for corrective activities (e.g., additional repair activities to be performed, problems in previous repair activities to be corrected, etc.) for one or more target computing devices, and the use of such information may include automatically initiating some or all such corrective activities on the target computing device(s). In addition, in at least some embodiments, various techniques may be used to improve speed and/or accuracy of determined responses to received queries, including analyzing and validating data about repair activities for a plurality of devices (e.g., identifying particular repair and/or maintenance events and/or associated objects used, determining associated timelines, etc.), identifying and removing duplicative data (e.g., repair data records), and then identifying subsets of such data matching received queries. Additional details are included below regarding the automated analysis and use of repair information, and some or all of the techniques described herein may, in at least some embodiments, be performed via automated operations of an Automated Repair Information Determination ("ARID") system, as discussed further below.

In at least some embodiments, the described techniques include analyzing repair information for a number of types of repair activities and linking extracted repair data for particular entities, such as from multiple source documents (from one or more repair activity providers) and/or across multiple repair encounters, and using a combination of both image-based and text-based analyses. For example, a group of information specific to one or more types of repair activities (e.g., involving some or all repair activities for a specific type or class of computing device or for a specific computing device) may be identified (e.g., in a plurality of documents from a plurality of sources and including both structured data and unstructured data, and with information for a particular device or other entity potentially identified in multiple documents from multiple sources and linked together), and may be analyzed to separate that group of information into smaller groupings of related data (e.g., per device or other entity, per repair activity encounter, per repair activity type, etc.). In at least some embodiments, the analysis activities for a data grouping may include using a language model specific to a type of repair activity (e.g., to extract relevant data from different groups of related text and other data, such as based at least in part on categorization activities performed for the groups of related text and other data). Furthermore, in some embodiments, the described techniques include automated operations of the ARID system to anonymize or otherwise redact some of the repair information and/or other associated information about particular devices or other entities.

As noted above, the described techniques may include obtaining documents that include repair data (and optionally additional types of data), and analyzing contents of the documents to extract repair data of one or more types. In at least some embodiments, the analysis of a particular target document with repair data may include using a combination of image-based analysis and text-based analysis to identify one or more groupings of related content (also referred to herein as "content groupings") in the document, such as to correspond to separate original documents that were combined to form the target document and are now sub-documents within the target document, or to other types of groupings of related content in the target document (e.g., content of different types, content that is generated at different times and/or in different manners, etc.)—in at least some such embodiments, a first trained neural network model performs a pairwise analysis of each pair of pages of the target document (e.g., of images of the pages) in order to initially determine (e.g., predict) whether those two pages are part of the same or different content groupings (i.e., whether or not a content grouping boundary, or 'split', exists between two different content groupings to which those two pages correspond, such as a split occurring between the two pages, including to correspond to situations in which the content grouping boundary identifies where one original document in the target document ends and another original document in the target document begins), and a second prediction model (e.g., a trained transformer neural network model or other type of neural network model) then analyzes text of the target document surrounding each determined split point between content groupings to validate (or overrule) the initial content grouping split determination.

Once the separate content groupings are identified in the target document (e.g., separate original documents that were combined to form the target document), each such separate content grouping is then analyzed to categorize that content grouping (e.g., from an enumerated list or set of content grouping categories), including in at least some embodiments to use text-based analysis, such as by a third prediction model (e.g., a trained transformer neural network model or other type of neural network model) that initially classifies the content of that content grouping as belonging to a particular content grouping category based on text of the content grouping (e.g., using only a subset of the content from the content grouping, such as 1-3 pages, and in some cases by using transformer neural network embeddings from the first 3 pages or the first 512 tokens, whichever comes first), and optionally with a subsequent image-based analysis of the content of that content grouping to validate (or overrule) that initial content grouping categorization (e.g., using a fourth trained neural network model). In at least some embodiments, only certain categories of content groupings are then further analyzed to extract relevant repair data, with content groupings of other categories (e.g., bills, cover letters, transmittal documents, etc.) being excluded from further analysis (but still optionally used in other manners).

For the identified content groupings that are remaining after the optional exclusion of some content groupings whose determined content grouping categories meet one or more specified criteria, the described techniques in at least some embodiments further include performing analysis of a particular content grouping having repair data to identify subsets of the content grouping that correspond to different repair-related encounters, such as at different times and/or by different repair providers (e.g., corresponding to different repair or maintenance sessions involving interactions of a repair provider with a particular target device or other target entity)—for example, such identification of an encounter may be based at least in part on one or more repair activities that occur within a defined time period (e.g., a defined quantity of one or more minutes or hours or days) and/or are otherwise indicated as being associated together based on the content.

For each such content grouping subset corresponding to an encounter (if identified) or each such content grouping overall (if encounters are not identified), the described techniques may further include performing analysis of the content of that encounter (if available) or of that content grouping (if not) by using a combination of image-based analysis and text-based analysis to identify one or more sections in that content, such as for sections each having one or more structural elements corresponding to separate types of information and/or formatting within that content (e.g., titles, headers, footers, form data, substantive repair data, etc.). For example, in at least some such embodiments, a fifth trained computer vision object-detection model (e.g., Detectron2) analyzes images of that content for the encounter's content grouping subset or overall content grouping (e.g., separate images for each page) in order to determine (e.g., predict) separate structural element objects of that content (e.g., based on formatting and/or location of different subsets of that content), such as to identify titles, sub-titles, tables, 'forms' with key-value pairs, questionnaires, header/footers, images, graphs, substantive data (e.g., text, numbers, etc.), page numbers, paragraph and line numbers, etc., and to optionally assign corresponding labels to each structural element. In addition, in at least some such embodiments, text may be extracted and analyzed using one or more trained OCR (optical character recognition) models. Sections may then be identified by, for example, combining related structural elements (e.g., based at least in part on structural element labels, such as to combine a title and/or sub-title with following substantive data), while treating other structural elements (e.g., tables, forms, questionnaires, images, graphs, etc.) as separate sections—in at least some such embodiments, some types of structural elements (e.g., headers, footers, page numbers, etc.) are further excluded from inclusion in any of the sections and from further section-based analysis. Once the separate sections are identified, each such separate section is then analyzed to categorize that section (e.g., from an enumerated list or set of section categories), including in at least some embodiments to use a sixth trained prediction model (e.g., a transformer neural network model or other type of neural network model, such as based on a Bert NLP, or Natural Language Processing, model) that classifies the content of that section as belonging to a particular section category based at least in part on text of that section. In at least some embodiments, only certain categories of sections are then further analyzed to extract relevant repair data, with sections of other categories (e.g., headers, footers, page and line numbering, etc.) being excluded from further analysis (but still optionally used in other manners).

For the identified sections that are remaining after the optional exclusion of some section categories, the described techniques in at least some embodiments further include performing analysis of a particular section having repair data to extract repair data from the section and to identify one or more devices or other entities to which the repair data corresponds, such as to identify particular repair activities performed and corresponding results for particular associated device(s) or other entity(ies), including to determine values for particular attributes of the associated device(s) or other entity(ies). For example, additional text may be extracted and analyzed in at least some embodiments using one or more seventh trained OCR models, such as to handle some specialized types of sections (e.g., tables, forms, graphs, etc.)—as one example, information in some such specialized section types may provide information about particular attributes of an associated device or other entity, such as based on a table column and cell value, a key-value pair of a form, one or more axes and values of a graph, etc. In addition, the analysis of the text may include separating it into different predicted types or topics, with non-exclusive examples including general information (e.g., names, dates, addresses, etc.), diagnosis of problems needing repair, treatments of particular repair problems, care plans for planned further repair activities to manage or solve particular repair problems, a history of past repair activities and problems, review by one repair provider of repair activities by others, etc. The described techniques may further optionally include annotating the other documents and/or content groupings with information determined from the automated analysis, such as to identify encounters and/or sections and/or structural elements with bounding boxes (or other visual indications) and/or to provide associated determined categories and/or topics/types (e.g., to provide corresponding information to human end users and/or to enable review and optional revision by human annotator users). In addition, the described techniques may further include linking extracted data for a particular associated device or other entity from different documents and/or content groupings and/or encounters and/or sections and/or structural elements, including in some embodiments to provide a comprehensive aggregation of all available repair data for that associated device or other entity.

Additional details are included below related to analyzing repair information in various manners, to enable subsequent use of resulting linked repair data, including with respect to non-exclusive examples discussed with respect to FIGS. 2A-2W.

The described techniques may further be used in various manners to address various types of problems. As noted above, in some embodiments the described techniques include identifying repair information related to a particular computing device or particular type of computing device, and in some such cases providing response information that includes information about one or more corrective activities to be performed, optionally in an executable format to initiate one or more automated corrective actions on that particular computing device or on one or more computing devices of that particular type. In other embodiments, the identified repair information may be used in other manners, such as to be provided to one or more users (e.g., the user who supplied a corresponding query) for further use (e.g., to display or otherwise present some or all of the identified repair information to the one or more users), such as for situations in which at least some further user activity is involved (e.g., remove a battery from a smart phone, attach a cable to a specified port, etc.). In some embodiments, the identified repair information may be for types of repair activities or other repair information that does not involve computing devices, such as repair information related to one or more types of medical repair activities (e.g., treatments, procedures, drugs taken, medical devices used, etc.) that have been performed on or taken by an indicated human or other patient entity (e.g., to repair the patient with respect to an indicated medical symptom and/or medical condition of the patient, such as by a type of treatment specified in corresponding indicated repair information; to perform maintenance on the patient, such as with respect to an indicated medical symptom and/or medical condition by performing preventive activities to reduce the likelihood of an indicated medical symptom and/or medical condition arising, etc.) or other medical status for such a patient (e.g., diseases or other conditions of a patient, prior patient activities that affect patient health, etc.)—in such embodiments, the repair information that is summarized and encoded may include, for example, doctors' notes about patients, records of hospitals or other facilities or entities related to treatments (e.g., electronic medical records, or EMRs, from hospitals and/or pharmacies and/or other medical facilities, treatment records from other entities with such information such as insurance companies and/or credit card processing systems, etc.), and additional supplemental information may include information about effects of various activities (e.g., drug interactions, medical guidelines or other information about effects of particular activities, etc.). In addition, in at least some embodiments, the described techniques include automated operations of the ARID system to anonymize or otherwise redact some of the repair information and/or other associated information about particular devices or other entities (e.g., to anonymize patient data to satisfy HIPPA, or Health Insurance Portability and Accountability Act, requirements; to satisfy GDPR, or General Data Protection Regulation, requirements, etc.).

In addition, while various of the discussion herein refers to data groupings that are extracted from "documents", it will be appreciated that the described techniques may be used with a wide variety of types of content items and that references herein to a "document" apply generally to any such type of content item unless indicated otherwise (explicitly or based on the context), including, for example, textual documents (e.g., Web pages, word processing documents, slide shows and other presentations, emails and other electronic messages, etc.), visual data (e.g., images, video files, etc.), audio data (e.g., audio files), software code, firmware and other logic, genetic codes that each accompany one or more sequences of genetic information, other biological data, etc., and including a grouping of data of multiple such types. Furthermore, the content items may be of one or more file types or other data structures (e.g., streaming data), including document fragments or other pieces or portions of a larger document or other content item, and the contents of such content items may include text and/or a variety of other types of data (e.g., binary encodings of audio information;

binary encodings of video information; binary encodings of image information; mathematical equations and mathematical data structures, other types of alphanumeric data structures and/or symbolic data structures; encrypted data, etc.). The group of documents (and/or other content item types) that are used by the ARID system for a particular type of repair information and/or particular target area of interest (referred to generally herein at times as a 'domain') may be, for example, all available documents for a particular domain or that includes sufficient documents to be representative of the domain. In some embodiments, each of the documents has contents that are at least partially textual information, while in other embodiments at least some documents or other content items may include other types of content (e.g., images, video information, audio information, etc.).

The described techniques provide various benefits in various embodiments, including to significantly improve the identification and use of responsive information to specified queries, and with such described techniques used in some situations to automatically determine and implement repair activities performed on indicated computing devices or other repair information for such devices. Such automated techniques allow such response information to be generated much more quickly and efficiently than previously existing techniques (e.g., using less storage and/or memory and/or computing cycles) and with greater accuracy, based at least in part on using one or more of the following: the described use of a combination of image-based and textual-based analysis techniques; the described use of domain-specific information to improve and customize the extraction and/or linking of repair for that domain; etc. Non-exclusive examples of additional related benefits of the described techniques include the following: enabling the processing and use of much larger groups of information; enabling identifying responses to queries using information of multiple levels of generality or specificity; enabling identifying responses to queries using data that is combined and linked from multiple separate source documents and/or multiple different repair providers (e.g., for a particular computing device or other entity); etc. In addition, in some embodiments the described techniques may be used to provide an improved GUI in which a user may more accurately and quickly obtain information, including in response to an explicit request, as part of providing personalized information to the user, etc. Various other benefits are also provided by the described techniques, some of which are further described elsewhere herein.

For illustrative purposes, some embodiments are described below in which specific types of information are acquired, used and/or presented in specific ways and by using specific types of automated processing—however, it will be understood that the described techniques may be used in other manners in other embodiments, and that the invention is thus not limited to the exemplary details provided. As one non-exclusive example, while specific types of data structures (e.g., databases, domain-specific data models, language models, etc.) are generated and/or used in specific manners in some embodiments, it will be appreciated that other types of information may be similarly generated and used in other embodiments, including for repair information for areas other than involving computing devices and/or for types of activities other than repair and maintenance actions, and that responses to queries may be used in other embodiments in manners other than automated corrective repair actions, including display or other presentation—for example, in addition to analyzing and using repair data from the types of documents discussed herein in particular examples (including medical records), in some embodiments and situations other types of documents may be analyzed and used (e.g., emails, images, exhibits, etc.) and/or other types of repair data may be analyzed and used (e.g., damage repairs of other types, such as to vehicles and/or other objects; insurance documents; etc.). In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical or related reference numbers may be used in the drawings to identify the same or similar elements or acts.

FIG. 1A is a network diagram illustrating an example environment in which a system may be configured and provided for automatically determining repair information for computing devices or other types of repair information, and for providing matching repair-related information in response to queries. In particular, an embodiment of an ARID system 140 is executing on one or more computing systems 130, and includes several components 166, 167 and 169 that generate and use various information 151, 153, 155 and 157.

Figure 1B:
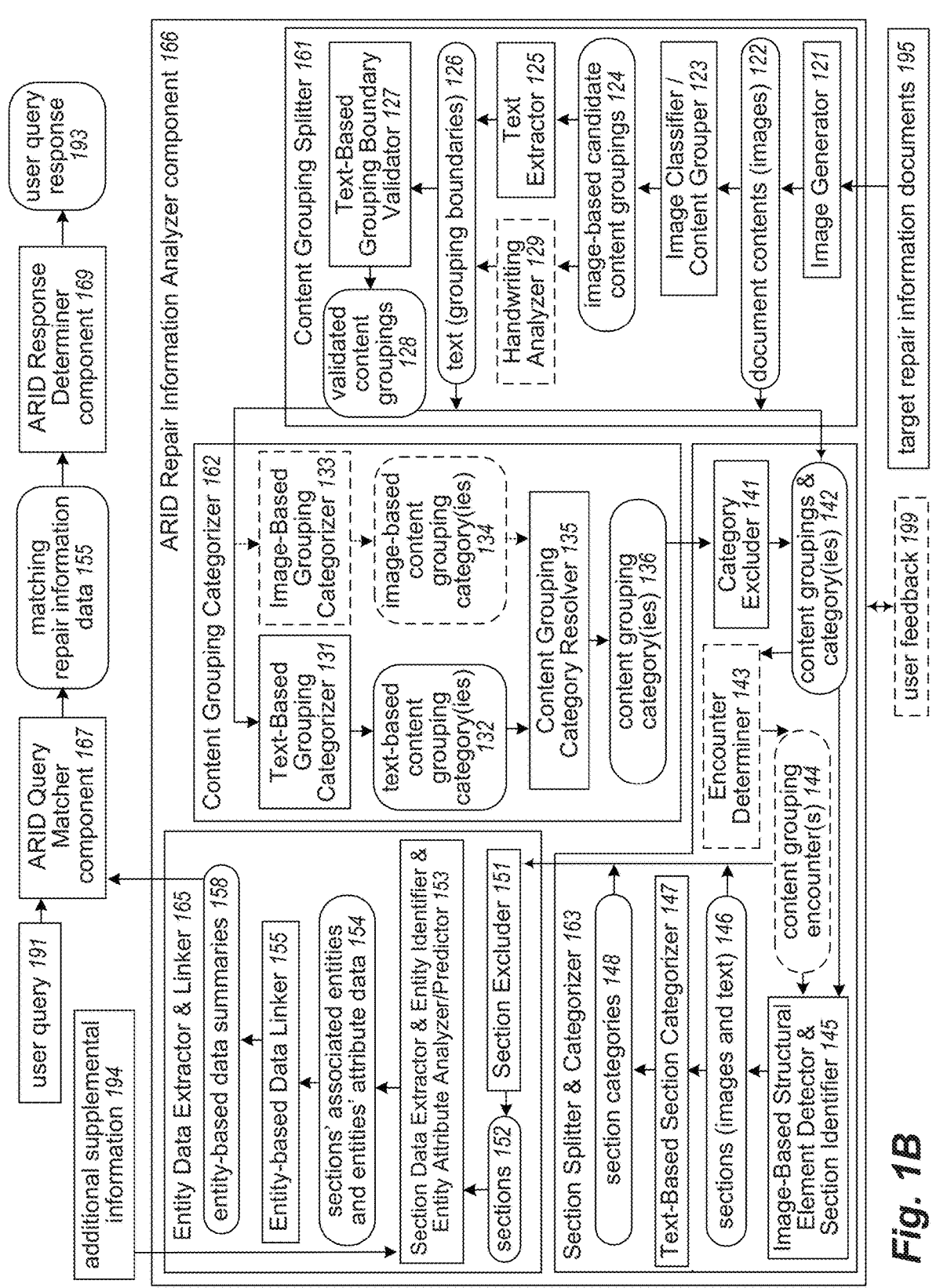

In particular, as part of the automated operations of the ARID system 140 in this illustrated example embodiment, the system 140 obtains information, such as over the computer network(s) 100, from various repair information documents 195 on one or more storage devices 190 about multiple types of performed repair activities and other repair information for one or more repair domains (e.g., types of computing device repairs). The contents of the repair information documents 195 are received by the ARID system Repair Information Analyzer component 166, which analyzes those contents in order to generate resulting entity-specific repair information 151, which in this example embodiment includes groupings of related data (e.g., stored in SQL tables of one or more SQL databases, not shown) for particular computing device entities and optionally additional expanded content for some or all such data groupings (e.g., additional inferred contents about effects of prior repair activities and/or other associated activities). The repair information 151 is then made available to an ARID system Query Matcher component 167 for further use in addressing queries received from users, and may further be used in other manners (not shown) in other embodiments, whether in addition to or instead of for use in responding to queries. FIG. 1B provides further details about one example embodiment of the ARID system Repair Information Analyzer component 166.

The ARID system 140 operates in an online manner in the illustrated embodiment and provides a graphical user interface (GUI) (not shown) and/or other interfaces 119 to enable one or more remote users (not shown) of client computing devices 110 to interact over the one or more intervening computer networks 100 with the ARID system 140 to obtain functionality of the ARID system. In particular, a particular client computing device 110 may interact over the one or more computer networks 100 with the repair information query interface 119 in order to submit a query about one or more types of repair information (e.g., all available repair information) for an indicated computing device or indicated type of computing device (e.g., corresponding to an associated device 115 for which additional corrective repair activities may be performed, and/or for the client computing device 110 itself), or more generally for repair data matching one or more specified criteria. The resulting repair query 153 is then made available to the ARID system Query Matcher component 167, which compares the repair query 153 to the repair information 151 in order to determine one or more candidate data groupings 155 from the information 151 that match the repair query 153—for example, the ARID system Query Matcher component 167 may use one or more criteria included in or otherwise associated with the repair query 153 to determine matching repair data. The ARID system Response Determiner component 169 then analyzes the matching repair data groupings 155 in order to determine corresponding repair response information 157 for the received query, which it then forwards back to the requesting client computing device 110 in response to the received query via the natural language repair query interface 119. The analysis of the matching repair data groupings 155 may include, for example, analyzing the information of the data groupings to select one or some or all of the data groupings (or portions thereof) to use as the repair response information 157, while in other embodiments all such matching data groupings may be used without such selection, or instead additional information may be added (e.g., adding corresponding information about repair activities to perform to respond to a specific identified repair problem). The repair response information 157 may in some embodiments and situations include executable instructions or other information to automatically cause the recipient client computing device 110 (or an associated target computing device to be repaired, such as a device 115) to execute those repair instructions or to otherwise take automated action to perform repair activities (e.g., corrective repair activities, preemptive additional maintenance activities, etc.). If no data grouping 155 is identified as a response to the received query, the component 169 may instead supply a reply message to the requesting client computing device 110 to indicate that no response is available.

After the requesting client computing device 110 receives the repair response information 157, it may take various actions to use that received information, such as to initiate automated (or other) repair activities on itself or on an associated device 115, and/or may display or otherwise present some or all of the received information to one or more users on the client computing device. The interactions of users and/or client computing devices with the ARID system 140 to obtain functionality of the ARID system may involve a variety of interactions over time, including in some cases independent actions of different groups of users and/or client computing devices.

The network 100 may, for example, be a publicly accessible network of linked networks, possibly operated by various distinct parties, such as the Internet, with the ARID system 140 available to any users or only certain users over the network 100. In other embodiments, the network 100 may be a private network, such as, for example, a corporate or university network that is wholly or partially inaccessible to non-privileged users. Thus, while the ARID system 140 in the illustrated embodiment is implemented in an online manner to support various users over the one or more computer networks 100, in other embodiments a copy of the ARID system 140 may instead be implemented in other manners, such as to support a single user or a group of related users (e.g., a company or other organization, such as if the one or more computer networks 100 are instead an internal computer network of the company or other organization, and with such a copy of the ARID system optionally not being available to other users external to the company or other organizations, such as for a medical facility or a law firm operating a copy of the ARID system to analyze and use confidential medical repair information available for one or more medical patients). In addition, the ARID system 140 and each of its components (including components 166, 167 and 169) may include software instructions that execute on one or more computing systems by one or more processors (not shown), such as to configure those processors and computing systems to operate as specialized machines with respect to performing their programmed functionality. Additional details related to operations of the ARID components 166, 167 and 169 are discussed below with respect to FIG. 1B and elsewhere herein.

FIG. 1B continues the example of FIG. 1A, and illustrates an example embodiment that includes additional example details about the ARID system components 166, 167 and 169 of FIG. 1A, as well as about an embodiment of the ARID system that is capable of providing repair information (or other types of information) for repair areas/domains other than computing devices.

In this example embodiment, the ARID Repair Information Analyzer component 166 receives, from target information documents 195, information about one or more repair areas/domains and/or associated entities, and may further optionally obtain and use additional supplemental information 194 of one or more types as discussed below. The overall goal in this example embodiment is, given documents (e.g., stored in the form of pdfs, images, html, xml, docxs, pptxs, etc.) providing information for one or more devices or other entities and related to a domain, to allow a user to make queries about the domain and obtain responses based on the content contained in the documents (e.g., in a real-time or near-real-time manner with respect to the queries, such as in a matter of seconds or in less than a second). The analysis of the repair documents may use a combination of image-based analysis and text-based analyses, including in some embodiments and situations to use a YOLO (you only look one) architecture to do image-based analyses that detect objects in an image, such as different parts of a document (e.g., structural elements, sections, data values, etc.), and with such information used for further analysis of the documents in the described manners.

In this example embodiment, the information from the target information documents 195 is provided to a Content Grouping Splitter subcomponent 161 of the ARID Repair Information Analyzer component 166, which passes each document to an Image Generator module 121 that generates a corresponding set of images for the document (e.g., one image for each page of the document) if the document is not already in an image format, resulting in images 122 of the document contents. The Image Classifier/Content Grouper module 123 then performs an image-based classification of each document's contents into one or more candidate content groupings 124, such as by predicting whether subsequent images are part of the same or different content groupings. Subsequently, a Text Extractor module 125 extracts text corresponding to some or all of each content grouping that includes typewritten text (e.g., at least portions of each content grouping around boundaries at which content groupings are split), and optionally a Handwriting Analyzer module 129 generates additional text corresponding to handwritten information (if any) of the content grouping, resulting in text 126 corresponding to at least the content grouping boundaries (and optionally all text in each content grouping)—the generated textual data may be extracted from the original source documents 195 if they include that textual data in a readable format (e.g., pdfs, html, xml, docxs, pptxs, etc.) and/or from images (e.g., the document contents 122) via optical character recognition (OCR) or other text identification techniques. A Text-Based Grouping Boundary Validator module 127 then analyzes the text 126 to validate the image-based candidate content groupings 124 (or to modify candidate content groupings determined to be incorrect), resulting in validated content groupings 128 (optionally each including the images 122 and/or text 126 corresponding to that content grouping). Additional details related to nonexclusive examples of performing content grouping splitting are discussed further with respect to FIGS. 2A-2W.

Output of the Content Grouping Splitter subcomponent 161 is then provided to a Content Grouping Categorizer subcomponent 162, including information about the validated content groupings 128 (e.g., including extracted text and/or images for each content grouping). In the illustrated embodiment, the Text-Based Grouping Categorizer module 131 then performs a text-based analysis of the content of each content grouping to determine one or more corresponding categories 132 for the content grouping, which in some embodiments are then stored as one or more final content grouping categories 136 for each content grouping. In some embodiments, an optional Image-Based Grouping Categorizer module 133 also performs an image-based analysis of the content of each content grouping to determine one or more corresponding categories 134 for the content grouping, such as in parallel with the module 131—if both categories 132 and 134 are generated, a Content Grouping Category Resolver module 135 then determines the one or more final content grouping categories 136 for each content grouping by combining the information about the categories 132 and 134 (e.g., in a weighted manner). Additional details related to nonexclusive examples of performing content grouping categorizing are discussed further with respect to FIGS. 2A-2W.

Output of the Content Grouping Categorizer subcomponent 162 is then provided to a Section Splitter & Categorizer subcomponent 163, including the content grouping categories 136, along with the validated content groupings 128 (and corresponding extracted images 122 and text 126) to which the categories correspond. In the illustrated embodiment, information about the content grouping categories 136 are provided to a Category Excluder module 141 of the subcomponent 163, which excludes certain content grouping categories from further analysis, resulting in remaining content groupings and categories 142 to be provided for further analysis by the subcomponent 163—in other embodiments, no such category-based exclusion may be performed, or instead exclusion of some content groupings may be performed in other manners. In the illustrated embodiment, an Encounter Determiner module 143 may optionally be provided and used to further determine one or more encounters in each content grouping from information 142, resulting in content grouping encounters 144—if so, such information 144 is further provided to module 145 for further analysis along with the information 142, and if not then just the information 142 is provided to module 145 for further analysis. The Image-Based Structural Element Detector & Section Identifier module 145 then performs an image-based analysis of each content grouping from information 142 or each encounter from information 144 in order to detect structural elements within that information, determine a type or topic of each such structural element, and combine at least some such structural elements together to form related sections (while optionally treating other identified structural elements as separate sections), resulting in sections 146 (e.g., including the images and/or text for each such section that are part of the contents of that section). A Text-Based Section Categorizer module 147 then performs a text-based analysis of each section in order to determine one or more categories for each section, resulting in section category information 148. Additional details related to nonexclusive examples of performing section splitting and categorizing are discussed further with respect to FIGS. 2A-2W.

Output of the Section Splitter & Categorizer subcomponent 163 is then provided to an Entity Data Extractor & Linker subcomponent 165, including the sections 146 and categories 148. In the illustrated embodiment, the information 146 and 148 is provided to a Section Excluder module 151 of the subcomponent 165, which excludes certain section categories from further analysis, resulting in remaining sections and categories 152 being provided to a Section Data Extractor & Entity Identifier & Entity Attribute Analyzer/Predictor module 153—in other embodiments, no such section-based exclusion may be performed (such that the sections and categories 152 include all sections 146 and their respective categories 148), or instead exclusion of some sections may be performed in other manners. The module 153 then performs automated operations to extract data from each remaining section, including to identify an associated entity, and to predict or otherwise determine values for attributes of the entity, resulting in each section's associated entities and entity attribute data 154. As part of doing so, the module 153 may obtain and use various types of additional supplemental information 194, such as a language model specific to the type of repair data being analyzed (e.g., a trained Bio-Bert model for medically related data), information about specific entities having repair information in the documents 195 (e.g., device recalls; demographic information for particular people, such as medical patients; etc.), and optionally other types of related information (e.g., information about drug interactions; time-based effects of particular activities, such as smoking; expected results from particular medical procedures or other treatments, such as from medical clinical guidelines; etc.)—in addition, the module 153 may further perform processing to identify various parts of the content, such as particular repair activities, particular conditions to be repaired or ameliorated, particular objects used for repair activities (e.g., medical devices, drugs, etc.), particular repair-related tests that are performed, etc., optionally based on or associated with particular codes for a particular domain (e.g., for the medical domain, CPT, or Current Procedural Terminology codes; ICD, or International Classification of Diseases, codes; HCPCS, or Healthcare Common Procedures Coding System, codes; etc.), and particular attributes associated with some or all of the other identified parts (e.g., associated timing information, such as start and/or end dates, whether using absolute times or times relative to another indicated time, such as a date or other time associated with a document or a particular entry in the document; a level of a repair activity performed, such as a dosage and/or strength and/or frequency of medicine used or other medical procedure or intervention; results of repair-related tests; etc.). The information 154 is then supplied to an Entity-Based Data Linker module 155, which links together extracted data for one or more particular entities from multiple documents 195 and/or content groupings 128 and/or sections 152, resulting in entity-based data summaries 158, such as by using identifying information to link data from different documents or other groups of information about the same entity (e.g., a unique device identifier for a device, such as a MAC address or persistent IP address; a social security number or patient number or patient name or other identifying number for a person who is a medical patient; etc.). The information 158, and other information generated by the component 166, may be stored persistently in one or more manners (e.g., in one or more databases on one or more storage devices, not shown), and in this example embodiment is further made available to the ARID Query Matcher component 146. In addition, feedback 199 of various types may optionally be provided to and used by the component 166, such as modify automatically generated data (e.g., to correct errors, to add supplemental information, etc.). Additional details related to nonexclusive examples of performing data extraction and linking are discussed further with respect to FIGS. 2A-2W.

The ARID system may further receive one or more user queries 191 that are supplied to the ARID Query Matcher component 167, which identifies candidate matching repair information data 155 from the generated information 158 (e.g., a best matching set of one or more linked data groupings; all matching sets of linked data groupings, such as for a particular indicated entity; a top N number of candidate sets of linked data groupings, with N being customizable or a fixed number; etc.), and provides the matching data 155 to the ARID Response Determiner component 169, which generates and provides a corresponding user query response 193. The user query response 193 may, for example, correspond to information 157 of FIG. 1A. In some embodiments, a query response 193 may, for example, include indications of additional non-textual information (e.g., images, audio, etc.) in one or more documents from which the data grouping is extracted (e.g., by including links in the provided response to the corresponding parts of that document, by extracting and bodily including that additional non-textual information, etc.).

While a variety of details have been discussed with respect to the example embodiments of FIGS. 1A-1B, it will be appreciated that other embodiments may not include some such details, and/or may include other functionality that is not illustrated in these examples.

Figure 2A:
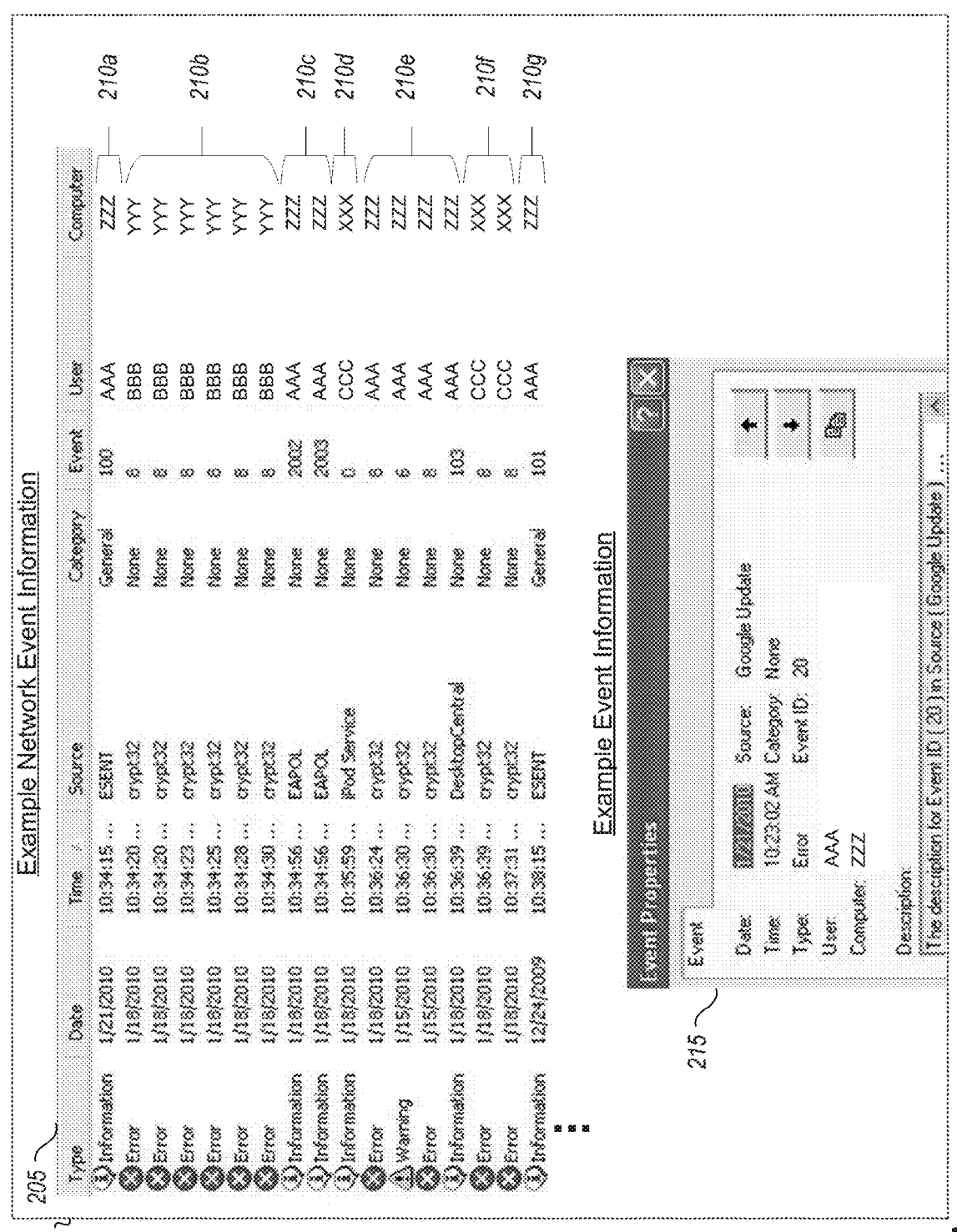
FIGS. 2A-2W illustrate examples of performing described techniques, including automatically determining repair or maintenance information for computing devices or other types of repair or maintenance information, and using the determined information in one or more manners.
Figure 2P:
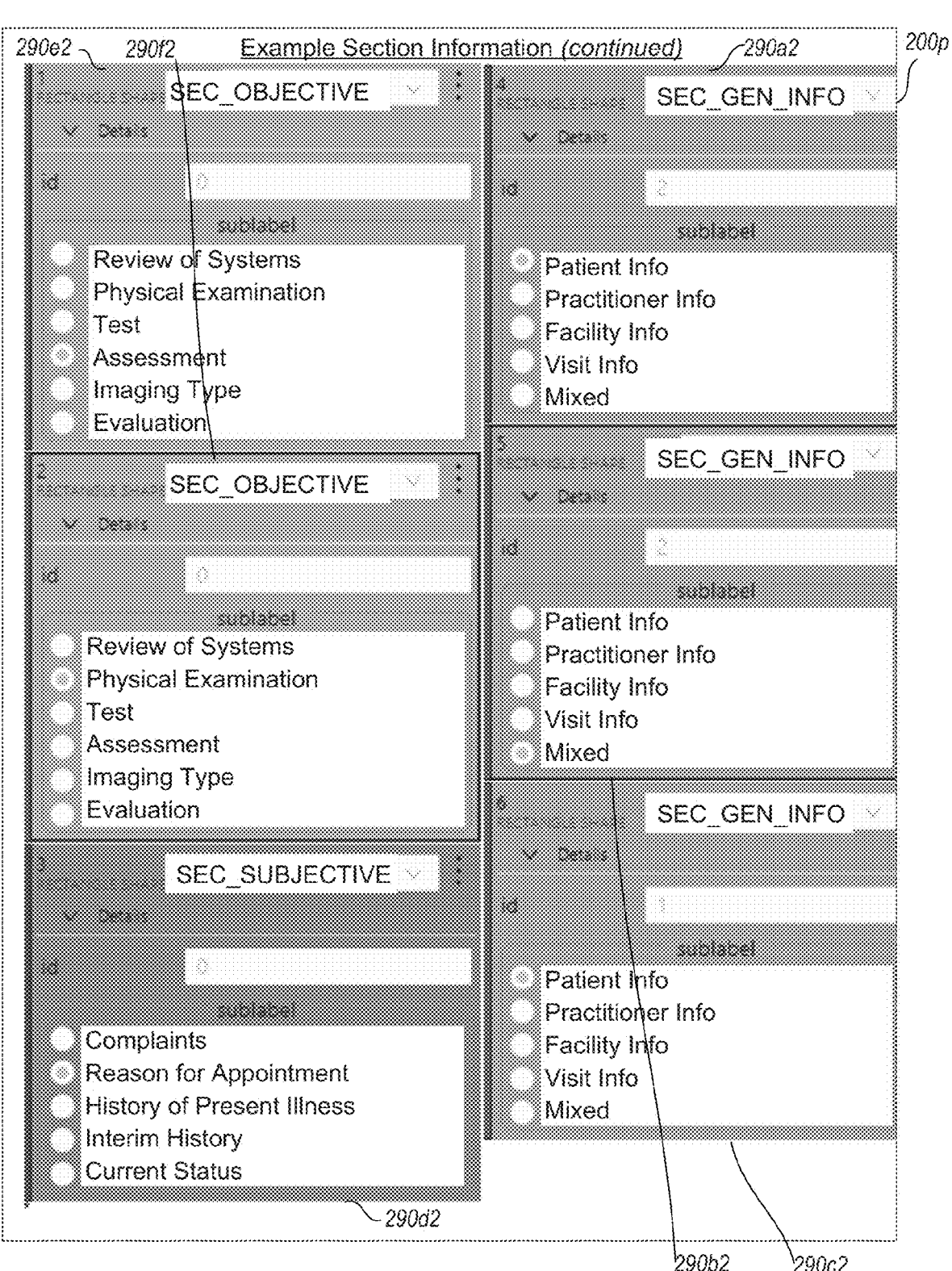
Figure 2R:
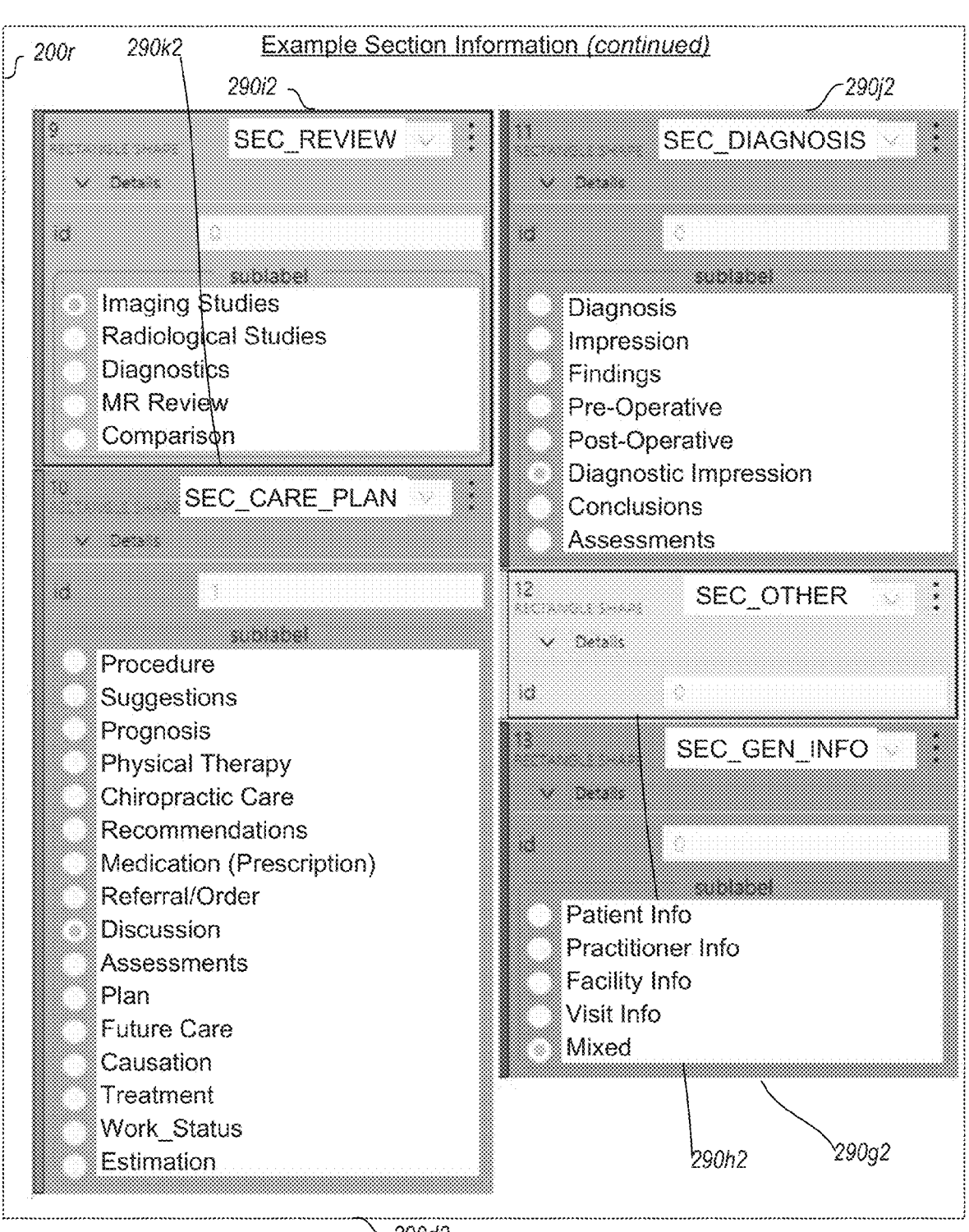
Figure 2S:
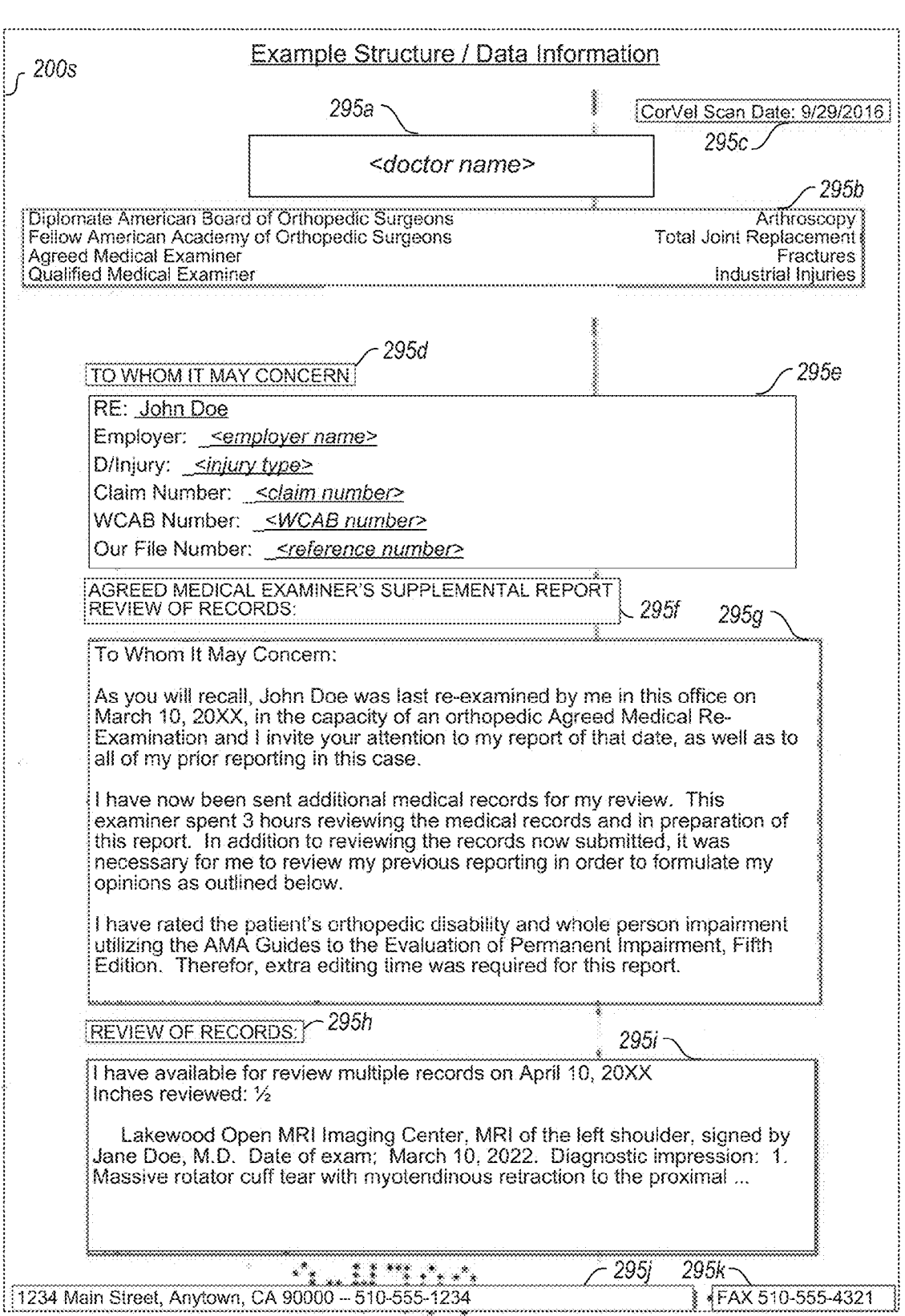
Figure 2T:
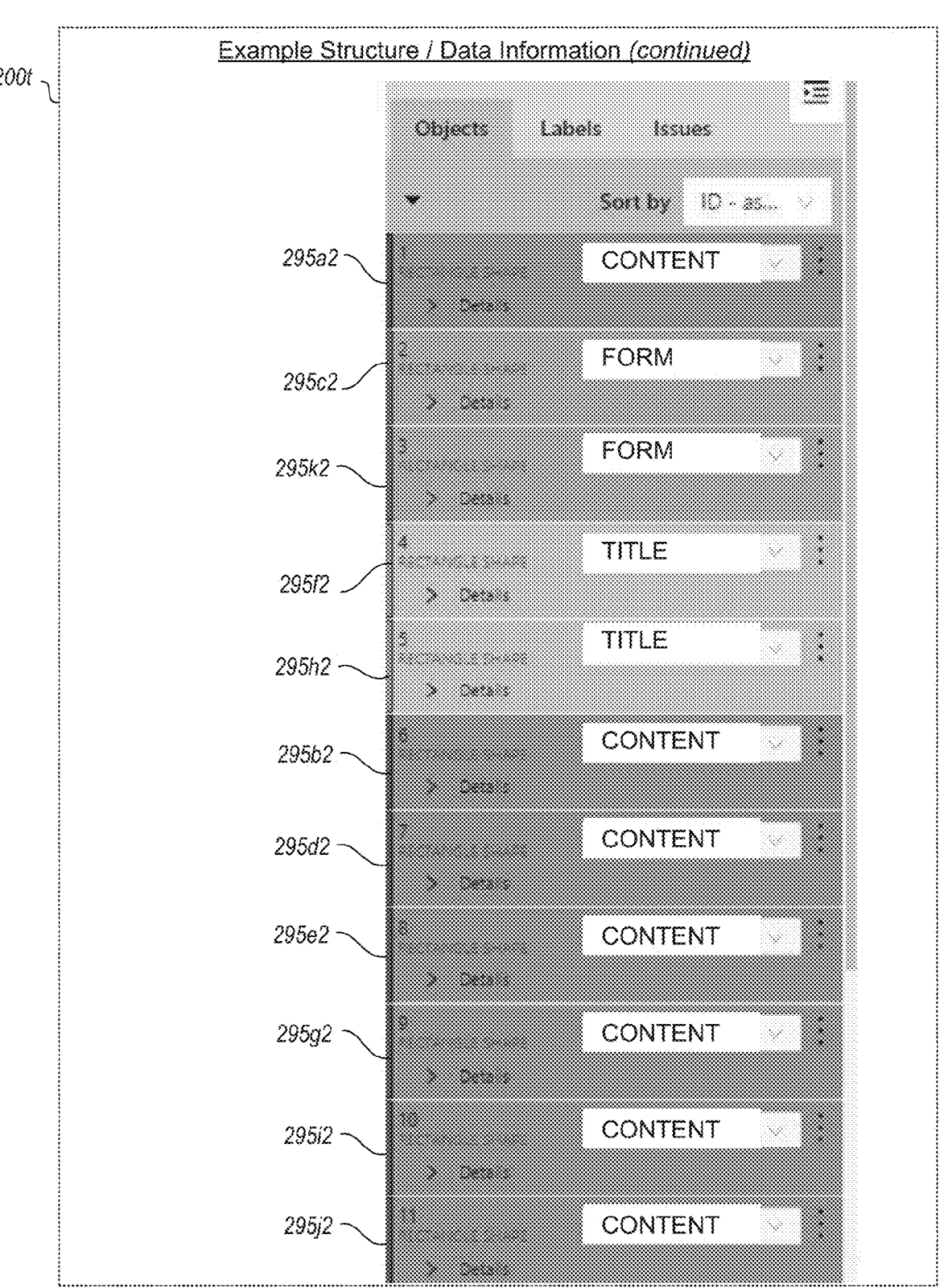
Figure 2V:
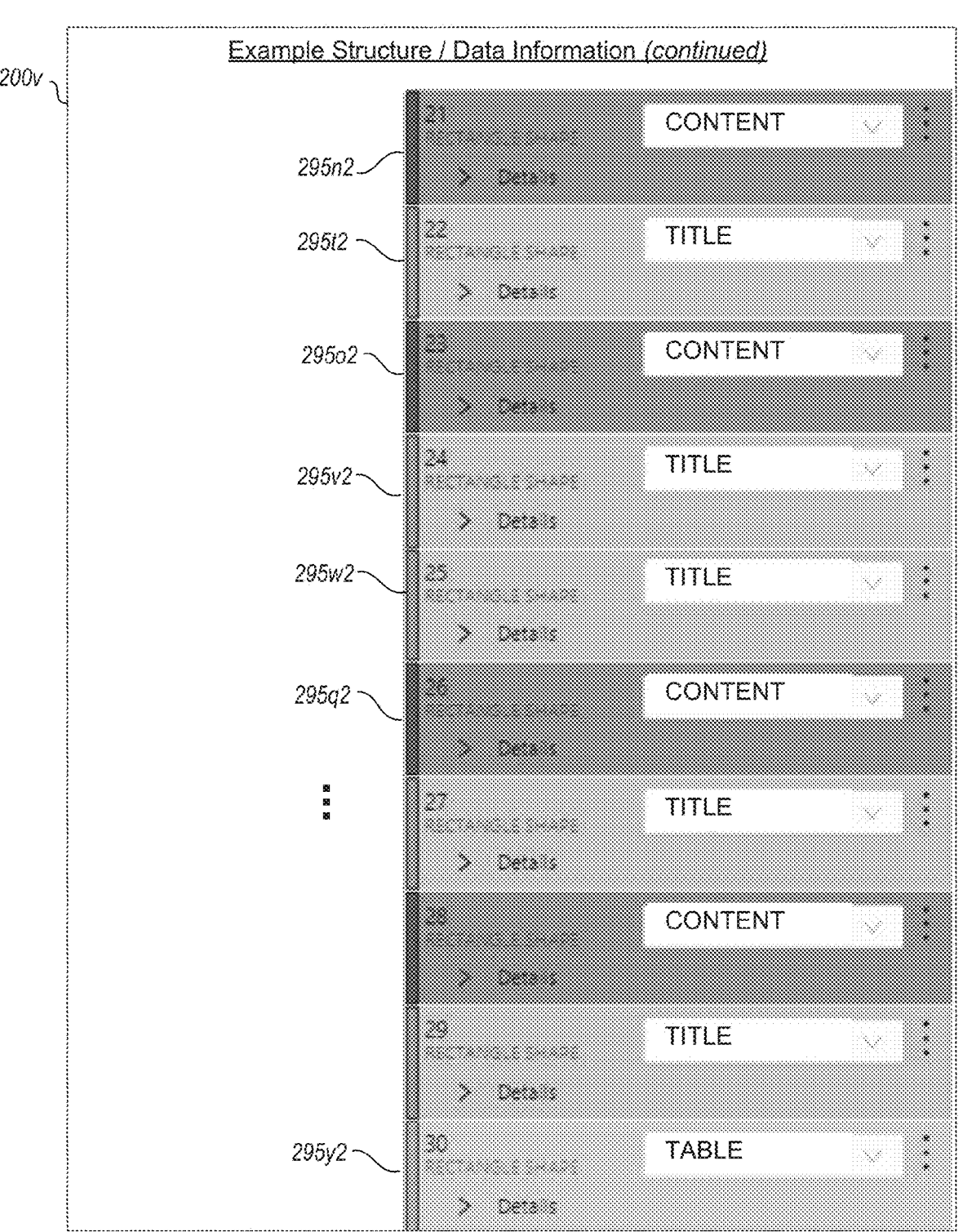
Figure 2W:
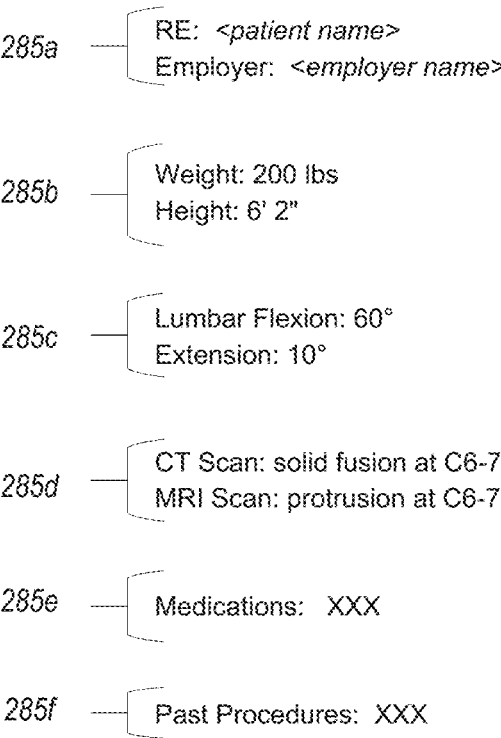

FIGS. 2A-2W illustrate further examples of performing described techniques, including automatically determining repair information for use in responding to queries and/or in other manners.

With respect to FIG. 2A, it illustrates example information 200a corresponding to network event information that may indicate repair problems and/or associated repair activities for one or more computing devices. In particular, information 205 illustrates example network event information (e.g., from an event log), which in this example may be separated into various encounters 210a-210g corresponding to different associated computing device entities XXX, YYY and ZZZ with associated user entities CCC, BBB and AAA, respectively. It will be appreciated that some encounters 210 correspond to a single event, such as for encounter 210a, while other encounters may correspond to a series of related events, such as for encounter 210b. Information 215 further provides example additional data available for each event, such as to include information about an associated time (in this case, with both a date and a time of day), a type, a unique ID, a source, descriptive text, etc.—it will be appreciated that the types of event information may vary in other embodiments and situations, and may be formatted in different manners than is illustrated.

FIG. 2B continues the example of FIG. 2A, and illustrates additional example information 200b about repair activities performed for a particular associated computing device entity, and in particular illustrates example maintenance activities performed for that computing device. In this example, the maintenance activities may be separated into multiple encounters 220a-220d corresponding to different associated repair/maintenance sessions, with some such encounters 220 corresponding to a single repair activity, such as for encounter 220a, while other encounters may correspond to multiple related repair activities, such as for encounter 220d. In this example, a provider of the repair activities is not identified, and may correspond to a single provider, although in other embodiments and situations multiple providers may perform different repair activities (e.g., at different times) for the associated computing device.

FIG. 2C continues the examples of FIGS. 2A-2B, and illustrates additional example information 200c about repair activities performed for a particular associated computing device entity by a particular provider of repair activities, and in particular is part of an invoice generated from that provider. In this example, information 200c includes various structural elements and associated sections, such as with the "Details" section including overview information, a "From" section including information about the provider, a "Bill To" section including information about the recipient (e.g., a user or company associated with the computing device), a table section "Service" that provides information about repair activity services performed in a tabular format, a table section "Parts/Materials" that provides information about repair objects (in this case parts and materials) used as part of the repair activity services, a "Notes" section that provides handwritten information with further details about the repair activities performed, etc.

While various example information has been provided in FIGS. 2A-2C related to types of repair information that may be available and used for computing device entities, it will be appreciated that other types of repair information may be available and used in other embodiments.

FIGS. 2D-2W provide further examples of automatically determining repair information for use in responding to queries and/or in other manners, including for repair information corresponding to medical repair activities for associated patient entities (e.g., by corresponding medical professional providers of medical services). For example, FIGS. 2D-2F illustrate examples of particular repair information documents that may be provided from a first provider of medical services for a particular patient entity, while FIGS. 2G-2L2 illustrate examples of additional repair information documents for that patient entity from other providers of medical services, FIGS. 2M1-2N8 illustrate examples of a GUI (graphical user interface) for accessing an entity's repair-related information, and FIGS. 2-O through -2W illustrate examples of associated analysis activities performed by the ARID system for example repair information documents.

In particular, FIG. 2D includes information 200d corresponding to a transmittal cover page (in this example, a fax coversheet) from a medical provider to a recipient (e.g., a user authorized to receive and review a particular patient entity's medical records, such as a lawyer involved in a related lawsuit), indicating that the following pages of the transmittal include medical records and an associated bill. When analyzed by the ARID system, the information 200d may be identified as a separate content grouping from the next page of the transmittal (shown in FIG. 2E) that includes medical record information (e.g., as part of a second content grouping that corresponds to the information shown in FIG. 2E and additional related information, not shown), and the information 200d may be categorized as being of a type that is excluded from further analysis (e.g., due to such transmittal documents not typically including substantive medical repair data). FIG. 2E continues the example of FIG. 2D, and illustrates a first of multiple pages of medical records that in this example correspond to a particular encounter with a patient by the medical services provider, and that may further include a variety of types of medical data about the patient (e.g., demographic information, past treatment history, current symptoms, current treatments, etc.). In particular, FIG. 2E illustrates information 200*e* that includes information about the patient name and date, and the beginning of a physical examination form with information about a date of an incident that resulted in injuries, including corresponding symptoms—while additional pages of the physical examination form are not illustrated, examples of such additional pages are included in U.S. Provisional Patent Application No. 63/331,414, filed Apr. 15, 2022 and entitled "Determining Repair Information Via Automated Analysis Of Structured And Unstructured Repair Data". FIG. 2F continues the examples of FIGS. 2D-2E, and illustrates continuing information 200*f* from the encounter, including billing information related to medical activities performed. In a manner similar to that of the transmittal information shown in FIG. 2D, the billing information illustrated in FIG. 2F may be identified as a separate content grouping relative to the medical notes illustrated in FIG. 2E and may be categorized in a manner that excludes it from further analysis due to the billing information, or alternatively the list of medical activities performed may be extracted and used as part of the medical data generated for the patient entity from the encounter. The information of FIGS. 2E-2F and of other additional pages of the physical examination form (not shown, such as to include information about medical treatments performed, further details of the symptoms of the patient, a past medical history for the patient with details such as medications and supplements taken, past vitals measurements, results of medical tests performed on the patient, etc.) may be determined to be part of the same content grouping in various manners, such as based on the similarity of the information formatting (e.g., similar headers and/or footers, similar type faces and layout, etc.), sequential page numbers, the same date and patient name, etc. FIGS. 2G-2J continue the examples of FIGS. 2D-2F and illustrate additional information about a further patient encounter with another medical provider, including information 200*g* of FIG. 2G that shows information about the patient name and date, and the beginning of a physical examination form with information about a date of an incident that resulted in injuries, including corresponding symptoms, and with information 200*h*, 200*i* and 200*j* of FIGS. 2H, 2I and 2J, respectively, including additional related information, such as a past medical history, measurements, exam results, assessment results, a treatment plan, and codes summarizing the diagnoses and corresponding activities—as with the information of FIGS. 2E-2F, the information of FIGS. 2G-2J may be determined to be part of the same content grouping and as part of a single encounter in various manners. FIG. 2K continues the examples of FIGS. 2D-2J and illustrates additional information 200*k* about a further patient encounter with another medical provider, including information about the patient name and date, and findings from an MRI procedure on the left knee. FIGS. 2L1 and 2L2 continue the examples of FIGS. 2D-2K, and illustrate information 20011 and 20012, respectively, that correspond to an encounter by the same patient with yet another medical provider, which in this example relates to an acupuncture treatment. It will be appreciated that the data of FIGS. 2D-2L2 are provided for purposes of example, and that the invention is not limited to the details shown.

With respect to determining content groupings and/or encounters, the described techniques may include analyzing contents of a document having repair data (and optionally additional types of data) using one or both of image-based analysis and text-based analysis to identify one or more content groupings each having related content (e.g., separate sub-documents that were combined to form the document, content of different types, content that is generated at different times and/or in different manners, etc.) and/or one or more encounters each corresponding to a single repair or other interaction session. For example, a trained neural network model may be used to perform a pairwise analysis of pairs of sequential images (e.g., images of separate pages) in order to determine whether the content of those two images are part of the same or different content groupings (i.e., whether or not a split exists between two different content groupings to which those two images correspond, such as a split occurring between two corresponding pages) and/or are part of the same or different encounters (i.e., whether or not a split exists between two different encounters to which those two images correspond, such as a split occurring between the two corresponding pages), and a trained transformer neural network model may be used to analyze text surrounding each determined split point to validate (or overrule) the initial split determination. Once the separate content groupings and/or encounters are identified, each such separate content grouping and/or encounter may then be analyzed to categorize that content grouping (e.g., from an enumerated list or set of content grouping categories) and/or encounter (e.g., from an enumerated list or set of encounter categories), including in at least some embodiments to use a combination of image-based analysis and text-based analysis, such as by a trained transformer neural network model that initially classifies the content of that content grouping or encounter as belonging to a particular content grouping category or encounter category based on the text of the content grouping or encounter (e.g., using only a subset of the content, such as 1-3 pages), and optionally with a subsequent image-based analysis of the content to validate (or overrule) that initial categorization (e.g., using a trained neural network model).

FIG. 2O (referred to herein as '2-O' for the sake of clarity) through 2R continue the examples of FIGS. 2D-2L2, and illustrate section information determined for an example set of medical data 200*o* and 200*q* corresponding to a single encounter and content grouping, although in other embodiments and situations a single document and/or content grouping and/or page may include information about multiple encounters. In this example of FIG. 2-O, various sections 290 are identified in information 200*o*, with information 200*p* of FIG. 2P providing further details about the sections—for example, a header section 290*a* is identified and may be excluded from further analysis, while other content sections 290*b*-290*f* are identified and may be further analyzed to extract relevant medical data. As further illustrated in FIG. 2P, additional data may be determined for each section, such as with a categorization label to correspond to a type of category of the section as illustrated in information sets 290*a*2-290*f*2 corresponding to sections 290*a*-290*f*, respectively. FIG. 2Q continues the examples of FIGS. 2D-2P, and in particular illustrates a second page of information 200*q* following that beginning in information 200*o* of FIG. 2-O, with the information 200*q* being part of the same encounter and content grouping as that of information 200*o*, and including additional identified sections 290*g*-290*k*. In this example, section 290*h* may be classified as a form that does not have substantive medical data for further analysis (but may be used as part of determining that the 'page 2' of information 200*q* is part of the same content grouping and encounter as information 200*o* of the preceding first page), while the other sections of information 200*q* may be content sections with relevant medical data to be extracted and further used. The information sets 290*g*2-290*k*2 of FIG. 2R correspond to the sections 290*g*-290*k* of FIG. 2Q, respectively, and illustrate additional information in a manner similar to that discussed with respect to FIG. 2P. Each section may be determined based at least in part on identified structural elements, as discussed further with respect to FIGS. 2S-2V. As non-exclusive examples, section types and associated values may include some or all of the following: review information, with values including "Imaging Studies", "Radiological Studies", "Diagnostics", "MR Review", "Comparison", etc.; past medical history information, with values including "Past Medical", "Allergies", "Medications", "Social", "Surgical", "Family", "Tobacco/Alcohol/Supplement", "Serious Conditions", "Previous Injuries", "Radiological Testing", "Summary", etc.; diagnosis information, with values including "Diagnosis", "Impression", "Findings", "Pre-Operative", "Post-Operative", "Diagnostic Impressions", "Conclusions", "Assessment", etc.; care plan information, with values including "Procedure", "Suggestions", "Prognosis", "Physical Therapy", "Chiropractic Care", "Recommendations", "Medication (Prescription)", "Referral/Order", "Discussion", "Assessments", "Plan", "Future Care", "Causation", "Treatment", "Work_Status", "Estimation", etc.; general information, with values including "Patient Info", "Practitioner Info", "Facility Info", "Visit Info", "Mixed", etc.; objective information, with values including "Review of Systems", "Physical Examination", "Test", "Assessment", "Imaging Type", "Evaluation", etc.; subjective information, with values including "Complaints", "Reason for Appointment", "History of Present Illness", "Interim History", "Current Status", etc.; prognosis information; other information; etc.

FIGS. 2S-2V continue the examples of FIGS. 2D through 2L2 and 2-O through 2R, and illustrate structural element information determined for an example set of medical data 200*s* and 200*u* corresponding to an encounter and content grouping. In the example of FIG. 2S, various structural elements 295*a*-295*k* are shown in information 200*s*, and additional corresponding structural elements 295*l*-295*z* are shown in information 200*u* of FIG. 2U. The information sets 295*a*2-295*k*2 of FIG. 2T correspond to the structural elements 295*a*-295*k*, respectively, of FIG. 2S, and the information sets 295*l*2-295*z*2 of FIG. 2V correspond to the structural elements 295*l*-295*z*, respectively, of FIG. 2U. As illustrated in FIGS. 2T and 2V, information about the various structural elements may be determined and stored in a manner similar to that previously discussed with respect to identified sections, and various types of medical data may be extracted from at least some of the structural elements. The structural elements may be of various types, such as tables 295*y* and 295*z* of FIG. 2U (whether with or without lines to indicate rows and columns), forms with key value pairs 295*u*, textual medical data such as in structural element 295*x*, etc. The structural elements may be further joined together into corresponding sections, such as the section including structural subtitle and content elements 295*r* and 295*s*, as discussed elsewhere herein. As non-exclusive examples, structural elements may include some or all of the following: "subtitle"; "content"; "form"; "table"; "header"; "footer"; "title"; "questionnaire"; "other"; etc.

With respect to identifying structural elements and sections, in at least some embodiments, some or all content groupings (e.g., content groupings remaining after the optional exclusion of some content grouping categories) or encounter groupings (if available) are each analyzed to identify subsets of that content that include structural elements, by using a trained computer vision object-detection model (e.g., Detectron2) to analyze images of that content and determine separate structural element objects of that content, such as to identify titles, sub-titles, tables, 'forms' with key-value pairs, questionnaires, header/footers, images, graphs, substantive data (e.g., text, numbers, etc.), paragraph and line numbers, etc., and to optionally assign corresponding labels to each structural element related to the type of the structural element. Sections may then be identified by, for example, combining related structural elements (e.g., based at least in part on structural element labels/types, such as to combine a title and/or sub-title with following substantive data), while treating other structural elements (e.g., tables, forms, questionnaires, images, graphs, etc.) as separate sections. Once the separate sections are identified, each such separate section is then analyzed to categorize that section (e.g., from an enumerated list or set of section categories), including in at least some embodiments to use a text classification model (e.g., a trained transformer neural network model, such as based on a Bert NLP, or Natural Language Processing, model; a text vectorization technique; etc.) that classifies the content of that section as belonging to a particular section category based at least in part on text of that section.

FIG. 2W continues the examples of FIGS. 2D-2V, and illustrates example data 285*a*-285*d* that may be extracted and linked from various other medical documents, including in this example to have general information 285*a*, key-value pairs 285*b*, test results 285*c*, medical procedures performed 285*d* (and resulting information), medications 285*e*, medical history information 285*f*, etc. With respect to extracting repair data from a section or structural element into one or more data groupings corresponding to an associated entity, in at least some embodiments, some or all sections (e.g., sections remaining after the optional exclusion of some section categories) and/or their structural elements are each analyzed to extract repair data from the content and to identify an associated device or other entity to which the repair data corresponds (e.g., the device or other entity on which the repair activities are performed), such as to identify particular repair activities performed and corresponding results for a particular associated device or other entity, including to determine values for particular attributes of the associated device or other entity. For example, text may be extracted and analyzed in at least some embodiments using one or more trained OCR (optical character recognition) models, optionally with additional processing to handle some specialized types of sections (e.g., tables, forms, graphs, etc.)—as one example, information in some such specialized section types may provide information about particular attributes of an associated device or other entity, such as based on a table column and cell value, a key-value pair of a form, one or more axes and values of a graph, etc. In addition, the analysis of the text may include separating it into multiple data groupings each having an associated predicted type or topic, with non-exclusive examples including general information (e.g., names, dates, addresses, etc.), diagnosis of problems needing repair, treatments of particular repair problems, care plans for planned further repair activities to manage or solve particular repair problems, a history of past repair activities and problems, review by one repair provider of repair activities by others, etc.

FIGS. 2M1-2M7 and 2N1-2N8 continue the examples of FIGS. 2A through 2L2 and 2-O through 2W, with FIGS. 2M1-2M7 illustrating examples of a GUI and associated functionality that may be provided in at least some embodiments, and FIGS. 2N1-2N8 illustrating an example downloaded summary of a case involving a patient entity and associated medical repair information corresponding to a damage incident (e.g., an accident)—in these illustrated examples, the GUI is used to provide information based at least in part on medical repair data (e.g., in a manner similar to that discussed with respect to FIGS. 2D through 2L2 and 2-O through 2W), but may be used to provide information and associated functionality for other types of repair data and/or associated data in other embodiments and situations.

In particular, with respect to FIG. 2M1, it includes information 200m1 that illustrates example general information including medical repair data and other information for an example legal suit involving a party who was injured, with the illustrated patient entity being John Doe, and general overview information including the patient's height and weight and BMI (body mass index) as well as overview information about a date of injury and first and last treatments—various user-selectable GUI controls are also displayed, including to enable an end user (not shown) to view a case summary, download a case summary, upload files (e.g., medical records) to be analyzed, to show notifications, to open a folder to see individual medical records to access different cases, etc. FIGS. 2N1 through 2N8 include information 200n1 through 200n8, respectively, that illustrate an example of a case summary that is downloaded or otherwise provided in response to selection of the 'Download Case Summary' user-selectable GUI control.

Figure 3:
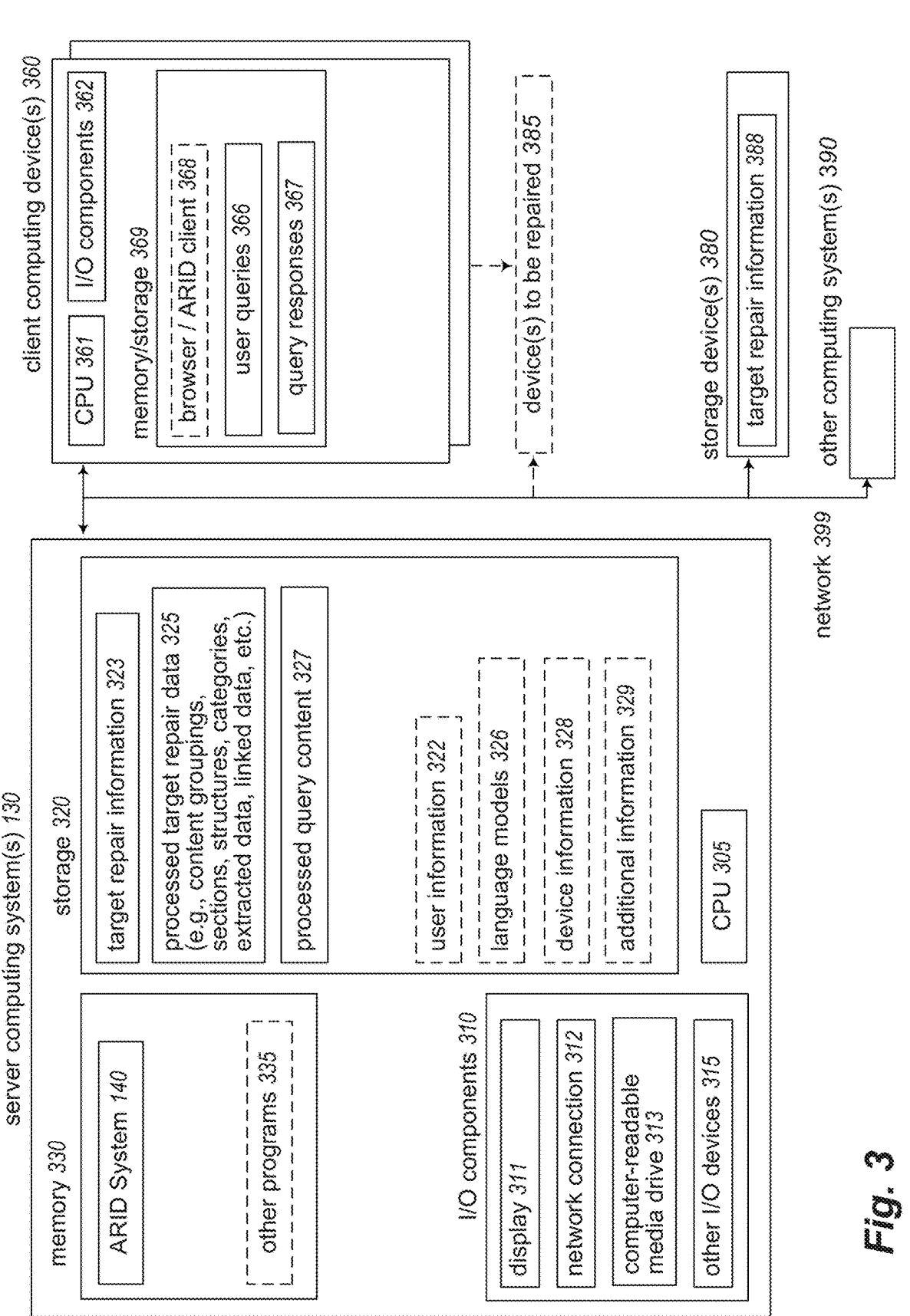
FIG. 3 is a block diagram illustrating an example of computing systems for use in performing described techniques, including automatically determining repair or maintenance information for computing devices or other types of repair or maintenance information.

FIGS. 2M2 through 2M7 continue the examples of FIG. 2M1, and illustrate additional screens or portions of the example GUI in respective information groups 200m2 through 200m7. The information 200m2 of FIG. 2M2 corresponds to selection of the 'View Case Summary' user-selectable GUI control, such as to cause display of a Timeline showing medical repair encounters organized by date/time, and multiple user-selectable tab controls to view medical repair information of various types that has been automatically extracted and categorized by the ARID system, with the tabs including 'Medical History', 'Diagnoses', 'rognoses', 'Treatments' and 'Hand Written' in this example. The 'Medical History' tab control is selected in this example (e.g., by default upon entering the case summary view, by a prior manual selection of an end-user, etc.), with corresponding medical history documents and related information illustrated (and with additional medical history available by scrolling down, by selecting displayed information under the 'Medical History' tab, by selecting information shown in the 'Timeline', etc.)—such medical history information in this example illustrates thumbnail images of particular medical record documents and corresponding medical record data extracted from the documents about corresponding medical history information for John Doe. As previously noted, the information shown in the example GUI of FIGS. 2M1-2M7 is automatically extracted at least in part from analysis of the medical record data for John Doe, as well as additional user-selectable control tabs to access further information about specific types of medical record data, such as diagnoses, treatments, etc., as well as handwritten records—the information available via the GUI may further be the result of analysis to remove duplicative records if they are present in the medical record data that is analyzed. The information 200m3 of FIG. 2M3 illustrates further details about diagnosis information, such as based on selection of the illustrated Diagnoses control tab, and which in this example illustrates thumbnail images of particular medical record documents and corresponding medical record data extracted from the documents about corresponding diagnoses for John Doe. The information 200m4 of FIG. 2M4 illustrates further details about prognosis information, such as based on selection of the illustrated Prognoses control tab, and which in this example indicates that no prognosis information was identified in the automated analysis of the medical repair document information associated with the John Doe patient entity. The information 200m5 of FIG. 2M5 illustrates further details about treatment information, such as based on selection of the illustrated Treatments control tab, and which in this example illustrates thumbnail images of particular medical record documents and corresponding medical record data extracted from the documents about corresponding medical treatments for John Doe. The information 200m6 of FIG. 2M-6 illustrates further details about handwritten record information, such as based on selection of the illustrated Hand Written records control tab, and which in this example illustrates thumbnail images of particular medical record documents and optionally corresponding medical record data extracted from handwritten information in those documents for John Doe. The information 200m7 of FIG. 2M7 illustrates further details about selection of the "Imaging Report" folder of FIG. 2M1, and which in this example illustrates user-selectable links associated with particular imaging reports that are available for review. It will be appreciated that the GUI screens and associated functionality and data of FIGS. 2M1-2M7 and 2N1-2N8 are provided for purposes of example, and that the invention is not limited to the details shown.

Thus, as discussed in greater detail elsewhere herein, the types of repair information discussed with respect to FIGS. 2A-2W may be used in various manners, including to be used to initiate further repair activities (e.g., in an automated manner), to be displayed to users, used to provide responses to queries, etc. It will be also be appreciated that questions and other queries in a medical domain may be of various types, such as related to a particular diseases or other medical conditions, particular medical symptoms, particular medicines and other treatments and other health-related activities involved in preventative actions or other actions to improve fitness and wellbeing, particular surgeries and other medical procedures, particular medical devices and other health-related objects used with respect to medical treatments and other health-related activities, particular patients or groups of patients, etc., and that the summarization and encoding of information for a medical domain may include identifying and encoding information about some or all such elements (e.g., diseases or other conditions, symptoms, treatments, medical procedures, medical devices and other health-related objects, patients, etc.). In addition, it will be appreciated that a variety of other types of information may be available and used in other embodiments, including to provide a response in a different format than is shown in the examples of FIGS. 2A-2W.

Various details have been provided with respect to FIGS. 2A-2W, but it will be appreciated that the provided details are non-exclusive examples included for illustrative purposes, and other embodiments may be performed in other manners without some or all such details.

FIG. 3 is a block diagram illustrating an embodiment of one or more server computing systems 130 executing an implementation of an ARID system 140—the server computing system(s) and ARID system may be implemented using a plurality of hardware components that form electronic circuits suitable for and configured to, when in combined operation, perform at least some of the techniques described herein. In the illustrated embodiment, each server computing system 130 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 130 and executing ARID system 140 may communicate with other computing systems and devices via one or more networks 399 (e.g., the Internet, one or more cellular telephone networks, etc.), such as user client computing devices 360 (e.g., used to supply queries; receive responses; and use the received response information, such as to implement automated repairs to associated devices 385 and/or to display or otherwise present response information to users of the client computing devices), optionally one or more devices 385 to be repaired (e.g., if the devices include networking capabilities or other data transmission capabilities), optionally other storage devices 380 (e.g., used to store and provide information 388 for one or more target domains/repair areas), and optionally other computing systems 390.

In the illustrated embodiment, an embodiment of the ARID system 140 executes in memory 330 in order to perform at least some of the described techniques, such as by using the processor(s) 305 to execute software instructions of the system 140 in a manner that configures the processor(s) 305 and computing system 130 to perform automated operations that implement those described techniques. The illustrated embodiment of the ARID system may include one or more components and/or modules, not shown, to each perform portions of the functionality of the ARID system, and the memory may further optionally execute one or more other programs 335. The ARID system 140 may further, during its operation, store and/or retrieve various types of data on storage 320 (e.g., in one or more databases or other data structures), such as various types of user information 322, target repair information 323 (e.g., local copies of some or all of information 388 on remote systems such as storage devices 380; domain-specific information to use in customizing the analyzing of content for a domain and/or other additional supplemental information; etc.), processed target repair data 325 of one or more types (e.g., content groupings; encounters; sections; structural elements; associated category and/or topic information; extracted data, optionally associated together into data groupings based on the documents/content groupings/encounters/sections/etc. from which it is extracted; sets of linked data, such as associated with particular entities; etc.), processed query-based content 327 (e.g., candidate data groupings, generated responses, etc.), optionally language models 326 to use in analyzing content for particular repair domains, optionally device-specific information 328 (e.g., related to devices to be repaired) or information specific to other entities, and/or various other types of optional additional information 329.

Some or all of the user client computing devices 360 (e.g., mobile devices), devices 385 to be repaired, storage devices 380, and other computing systems 390 may similarly include some or all of the same types of components illustrated for server computing system 130. As one nonlimiting example, the computing devices 360 are each shown to include one or more hardware CPU(s) 361, I/O components 362, and memory and/or storage 369, with a browser and/or ARID system client program 368 optionally executing in memory to interact with the ARID system 140 and present or otherwise use query responses 367 that are received from the ARID system for submitted user queries 366. While particular components are not illustrated for the other devices/systems 380 and 385 and 390, it will be appreciated that they may include similar and/or additional components.

It will also be appreciated that computing system 130 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated ARID system 140 may in some embodiments be distributed in various components, some of the described functionality of the ARID system 140 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or modules and/or systems may execute in memory on another device and communicate with the illustrated computing systems via inter-computer communication. In some embodiments, some or all of the described techniques may be performed by hardware means that include one or more processors and/or memory and/or storage when configured by one or more software programs (e.g., by some or all of the ARID system 140 executing on server computing systems 130) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIG. 4 is a flow diagram of an example embodiment of an ARID system routine 400. The routine may be provided by, for example, execution of the ARID system 140 of FIGS. 1A and 1B, and/or the ARID system 140 of FIG. 3, and/or corresponding functionality discussed with respect to FIGS. 2A-2W and elsewhere herein, such as to analyze repair information and determine resulting repair data of one or more types, and to use that repair data in one or more manners, including to automatically determine responses to received queries (e.g., with respect to computing devices or other devices, with respect to medical information, etc.). In the illustrated embodiment, the routine analyzes information about one or more domains of interest at various times, such as to pre-process information about a particular domain (e.g., as instructed by a human operator of the ARID system, as requested by a third-party entity, etc.) to determine at least some types of domain-specific information for use in responding to later queries based on such information, while in other embodiments the routine may instead dynamically generate some or all types of domain-specific information in response to requests from users or other entities in at least some situations.

In the illustrated embodiment, the routine 400 begins at block 405, where instructions or other information is received. The routine continues to block 410, where it determines if the instructions or other information received in block 405 are to analyze target repair content, such as for a target repair area or other target domain, and if so continues to block 420 where it retrieves or otherwise obtains the target information (e.g., uses information received in block 405) to be analyzed (e.g., multiple documents that are part of information for the target domain). In block 425, the routine then initiates execution of an ARID Target Repair Information Analyzer component routine to analyze and summarize information from the target domain (along with an indication of that target domain), such as corresponding to component 166 of FIGS. 1A and 1B, and with one example of a corresponding routine for performing such activities discussed further in FIG. 5. In block 430, the routine then receives the processed target repair data groupings from block 425, and stores the information for subsequent use. It will be appreciated that, while the routine indicates proceeding to block 430 immediately after block 425, in other embodiments the routine may operate in an asynchronous manner such that other operations are performed (e.g., corresponding to handling another set of instructions or information that are received in block 405, such as from a different user and/or for a different entity) while waiting for a response from block 425, and that the operations of block 425 may be performed in a substantially immediate manner (e.g., less than one second, less than 10 seconds, less than one minute, etc.) in at least some embodiments.

After block 430, or if it is instead determined in block 410 that the information or instructions received in block 405 are not to analyze content for a target repair area or other target domain, the routine continues to block 440, where it determines if the information or instructions received in block 405 are to respond to a received query, and if not continues to block 485. Otherwise, the routine continues to block 445 where it obtains a query (e.g., in natural language form, using information received in block 405, etc.), and then proceeds to block 450 to initiate execution of ARID Query Matcher and Response Determiner components' routines, such as to correspond to components 167 and 169 of FIGS. 1A and 1B, and with one example of a corresponding routine for performing such activities discussed further in FIG. 6. In block 455, the routine then receives query response information from block 450, and stores the information for later use, with the query response information then provided in block 480 as a response to the received query. It will be appreciated that, while the routine indicates proceeding to block 455 immediately after block 450, in other embodiments the routine may operate in an asynchronous manner such that other operations are performed (e.g., corresponding to handling another set of instructions or information that are received in block 405, such as from a different user or other entity) while waiting for a response from block 450, and that the operations of block 450 may be performed in a substantially immediate manner (e.g., in a real-time or near-real-time manner, such as a fraction of a second, a second, less than 10 seconds, etc.) in at least some embodiments.

In block 485, the routine proceeds to perform one or more other indicated operations as appropriate, with non-exclusive examples of such other operations including retrieving and providing previously determined or generated information (e.g., previous user queries, previously determined responses to user queries, previously summarized repair data for one or more target domains, etc.), receiving and storing information for later use (e.g., information about one or more target domains, such as documents to be analyzed, domain-specific language models, etc.), providing information about how one or more previous query responses were determined, performing housekeeping operations, etc.

After blocks 480 or 485, the routine continues to block 495 to determine whether to continue, such as until an explicit indication to terminate is received, or alternatively only if an explicit indication to continue is received. If it is determined to continue, the routine returns to block 405 to await further information or instructions, and if not continues to block 499 and ends.

FIG. 5 is a flow diagram of an example embodiment of an ARID Repair Information Analyzer routine 500. The routine may be provided by, for example, execution of the ARID Repair Information Analyzer component 166 of FIGS. 1A-1B and/or a corresponding component (not shown) of the ARID system 140 of FIG. 3 and/or with respect to corresponding functionality discussed with respect to FIGS. 2A-2W and elsewhere herein, such as to analyze and summarize repair information (e.g., for a particular entity, for a particular target domain, etc.). In addition, in at least some situations, the routine 500 may be performed based on execution of block 425 of FIG. 4, with resulting information provided and execution control returning to that location when the routine 500 ends. In this example, the routine 500 is performed with respect to an initial analysis of a particular group of repair data (e.g., medical records and optionally other associated health-related information for one or more patient entities), but in other embodiments may be similarly performed to update previously analyzed information, such as to analyze additional documents that become available for an entity and/or domain after a prior analysis of other documents and use of resulting information has been completed. Furthermore, in a manner similar to that of the other routines, the routine 500 may determine repair data in advance of the use of that determined repair data, and/or dynamically in response to a request for such information.

The illustrated embodiment of the routine 500 begins at block 505, where an indication of target repair information to be analyzed (e.g., particular documents with some or all of the target repair information) is received. In block 515, the routine then obtains documents with the target repair information and optionally additional domain-specific information (e.g., domain-specific language models, etc.), such as by using currently provided repair data (e.g., received in block 505), using previously stored repair information, by searching for or otherwise dynamically identifying corresponding repair information, etc. In block 520, the routine then, for each target repair information documents, split the content of the document into one or more related content groupings, such as by using a combination of image-based and text-based analyses as discussed in greater detail elsewhere herein. In block 525, the routine then, for each content grouping, generates one or more associated content grouping categories, such as by using text-based analyses (optionally in combination with image-based analyses) as discussed in greater detail elsewhere herein. In block 530, the routine then optionally excludes some content groupings from further analysis, such as based on their content grouping categories. In block 535, the routine then, for each remaining content grouping, optionally splits the content of that content grouping into one or more encounters, and then splits each set of content for an encounter (if available) or for the content grouping (if not) and to one or more related sections each having one or more structural elements, such as by using a combination of image-based and text-based analyses as discussed in greater detail elsewhere herein. After block 535, the routine in block 540 then, for each section, generates one or more section categories, such as by using a text-based analysis as discussed in greater detail elsewhere herein. In block 545, the routine then optionally excludes some sections from further analysis based at least in part on their section categories, in block 550, for each remaining section, analyzes the content of that section to identify associated entities, to extract attribute data values and other repair data (e.g., by using a text-based analysis), including to optionally predict additional data. In block 555, for each entity, prepared data is linked together from different documents and/or content groupings and/or encounters and/or sections if available, including to optionally add the currently determined repair data to previously stored repair data for that entity.

After block 555, the routine continues to block 585 to store the generated information for later use (e.g., in tables of one or more SQL databases), and to optionally provide some or all of the generated information to the requester that initiated invocation of the routine 500. After block 585, the routine continues to block 599 and ends.

Figure 6:
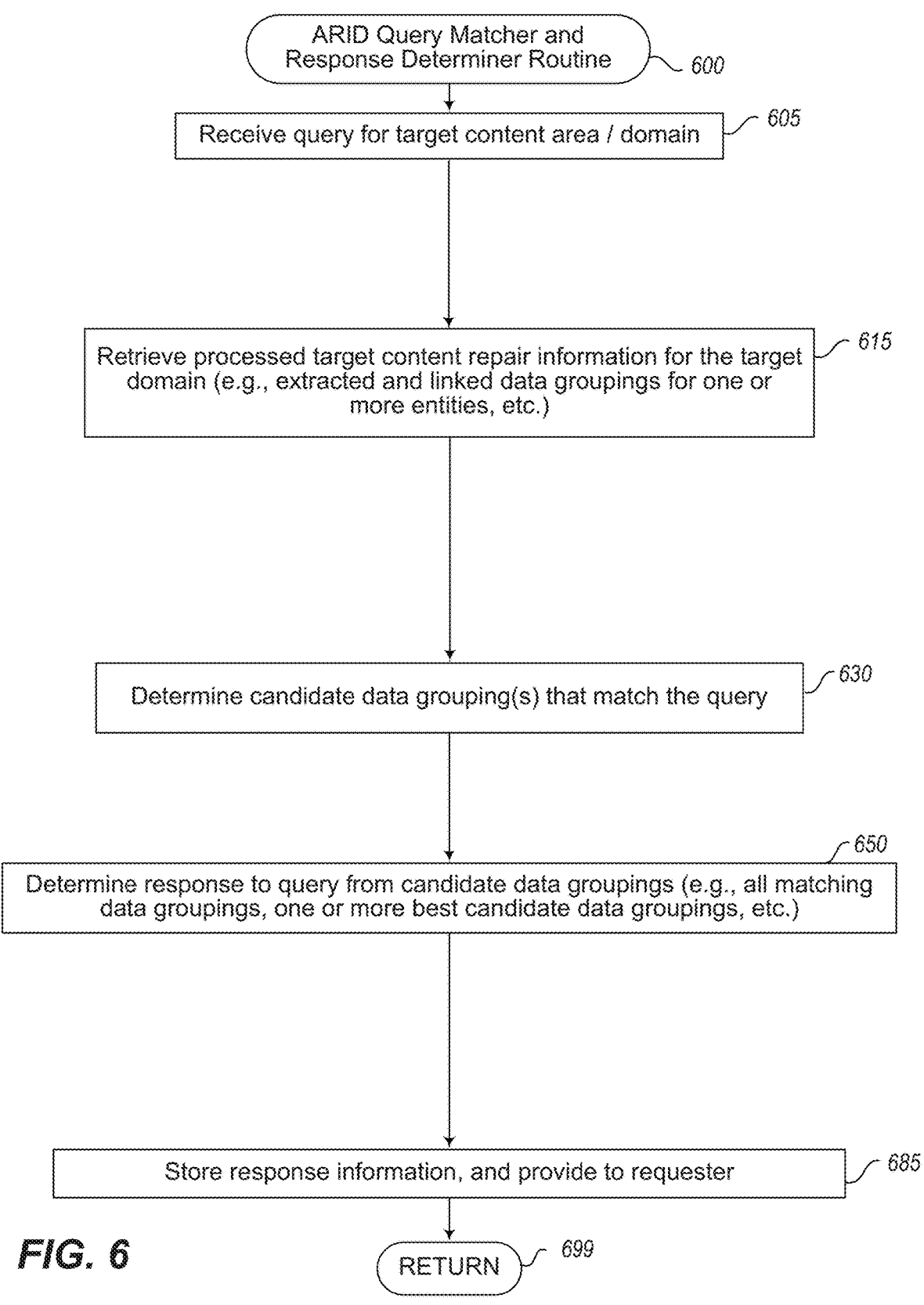
FIG. 6 illustrates a flow diagram of an example embodiment of an ARID Query Matching and Response Determination component routine.

FIG. 6 is a flow diagram of an example embodiment of an ARID Query Matcher and Response Determiner routine 600. The routine may be provided by, for example, execution of the ARID Query Matcher component 167 and ARID Response Determiner component 169 of FIGS. 1A-1B and/or of one or more corresponding components (not shown) of the ARID system 140 of FIG. 3 and/or with respect to corresponding functionality discussed with respect to FIGS. 2A-2W and elsewhere herein (e.g., to implement some or all of the example GUI functionality of FIGS. 2M1-2M7), such as to respond to a received query by determining a response to the query using corresponding summarized repair data. The routine 600 may be initiated by, for example, execution of block 450 of FIG. 4, with resulting information provided and execution control returning to that location when the routine 600 ends. In addition, in a manner similar to that of the other routines, the routine 600 may dynamically determine and provide responses to received queries in the illustrated embodiment, but in other embodiments may determine and store responses to some or all queries in advance of receiving corresponding new user queries (e.g., based on instructions received from a human operator of the ARID system, based on previous queries by other users, etc.) and use such stored responses when such new queries are received. In addition, in the illustrated embodiment, the determination of encoded domain information in FIG. 5 is illustrated as being performed separately from the use of such information in FIG. 6, although in other embodiments such activities may be performed in other manners, including to dynamically perform some or all of the activities of FIGS. 5 and 6 in response to a received user query or other corresponding instruction.

The illustrated embodiment of the routine 600 begins in block 605, where a query is received corresponding to repair data of one or more types (e.g., for a particular associated entity). In block 615, the routine then retrieves corresponding processed target repair data (e.g., sets of linked data groupings, etc.), such as by performing one or more corresponding retrieval actions for stored data (e.g., SQL queries on one or more SQL databases), although in other embodiments may instead dynamically generate such information (e.g., if the user query corresponds to a new type for which previously stored information is not available, if updates to underlying information of the requested type are available but not yet analyzed, etc.). In block 630, the routine then determines a subset of the candidate data groupings that match the query(ies). In block 650, the routine then determines a response to the query from the candidate data groupings, such as all of the candidate data groupings, by analyzing the candidate data groupings to select one or more of the candidate data groupings (or subsets of one or some or all of the candidate data groupings) that are determined to best match the query, etc. After block 660, the routine continues to block 685 to store the determined response information for later use, and to provide that determined information to the requester that initiated invocation of the routine 600. After block 685, the routine continues to block 699 and ends.

FIG. 7 is a flow diagram of an example embodiment of a client device routine 700. The routine may be provided by, for example, operations of a client computing device 110 of FIGS. 1A-1B and/or a client computing device 360 of FIG. 3 and/or with respect to corresponding functionality discussed with respect to FIGS. 2A-2W and elsewhere herein, such as to interact with users or other entities who submit queries (or other information) to the ARID system, to receive responses (or other information) from the ARID system, and to use the received information in one or more manners (e.g., to automatically implement corrective repair activities in accordance with a received response that includes corresponding executable instructions; to otherwise assist in initiating corrective or preventative repair activities in accordance with a received response that includes corresponding information, such as by displaying or otherwise presenting at least some such information to one or more users to enable them to perform at least some of the corresponding activities; to otherwise assist in providing information from the determined response to one or more users or other requesting entities; etc.).

The illustrated embodiment of the routine 700 begins at block 703, where information is optionally obtained and stored about the user of the client device and/or about a target domain, such as for later use in personalizing or otherwise customizing further actions to that user and/or that target domain. The routine then continues to block 705, where information or a request is received. In block 710, the routine determines if the information or request received in block 705 is to perform a query, and if not continues to block 785. Otherwise, the routine continues to block 720, where it receives the query (e.g., in a natural language format, such as free form text), and sends a query to the ARID system interface to obtain a corresponding response, optionally after personalizing and/or customizing the information to be provided to the ARID system (e.g., to add information specific to the user, such as location, demographic information, preference information, etc.; to add an indication of one or more specific target domains to use; to add an indication of a specific target entity for which to gather repair data; etc.). In block 730, the routine then receives a response to the query from the ARID system, such as to include repair data. In block 780, the routine then initiates use of the received query response information, such as to initiate automated repair activities, to display or otherwise present response information to the user, etc., including to optionally perform such use in a personalized and/or customized manner (e.g., to perform a display or other presentation in accordance with preference information for the user, to select a type of action to take based on information specific to the user, etc.). It will be appreciated that, while the routine indicates proceeding to block 730 immediately after block 725, in other embodiments the routine may operate in an asynchronous manner such that other operations are performed (e.g., corresponding to handling another set of instructions or information that are received in block 705, such as from a different user or other entity) while waiting for a response from block 725, and that the operations of block 725 may be performed in a substantially immediate manner (e.g., less than one second, less than 10 seconds, less than one minute, etc.) in at least some embodiments.

In block 785, the routine instead performs one or more other indicated operations as appropriate, with non-exclusive examples including sending information to the ARID system of other types (e.g., information about a new target domain and/or entity for which to analyze and summarize information before corresponding user queries are received, information to be processed for an indicated target domain and/or entity, etc.), receiving and responding to requests for information about previous user queries and/or corresponding responses for a current user and/or client device, receiving and store information for later use in personalization and/or customization activities, receiving and responding to indications of one or more housekeeping activities to perform, etc.

After blocks 780 or 785, the routine continues to block 795 to determine whether to continue, such as until an explicit indication to terminate is received (or alternatively only if an explicit indication to continue is received). If it is determined to continue, the routine returns to block 705, and if not continues to block 799 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the claims that are specified and the elements recited therein. In addition, while certain aspects of the invention may be presented at times in certain claim forms, the inventors contemplate the various aspects of the invention in any available claim form. For example, while only some aspects of the invention may be recited at a particular time as being embodied in a computer-readable medium, other aspects may likewise be so embodied.

What is claimed is:

1. A computer-implemented method comprising:

obtaining, by one or more computing systems, a plurality of documents with document contents describing a plurality of repair activities performed on a device by multiple repair service providers at a plurality of times, the contents including repair data of multiple types for the device using both structured and unstructured data formats and having information about values for attributes of the device;

determining, by the one or more computing systems and using a combination of image-based analysis and text-based analysis of the document contents, the repair data of the multiple types for the device, including:

determining, by the one or more computing systems, a plurality of content groupings within the plurality of documents, including, for each of the plurality of documents, determining multiple content groupings within the document that were generated separately from each other before being combined in the document, including analyzing contents of the document using a first trained neural network to identify candidate content grouping boundaries between content groupings by determining whether images of subsequent pages of the document are part of a same content grouping or multiple different content group-ings, and including using a second trained neural network to validate at least some of the candidate content grouping boundaries by analyzing surround-ing text from the contents of the document around each of the at least some candidate content grouping boundaries to verify that the surrounding text belongs to multiple different content groupings;

determining, by the one or more computing systems and for each of the plurality of content groupings, one of multiple enumerated content grouping cat-egories for the content grouping, including generat-ing the one content grouping category for the content grouping by using a third trained neural network that analyzes text of one or more document pages that include the content grouping;

determining, by the one or more computing systems, a content grouping subset that includes some of the plurality of content groupings for further analysis, including excluding at least one of the plurality of content groupings from the content grouping subset based at least in part on the determined one content grouping category for each of the excluded at least one content groupings;

determining, by the one or more computing systems, a plurality of sections within the content groupings of the content grouping subset, including, for each of the content groupings of the content grouping subset, determining multiple sections within the content grouping that each includes a group of content in a format different than surrounding sections within the content grouping, including using a fourth trained neural network to identify structural elements of multiple types within the content grouping based at least in part on analysis of one or more images showing the content grouping, and including com-bining some of the structural elements to form one or more sections of the multiple sections, and including selecting other of the structural elements to each be one or more other sections of the multiple sections;

determining, by the one or more computing systems and for each of the plurality of sections, one of multiple enumerated section categories for the sec-tion by using a fifth trained neural network that analyzes text of the section;

determining, by the one or more computing systems, a section subset that includes some of the plurality of sections for further analysis, including excluding at least one of the plurality of sections from the section subset based at least in part on the determined one section category for each of the excluded at least one sections;

extracting, by the one or more computing systems, the repair data of the multiple types for the device from the sections of the section subset, including using a natural language processing model trained for ana-lyzing repair information to, for each of the sections of the section subset, analyze text of the section to identify one or more data groupings in the section each having some of the repair data and to identify one of the multiple types for each of the data groupings, including extracting repair data from both structured and unstructured data formats and using the extracted repair data to determine the values for the attributes of the device;

determining, by the one or more computing systems, a timeline that is associated with at least some extracted repair data and that corresponds to the plurality of times; and linking, by the one or more computing systems and for each of at least some of the multiple types of repair data, extracted repair data of that type from multiple documents of the plurality of documents, to form an aggregated summary of repair data for the device for each of the at least some types;

presenting, by the one or more computing systems, a graphical user interface (GUI) to a user that includes the aggregated summary of repair data for the device;

receiving, by the one or more computing systems and via one or more interactions by the user with the GUI, a query related to a subset of the aggregated summary of repair data for the device;

determining, by the one or more computing systems and in response to the received query, response information with extracted repair data for the device that is of at least one of the multiple types and that is extracted from both structured and unstructured data formats and that includes at least one of the attribute values and that has associated information from the determined timeline; and providing, by the one or more computing systems, the determined response information to the received query, to initiate further repair activities on the device based at least in part on the response information, and wherein the providing of the determined response information to the received query is performed in response to the received query and includes providing the subset of the aggregated summary of repair data for the device.

2. The computer-implemented method of claim 1 wherein the device is a computing device, wherein the provided determined response information includes repair instruc-tions for the computing device, and wherein the method further comprises performing, by at least one computing system, one or more further automated repair activities on the computing device based at least in part on the repair instructions in the provided determined response informa-tion.

3. The computer-implemented method of claim 1 wherein the device provides medical services to a patient and the repair data further includes medical data of a plurality of types about the patient using both structured and unstruc-tured data formats and having information about further values for further attributes of the patient, wherein the determining of the repair data of the multiple types for the device further includes determining the medical data of the plurality of types using the combination of the image-based analysis and the text-based analysis of the document con-tents, wherein the determining of the response information further includes determining at least some of the medical data to include in the determined response information, and wherein the providing of the determined response informa-tion further includes initiating further activities involving the patient based at least in part on the determined at least some medical data included in the determined response informa-tion.

4. The computer-implemented method of claim 1 further comprising determining, by the one or more computing systems, a plurality of encounters within the content group-ings of the content grouping subset that each occur during a distinct interaction session with one of the multiple repair service providers, and wherein the determining of the plurality of sections includes identifying at least one section of the plurality of sections within each of the encounters.

5. A non-transitory computer-readable medium having stored contents that cause one or more computing systems to perform automated operations, the automated operations including at least:

determining, by the one or more computing systems, medical data of multiple types for a patient by performing a combination of image-based and text-based analyses of a plurality of content groupings that are associated with a plurality of medical service providers and that have contents including at least the medical data and that each represents at least one interaction session of one of the medical service providers with the patient, including:

before determining a plurality of sections, determining, by the one or more computing systems, a plurality of content groupings within one or more documents that include the plurality of content groupings, including determining multiple content groupings that were generated separately from each other before being combined in the one or more documents, identifying candidate content-grouping boundaries using a first trained neural network, and validating at least some of the candidate content-grouping boundaries using a second trained neural network that analyzes surrounding text around each candidate boundary to determine that the surrounding text corresponds to different content groupings;

determining, by the one or more computing systems, the plurality of sections within at least some content groupings of the plurality of content groupings, including, for each of one or more of the at least some content groupings, determining multiple sections within the content grouping that each includes content in a format different than surrounding sections within the content grouping, including:

identifying, by the one or more computing systems, structural elements of multiple types within the content grouping based at least in part on analysis of one or more images showing the content grouping, and combining, automatically by the one or more computing systems and without user input, some of the structural elements to form one or more sections of the multiple sections, and selecting other of the structural elements to each be one or more other sections of the multiple sections;

extracting, by the one or more computing systems, the medical data of the multiple types for the patient from at least some of the plurality of sections, including using a trained natural language processing model to analyze text of the at least some sections and identify data groupings each having some of the medical data and identify one of the multiple types for each of the data groupings; and linking, by the one or more computing systems and for each of at least some of the multiple types of medical data, extracted medical data of that type from multiple content groupings associated with multiple medical service providers, to form an aggregated summary of medical data for the entity for each of the at least some types; and providing, by the one or more computing systems, at least some of the determined medical data of the multiple types for the patient, to enable further use of the provided at least some determined medical data, including:

presenting, by the one or more computing systems, a graphical user interface (GUI) to a user that includes at least some of the extracted medical data of the multiple types for the patient; and receiving, by the one or more computing systems and via one or more interactions by the user with the GUI, a query related to a subset of the extracted medical data of the multiple types for the patient, and wherein the providing of the at least some of the determined medical data of multiple types is performed in response to the received query and includes providing the subset of the extracted medical data of the multiple types for the patient.

6. The non-transitory computer-readable medium of claim 5 wherein the further use of the provided at least some determined medical data includes at least one of one or more interactions with the patient or one or more interactions with one or more of the providers of medical services.

7. The non-transitory computer-readable medium of claim 5 wherein the stored contents include software instructions that, when executed by at least one of the one or more computing systems, cause the one or more computing systems to perform further automated operations that include, before the determining of the plurality of sections:

obtaining, by the one or more computing systems, one or more documents that include the plurality of content groupings; and determining, by the one or more computing systems, the plurality of content groupings within the one or more documents, including, for each of at least one document of the one or more documents, determining multiple content groupings within that document that are generated separately from each other before being combined in that document, including analyzing images of pages of that document to identify one or more candidate content grouping boundaries between content groupings by determining whether the images of subsequent pages of that document are part of a same content grouping or multiple different content groupings, and including analyzing surrounding text from contents of that document around each of at least some of the candidate content grouping boundaries to verify that the surrounding text belongs to multiple different content groupings.

8. The non-transitory computer-readable medium of claim 5 wherein the automated operations further include determining, by the one or more computing systems, a plurality of encounters within the at least some content groupings that each occur during a distinct interaction session with one of the plurality of medical service providers, and wherein the determining of the plurality of sections includes identifying at least one section of the plurality of sections within each of the encounters.

9. The non-transitory computer-readable medium of claim 5 wherein the automated operations further include, before the determining of the plurality of sections:

determining, by the one or more computing systems and for each of the plurality of content groupings, one of multiple enumerated content grouping categories for the content grouping, including generating the one content grouping category for the content grouping by using a trained neural network that analyzes text of one or more document pages that include the content grouping; and determining, by the one or more computing systems, a content grouping subset that includes the at least some content groupings, including excluding at least one of the plurality of content groupings from the content grouping subset based at least in part on the determined one content grouping category for each of the excluded at least one content groupings.

10. The non-transitory computer-readable medium of claim 5 wherein the automated operations further include, before the extracting of the medical data:

determining, by the one or more computing systems and for each of the plurality of sections, one of multiple enumerated section categories for the section by using a trained neural network that analyzes text of the section; and determining, by the one or more computing systems, a section subset that includes the at least some sections, including excluding at least one of the plurality of sections from the section subset based at least in part on the determined one section category for each of the excluded at least one sections.

11. The non-transitory computer-readable medium of claim 5, wherein:

the first trained neural network identifies candidate content-grouping boundaries using image-based analysis and the second trained neural network performs text-based verification of boundary correctness; and a candidate content-grouping boundary is accepted only upon agreement between outputs of the first trained neural network and the second trained neural network.

12. A computer-implemented method comprising:

determining, by one or more computing systems, medical data of multiple types about a patient by performing a combination of image-based analysis and text-based analysis of multiple documents having contents that include at least the medical data, including:

determining, by the one or more computing systems, a plurality of content groupings within the multiple documents, including, for each of at least one document of the multiple documents, determining multiple content groupings within that document that are generated separately from each other before being combined in that document, including:

analyzing images of pages of that document to identify one or more candidate content grouping boundaries between content groupings by determining whether the images of subsequent pages of that document are part of a same content grouping or multiple different content groupings, and analyzing surrounding text from contents of that document around each of at least some of the candidate content grouping boundaries to verify that the surrounding text belongs to multiple different content groupings;

determining, by the one or more computing systems, a plurality of sections within at least some content groupings of the plurality of content groupings, including, for each of one or more of the at least some content groupings, determining multiple sections within the content grouping that each includes content in a format different than surrounding sections within the content grouping, including:

identifying, by the one or more computing systems, structural elements of multiple types within the content grouping based at least in part on analysis of one or more images showing the content grouping, and combining, automatically by the one or more computing systems and without user input, some of the structural elements to form one or more sections of the multiple sections, and selecting other of the structural elements to each be one or more other sections of the multiple sections; and extracting, by the one or more computing systems, the medical data of the multiple types for the patient from the plurality of sections, including using a natural language processing model trained for analyzing medical information to analyze text of the plurality of sections and identify data groupings each having some of the medical data and to identify one of the multiple types for each of the data groupings; and providing, by the one or more computing systems, at least some of the determined medical data of the multiple types for the patient, to enable use of the provided at least some determined medical data in further interactions involving the patient, including:

presenting, by the one or more computing systems, a graphical user interface (GUI) to a user that includes at least some of the extracted medical data of the multiple types for the patient; and receiving, by the one or more computing systems and via one or more interactions by the user with the GUI, a query related to a subset of the extracted medical data of the multiple types for the patient, and wherein the providing of the at least some of the determined medical data is performed in response to the received query and includes providing the subset of the extracted medical data of the multiple types for the patient.

13. The computer-implemented method of claim 12 wherein the multiple documents are provided from multiple providers of medical services and reflect multiple encounters with the patient at different respective times, and wherein the method further comprises linking, by the one or more computing systems and for each of at least some of the multiple types of medical data, extracted medical data of that type from multiple content groupings associated with the multiple providers of medical services to form an aggregated summary of medical data for the patient for each of the at least some types, and wherein the provided at least some of the determined medical data includes at least some of the aggregated summary of the medical data for the patient for one or more of the at least some types.

14. The computer-implemented method of claim 13 wherein the at least some types of medical data are each one of treatment data, or diagnosis data, or medical history data, or prognosis data.

15. The computer-implemented method of claim 13 wherein the at least some types of medical data are each one of physical examination results data, or imaging test results data, or non-imaging medical test results data, or medical provider assessment data.

16. The computer-implemented method of claim 13 further comprising generating, by the one or more computing systems, a timeline that is associated with at least some of the extracted medical data of the multiple types for the patient and that corresponds to the different respective times of the multiple encounters, and wherein the provided at least some of the determined medical data includes at least some of the timeline with multiple of the respective times of the multiple encounters.

17. The computer-implemented method of claim 12 further comprising determining, by the one or more computing systems, a plurality of encounters within the at least some content groupings that each occur during a distinct interaction session with a medical service provider, wherein the determining of the plurality of sections includes identifying at least one section of the plurality of sections within each of the encounters, and wherein the provided at least some of the determined medical data includes information from at least one of the plurality of encounters.

18. The computer-implemented method of claim 12 further comprising, before the determining of the plurality of sections:

determining, by the one or more computing systems and for each of the plurality of content groupings, one of multiple enumerated content grouping categories for the content grouping, including using a trained neural network that analyzes text of one or more document pages that include the content grouping;

and determining, by the one or more computing systems, a content grouping subset that includes the at least some content groupings, including excluding at least one of the plurality of content groupings from the content grouping subset based at least in part on the determined one content grouping category for each of the excluded at least one content groupings.

19. The computer-implemented method of claim 12 further comprising, before the extracting of the medical data:

determining, by the one or more computing systems and for each of the plurality of sections, one of multiple enumerated section categories for the section by using a trained neural network that analyzes text of the section; and determining, by the one or more computing systems, a section subset that includes the at least some sections, including excluding at least one of the plurality of sections from the section subset based at least in part on the determined one section category for each of the excluded at least one sections.

20. The computer-implemented method of claim 12 wherein the contents of the multiple documents include medical data in multiple data formats, wherein the multiple data formats include at least one first data format using structured data and at least one second data format using unstructured data, wherein the extracting of the medical data of the multiple types includes extracting first medical data from the at least one first data format using structured data and further includes extracting second medical data from the at least one second data format using unstructured data, and wherein the provided at least some of the determined medical data includes at least some of the first medical data and at least some of the second medical data.

21. The computer-implemented method of claim 12 wherein the contents of the multiple documents include first medical data in typewritten form and second medical data in handwritten form, wherein the extracting of the medical data of the multiple types includes extracting the first medical data and further includes extracting the second medical data, and wherein the provided at least some of the determined medical data includes at least some of the first medical data and at least some of the second medical data.

22. A system comprising:

one or more hardware processors of one or more computing systems; and one or more memories with stored instructions that, when executed by at least one of the one or more hardware processors, cause the one or more computing systems to perform automated operations including at least:

determining medical data for a patient by performing a combination of image-based analysis and text-based analysis of multiple documents having contents that describe multiple encounters of the patient with multiple providers of medical services, including:

determining a plurality of content groupings within the multiple documents, including determining multiple content groupings within one of the multiple documents that are generated separately from each other before being combined in the one document, the determining of the multiple content groupings including:

analyzing images of pages of the one document to identify one or more candidate content grouping boundaries between content groupings by determining whether the images of subsequent pages of that document are part of a same content grouping or multiple different content groupings, and analyzing surrounding text from contents of the one document around each of at least some of the candidate content grouping boundaries to verify that the surrounding text belongs to multiple different content groupings;

determining a plurality of sections within at least some content groupings of the plurality of content groupings, including determining multiple sections within one of the multiple content groupings that each includes content in a format different than surrounding sections within the content grouping, including:

identifying, by the one or more computing systems, structural elements of multiple types within the content grouping based at least in part on analysis of one or more images showing the content grouping, and combining, automatically by the one or more computing systems and without user input, some of the structural elements to form one or more sections of the multiple sections; and extracting the medical data for the patient from the plurality of sections, including using a natural language processing model trained for analyzing medical information to analyze text of the plurality of sections; and providing at least some of the determined medical data of the multiple types for the patient, including:

presenting, by the one or more computing systems, a graphical user interface (GUI) to a user that includes at least some of the extracted medical data for the patient; and receiving, by the one or more computing systems and via one or more interactions by the user with the GUI, a query related to the extracted medical data for the patient, and wherein the providing of the at least some of the determined medical data is performed in response to the received query and includes providing the extracted medical data for the patient.

23. The system of claim 22 wherein the determining of the multiple sections within the one document includes, for one or more of the structural elements separate from the some structural elements combined to form the one or more sections, using each of the one or more structural elements as a separate one of the multiple sections, and wherein the extracting of the medical data includes analyzing text of the plurality of sections to identify data groupings each having some of the medical data and to identify one of multiple types of medical data for each of the data groupings.

24. The system of claim 22 wherein the automated operations further include generating, by the one or more computing systems, a timeline that is associated with at least some of the extracted medical data and that corresponds to different respective times of the multiple encounters, and wherein the at least some of the extracted medical data includes at least some of the timeline with multiple of the respective times of the multiple encounters.

* * * * *